(12) United States Patent
Nattinger

(10) Patent No.: US 8,316,311 B2
(45) Date of Patent: *Nov. 20, 2012

(54) AUTOMATICALLY CORRECTING PROBLEMS FOUND DURING PROGRAMMATIC ANALYSIS OF A GRAPHICAL PROGRAM

(75) Inventor: Darren M. Nattinger, Cedar Park, TX (US)

(73) Assignee: National Instruments Corporation, Austin, TX (US)

( * ) Notice: Subject to any disclaimer, the term of this patent is extended or adjusted under 35 U.S.C. 154(b) by 458 days.

This patent is subject to a terminal disclaimer.

(21) Appl. No.: 12/618,479

(22) Filed: Nov. 13, 2009

(65) Prior Publication Data

US 2010/0058292 A1 Mar. 4, 2010

Related U.S. Application Data

(63) Continuation of application No. 10/843,073, filed on May 11, 2004, now Pat. No. 7,650,574.

(51) Int. Cl.
*G06F 3/048* (2006.01)
*G06F 9/44* (2006.01)
*G06F 9/45* (2006.01)

(52) U.S. Cl. ........ 715/763; 715/967; 717/113; 717/124; 717/125; 717/126; 717/154; 717/155; 717/156

(58) Field of Classification Search .................. 717/105, 717/107, 108, 109, 113, 124, 126, 127, 128; 715/762, 763, 771, 772
See application file for complete search history.

(56) References Cited

U.S. PATENT DOCUMENTS

| 4,831,580 | A | 5/1989 | Yamada |
| 5,734,863 | A | 3/1998 | Kodosky et al. |
| 5,966,532 | A | 10/1999 | McDonald et al. |
| 5,987,246 | A | 11/1999 | Thomsen et al. |
| 6,064,816 | A | 5/2000 | Parthasarathy et al. |
| 6,437,805 | B1 | 8/2002 | Sojoodi et al. |
| 6,453,464 | B1 | 9/2002 | Sullivan et al. |
| 6,862,030 | B1 | 3/2005 | Bachmann |
| 6,983,446 | B2 | 1/2006 | Charisius et al. |
| 6,993,759 | B2 | 1/2006 | Aptus et al. |

(Continued)

FOREIGN PATENT DOCUMENTS

EP 1077404 2/2001

OTHER PUBLICATIONS

LabVIEW "Getting Started with LabVIEW"; National Instruments, Apr. 2003, 3 pages.

(Continued)

*Primary Examiner* — Haoshian Shih
(74) *Attorney, Agent, or Firm* — Meyertons Hood Kivlin Kowert & Goetzel, P.C.; Jeffrey C. Hood; Jason L. Burgess

(57) ABSTRACT

A system and method for visually indicating one or more problems in a graphical program. The graphical program may be programmatically analyzed to discover a problem (or potential problem) in the graphical program. The problem found during the programmatic analysis of the graphical program may then be visually indicated on a display device. Visually indicating the problem may comprise visually indicating one or more objects in the graphical program to which the problem corresponds. Visually indicating the graphical program object(s) may comprise displaying information or altering the appearance of the object(s) in order to call the user's attention to the object(s).

20 Claims, 38 Drawing Sheets

U.S. PATENT DOCUMENTS

| | | | |
|---|---|---|---|
| 7,000,190 B2 | 2/2006 | Kudukoli et al. |
| 7,043,693 B2 | 5/2006 | Wenzel et al. |
| 7,069,517 B2 | 6/2006 | Washington et al. |
| 7,120,876 B2 | 10/2006 | Washington et al. |
| 7,168,072 B2 | 1/2007 | Shah et al. |
| 7,200,838 B2 | 4/2007 | Kodosky et al. |
| 7,210,117 B2 | 4/2007 | Kudukoli et al. |
| 7,302,675 B2 | 11/2007 | Rogers et al. |
| 7,340,684 B2 | 3/2008 | Ramamoorthy et al. |
| 7,480,906 B2 | 1/2009 | Joffrain et al. |
| 7,484,200 B2 | 1/2009 | Joffrain et al. |
| 2002/0129333 A1 | 9/2002 | Chandhoke et al. |
| 2005/0028138 A1 | 2/2005 | Case et al. |
| 2005/0268173 A1 | 12/2005 | Kudukoli et al. |

OTHER PUBLICATIONS

Agilent VEE Pro Advanced Programming Techniques Menu; Mar. 22, 2004; 34 pages.

AUTOMATICALLY CORRECTING PROBLEMS FOUND DURING PROGRAMMATIC ANALYSIS OF A GRAPHICAL PROGRAM

PRIORITY CLAIM

The present application is a continuation of U.S. patent application Ser. No. 10/843,073, filed May 11, 2004 now U.S. Pat. No. 7,650,574, titled, "Visually Indicating Problems Found during Programmatic Analysis of a Graphical Program" and whose inventor is Darren M. Nattinger and which is hereby incorporated by reference in its entirety as though fully and completely set forth herein.

FIELD OF THE INVENTION

The present invention relates to the field of graphical programming, and more particularly to a system and method for visually indicating problems found during programmatic analysis of a graphical program.

DESCRIPTION OF THE RELATED ART

Traditionally, high level text-based programming languages have been used by programmers in writing application programs. Many different high level text-based programming languages exist, including BASIC, C, Java, FORTRAN, Pascal, COBOL, ADA, APL, etc. Programs written in these high level text-based languages are translated to the machine language level by translators known as compilers or interpreters. The high level text-based programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

To overcome the above shortcomings, various graphical programming environments now exist which allow a user to construct a graphical program or graphical diagram, also referred to as a block diagram. U.S. Pat. Nos. 4,901,221; 4,914,568; 5,291,587; 5,301,301; and 5,301,336; among others, to Kodosky et al disclose a graphical programming environment which enables a user to easily and intuitively create a graphical program. Graphical programming environments such as that disclosed in Kodosky et al can be considered a higher and more intuitive way in which to interact with a computer. A graphically based programming environment can be represented at a level above text-based high level programming languages such as C, Basic, Java, etc.

A user may assemble a graphical program by selecting various icons or nodes which represent desired functionality, and then connecting the nodes together to create the program. The nodes or icons may be connected by lines representing data flow between the nodes, control flow, or execution flow. Thus the block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures and/or program instructions may be automatically constructed which characterize an execution procedure that corresponds to the displayed procedure. The graphical program may be compiled or interpreted by a computer.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program, and may include other icons which represent devices being controlled.

Thus, graphical programming has become a powerful tool available to programmers. Graphical programming development environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

Modern graphical programming development environments allow users to create large and complex graphical programs. It can sometimes be difficult for users to evaluate a graphical program simply by looking at its block diagram. Thus, it may be desirable to enable graphical programs to be programmatically analyzed in various ways, e.g., to provide the user with information about the graphical program or inform the user of potential problems in the graphical program.

SUMMARY OF THE INVENTION

One embodiment of the present invention comprises a system and method for visually indicating one or more problems in a graphical program. The graphical program may be stored in a memory, and the graphical program may be programmatically analyzed to discover one or more problems (or potential problems) in the graphical program. Programmatically analyzing the graphical program may comprise programmatically examining or analyzing properties of one or more of objects in the graphical program, where the one or more problems are discovered based on the properties of the one or more objects. In various embodiments, the graphical program may be programmatically analyzed based on any of various kinds of properties of objects in the graphical program.

In various embodiments, the method may be operable to discover any of various kinds of problems or potential problems in the graphical program. For example, in one embodiment the one or more problems may include problems (or potential problems) or factors that affect performance of the graphical program. As another example, the one or more problems may include errors or potential errors in the graphical program. As another example, the one or more problems may include problems found in adherence to style or design standards for the graphical program, e.g., programming style standards or user interface design standards. As another example, the one or more problems may be related to documentation for the graphical program. Additional exemplary types of problems that may be found during programmatic analysis of a graphical program are described below.

Information listing the one or more problems (or potential problems) discovered during the programmatic analysis of the graphical program may be displayed on a display device. Displaying the information listing the one or more problems may include displaying text information listing the one or more problems, e.g., text information specifying names or descriptions of the one or more problems.

User input selecting a first problem (or potential problem) from the one or more listed problems (or potential problems) may be received. In various embodiments, user input of any kind may be received to select the first problem, e.g., depending on the manner in which the one or more problems are listed. In response, the first problem in the graphical program may be visually indicated on a display device. Visually indicating the first problem may comprise displaying graphical information to visually indicate the problem. In one embodiment text information regarding the first problem may also be displayed. In one embodiment the first problem may comprise a problem in the block diagram of the graphical program. In this embodiment, visually indicating the first problem may comprise displaying the block diagram of the graphical program and displaying information to visually indicate the problem in the block diagram. In another embodiment the first problem may comprise a problem in the graphical user interface of the graphical program. In this embodiment, visually indicating the first problem may comprise displaying the graphical user interface of the graphical program and displaying information to visually indicate the problem in the graphical user interface of the graphical program.

The graphical program may include a plurality of objects, such as block diagram objects and/or graphical user interface objects. In one embodiment the first problem (or potential problem) found during the programmatic analysis of the graphical program may correspond to an object in the graphical program. Thus, visually indicating the first problem may comprise visually indicating the object to which the first problem corresponds. For example, in one embodiment the first problem may correspond to an object in the block diagram of the graphical program, such as a node or wire. Thus, the first problem may be visually indicated by displaying the block diagram and visually indicating the node or wire (or other block diagram object) in the block diagram. In another embodiment the first problem may correspond to an object in the graphical user interface of the graphical program, such as a control or indicator. Thus, the first problem may be visually indicated by displaying the graphical user interface and visually indicating the control or indicator (or other graphical user interface object) in the graphical user interface of the graphical program.

In another embodiment the first problem found during the programmatic analysis of the graphical program may correspond to multiple objects in the graphical program or may correspond to a portion of the graphical program but not to a particular object. In this embodiment, visually indicating the first problem may comprise visually indicating the portion of the graphical program or visually indicating multiple objects in the graphical program.

Visually indicating a graphical program object or graphical program portion that corresponds to the first problem found during analysis of the graphical program may comprise displaying information or altering the appearance of the graphical program object or portion in any of various ways in order to call the user's attention to that object or portion of the graphical program. For example, one or more nodes, wires, or other objects in a block diagram of the graphical program may be visually indicated by changing their usual color, changing the color of the background behind them, drawing a border around them, causing them to blink, or providing any of various other kinds of visual cues to draw the user's attention to these objects or cause the objects to stand out from other objects in the block diagram. Graphical user interface objects in a graphical user interface of the graphical program may be highlighted in a similar manner.

Where the programmatic analysis performed on the graphical program discovers a plurality of problems (or potential problems) in the graphical program, the method may further comprise receiving user input selecting a second problem from the one or more listed problems. In response, the second problem in the graphical program may be visually indicated on the display device, similarly as described above. Other problems found during the programmatic analysis of the graphical program may be selected and visually indicated in a similar manner. For example, as the user selects each problem, the appropriate portion of the graphical program may be scrolled into view, and the object(s) or graphical program portion that corresponds to the problem may be visually indicated as described above. In another embodiment, the one or more problems discovered during the programmatic analysis of the graphical program may be listed one at a time so that the user can simply advance from one problem to the next but may not be able to see all the problems listed at once or select a problem randomly.

BRIEF DESCRIPTION OF THE DRAWINGS

A better understanding of the present invention can be obtained when the following detailed description of the preferred embodiment is considered in conjunction with the following drawings, in which.

Figure 1:
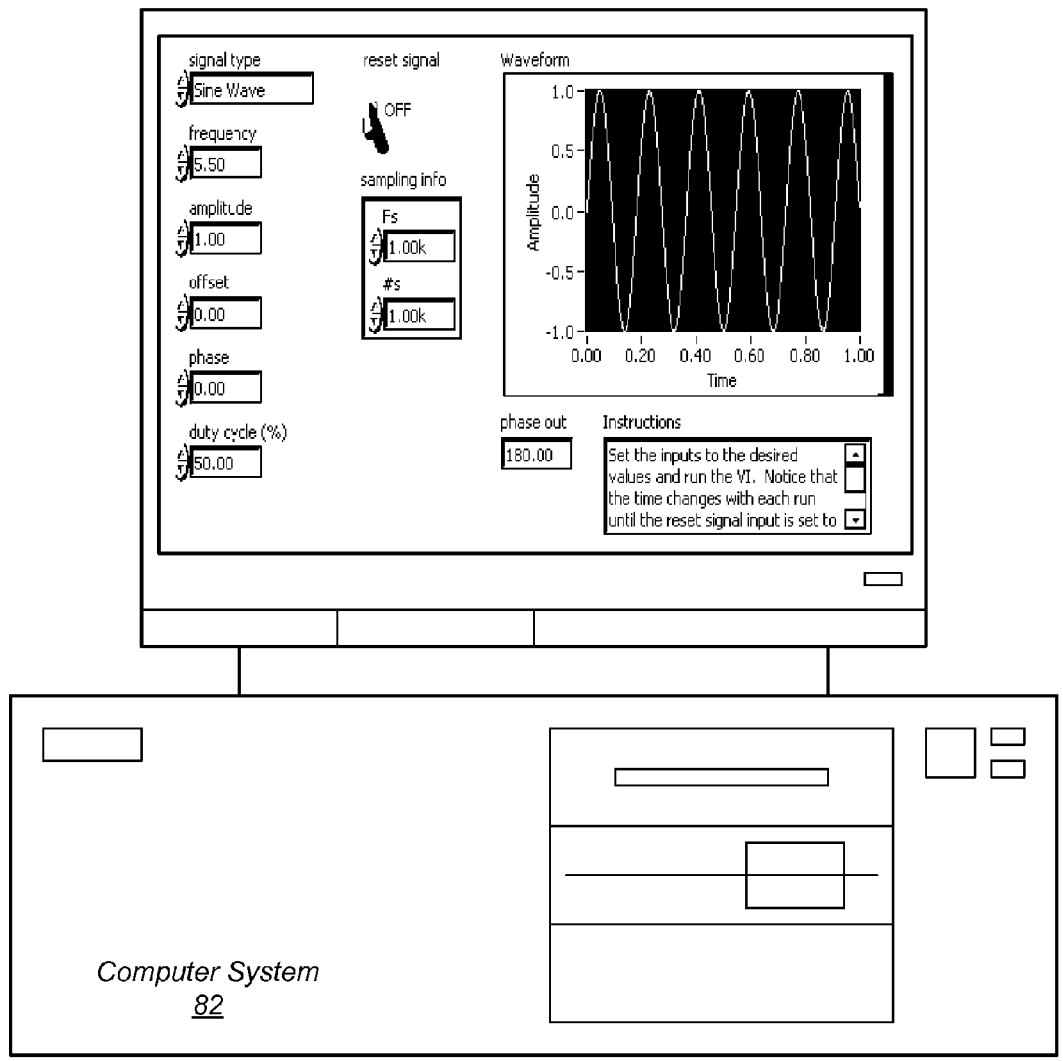
FIG. 1 illustrates a computer system 82 operable to programmatically analyze a graphical program.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,210,117, published as Application Publication No. 20010020291 (Ser. No. 09/745,023) titled "System and Method for Programmatically Generating a Graphical Program in Response to Program Information," filed Dec. 20, 2000.

TERMS

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical programming development environments that may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

FIG. 1—Computer System

FIG. 1 illustrates a computer system 82 operable to programmatically analyze a graphical program. As used herein, the term "programmatically" is intended to mean that the associated operation is performed by a program (as opposed to being performed manually by a user), such as a program executing in a computer or a program executing in a programmable hardware element such as an FPGA.

In various embodiments, the graphical program that is programmatically analyzed may comprise any type of graphical program, e.g., may be created using any graphical programming development environment or graphical programming language, and may perform any function. The computer system 82 may programmatically analyze the graphical program for any of various reasons. For example, it may be desirable to programmatically analyze a graphical program to determine factors that limit or affect the graphical program's performance, to discover errors or potential errors in the graphical program, to determine information regarding the user interface design of the graphical program, etc. In one embodiment, results of the programmatic analysis may be displayed to the user or stored, e.g., in a report file or database.

In one embodiment, a graphical program may be programmatically analyzed to determine whether the graphical program adheres to certain design or style standards. For example, certain programming conventions may be recommended for graphical programs written using a particular graphical programming development environment, to promote maximum performance and reliability. As another example, an organization may set various programming standards to which graphical program developers are expected to adhere. Thus, in one embodiment the computer system 82 may be operable to programmatically analyze the graphical program and inform the user of any portions of the graphical program that do not adhere to the design or style standards. As described below, in one embodiment the user may be able to customize analysis criteria used by the computer system 82 to meet the user's particular analysis needs or reflect the user's particular design or style standards.

As described above, various elements may be associated with a graphical program, such as a block diagram, a graphical user interface, documentation or help, etc. The computer system 82 may be operable to programmatically analyze any of these elements for various purposes. For example, the block diagram may be programmatically analyzed for performance and style issues. For example, the block diagram may be analyzed for wiring style, loop and structure usage, unnecessary elements on the block diagram, etc.

As another example, the graphical user interface may be programmatically analyzed for user interface issues, e.g., design or style issues, as well as functional issues. For example, the graphical user interface may be analyzed for user interface control or indicator usage, font selection, the presence of labels, etc.

As another example, the graphical program may be analyzed for documentation issues. The graphical program may be analyzed for user documentation and/or developer documentation. For example, the computer system 82 may be operable to check for comments on the graphical program's block diagram, analyze help text or descriptions for controls or graphical sub-programs, etc.

In one embodiment the computer system 82 may execute a program referred to herein as a graphical program analyzer. The graphical program analyzer may provide a user interface with which the user can interact to specify an analysis configuration. After programmatically analyzing one or more graphical programs according to the analysis configuration, the graphical program analyzer may be operable to display results of the analysis and/or store the results, e.g., in a file or database. In one embodiment the graphical program analyzer may identify one or more problems or other issues in the graphical program and may be operable to display the graphical program portions associated with the problems or other issues. For example, in one embodiment, in response to a user request to display the graphical program portion associated with a particular block diagram problem or issue found during the analysis, the graphical program analyzer may open the block diagram of the graphical program and highlight or call the user's attention to one or more block diagram objects relevant to the problem or issue. One embodiment of a graphical program analyzer is described in detail below.

In another embodiment the computer system 82 may execute a user-created program operable to programmatically analyze a target graphical program. For example, instead of interacting with a graphical program analyzer tool as described above, the user may create a program operable to programmatically analyze one or more graphical programs. In one embodiment an application programming interface (API) for programmatically analyzing a graphical program may be provided. For example, the API may be associated with or provided by an application development environment (ADE) used to create the program that analyzes the target graphical program(s).

In various embodiments the user may be able to create any kind of program to analyze the target graphical program. In one embodiment the program that performs the analysis of the graphical program may comprise a text-based program, i.e., a program written in a text-based programming language such as C, C++, Visual C++, Java, Visual Basic, etc. For example, an API that includes various functions or methods related to performing programmatic analysis of a graphical program may be provided, and the user may include various function and method calls in the text-based program.

In another embodiment the program that performs the analysis of the graphical program may itself comprise a graphical program. For example, a graphical programming API that includes various function nodes or other graphical program objects related to performing programmatic analysis of a graphical program may be provided. The user may include various function nodes or objects from the API in a graphical program and may interconnect the function nodes with other nodes in the graphical program to visually indicate the desired analysis functionality. The user may also provide the graphical program with references to one or more target graphical programs so that the graphical program executes to programmatically analyze the target graphical program(s). The user may also include function nodes operable to perform functions such as displaying results from the programmatic analysis or generating a report based on the results. An exemplary graphical programming API for programmatically analyzing graphical programs is described in detail below.

Referring again to FIG. 1, the computer system 82 may include a display device. The computer system 82 may also include a memory medium(s) on which one or more computer programs or software components may be stored. In an embodiment in which a graphical program analyzer is used to analyze a graphical program, the memory medium may store the graphical program analyzer program and/or the graphical programs to be analyzed. The user may interact with one or more GUI panels of the graphical program analyzer displayed on the display device. The graphical program analyzer may also display results of the programmatic analysis on the display device.

In an embodiment in which the user creates a program to programmatically analyze a graphical program, the memory medium may store an application development environment used to create or develop the user's program. In one embodiment the memory medium may store a graphical programming development environment used to create a graphical program operable to programmatically analyze a target graphical program. A user interface of the development environment may be displayed on the display device as the user's program is created.

In one embodiment the computer system 82 may execute the program created by the user. Thus, in one embodiment the user's program may be stored in the memory medium. The memory medium may also store the target graphical program(s) programmatically analyzed by the user's program. In one embodiment a GUI of the program created by the user may be displayed on the display device as it is executed. In another embodiment, the user may create the program on another computer system, and the program may then be transferred to the computer system 82 for execution, or the user may create the program on the computer system 82 and then transfer the program to another computer system for execution.

Figure 1A:
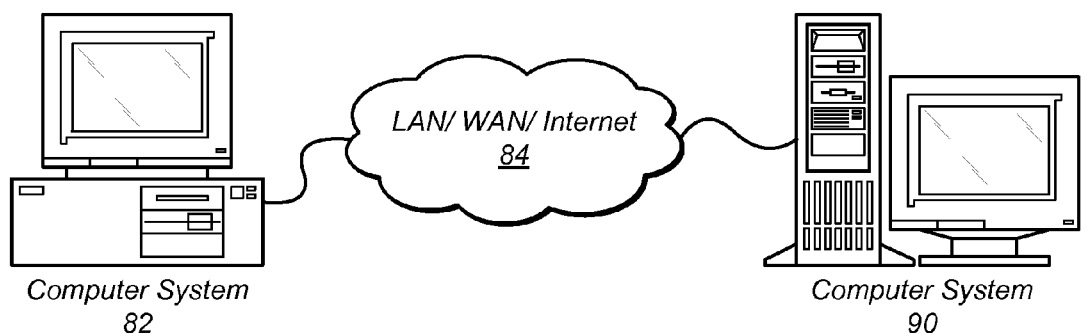
FIG. 1A illustrates a system comprising two computer systems coupled by a network.

FIG. 1A—Computer Network

FIG. 1A illustrates a system including a first computer system 82 that is coupled to a second computer system 90. The computer system 82 may be connected through a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others.

In one embodiment the computer system 82 may communicate with the computer system 90 to programmatically analyze one or more target graphical programs. For example, a graphical program analyzer or a program created by a user as described above may execute on the computer system 82 to programmatically analyze a target graphical program stored on the computer system 90 (or stored on a memory medium associated with the computer system 90).

In another embodiment, the target graphical program(s) may be stored on a device 190 coupled to the computer system 82. For example, the device 190 may include a programmable hardware element and/or may include a processor and memory medium which may execute a real time operating system. The graphical program analyzer or user-created program may execute on the computer system 82 to programmatically analyze the target graphical program(s) stored on the device 190.

Exemplary Systems

In one embodiment, graphical programs that are programmatically analyzed may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that graphical programs may be used for a plethora of applications and are not limited to the above applications. In other words, applications discussed herein are exemplary only. Thus, the system and method described herein may be utilized to programmatically analyze graphical programs used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
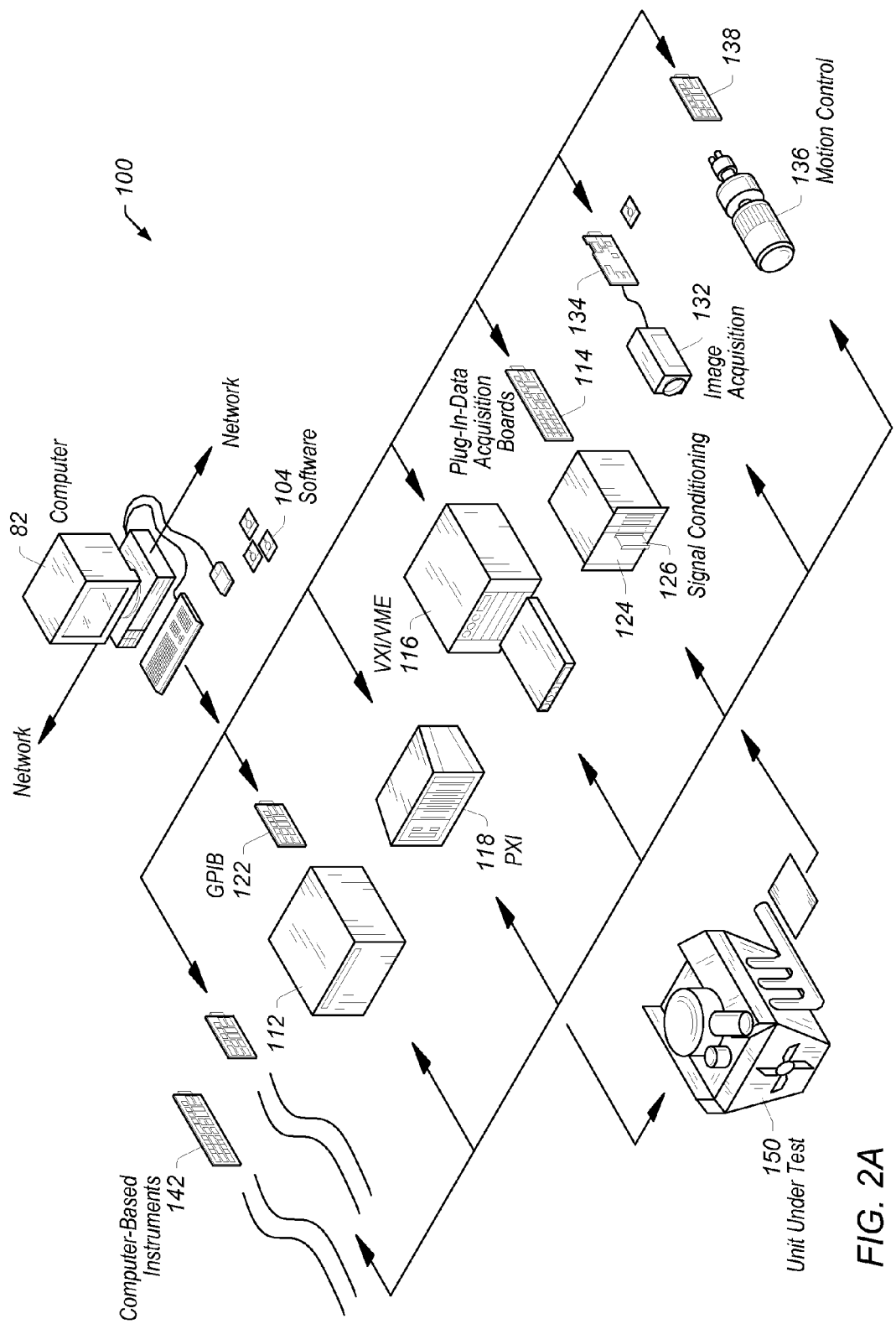
FIG. 2A illustrates an exemplary instrumentation control system.

FIG. 2A illustrates an exemplary instrumentation control system 100. The system 100 comprises a host computer 82 which connects to one or more instruments. The host computer 82 may comprise a CPU, a display screen, memory, and one or more input devices such as a mouse or keyboard as shown. In one embodiment, the computer 82 may execute a graphical program to communicate with the one or more instruments to analyze, measure or control a unit under test (UUT) or process 150. In one embodiment, this graphical program may be programmatically analyzed as described above. For example, the graphical program may be programmatically analyzed to inform the user of efficiency or design problems or potential problems.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application.

Figure 2B:
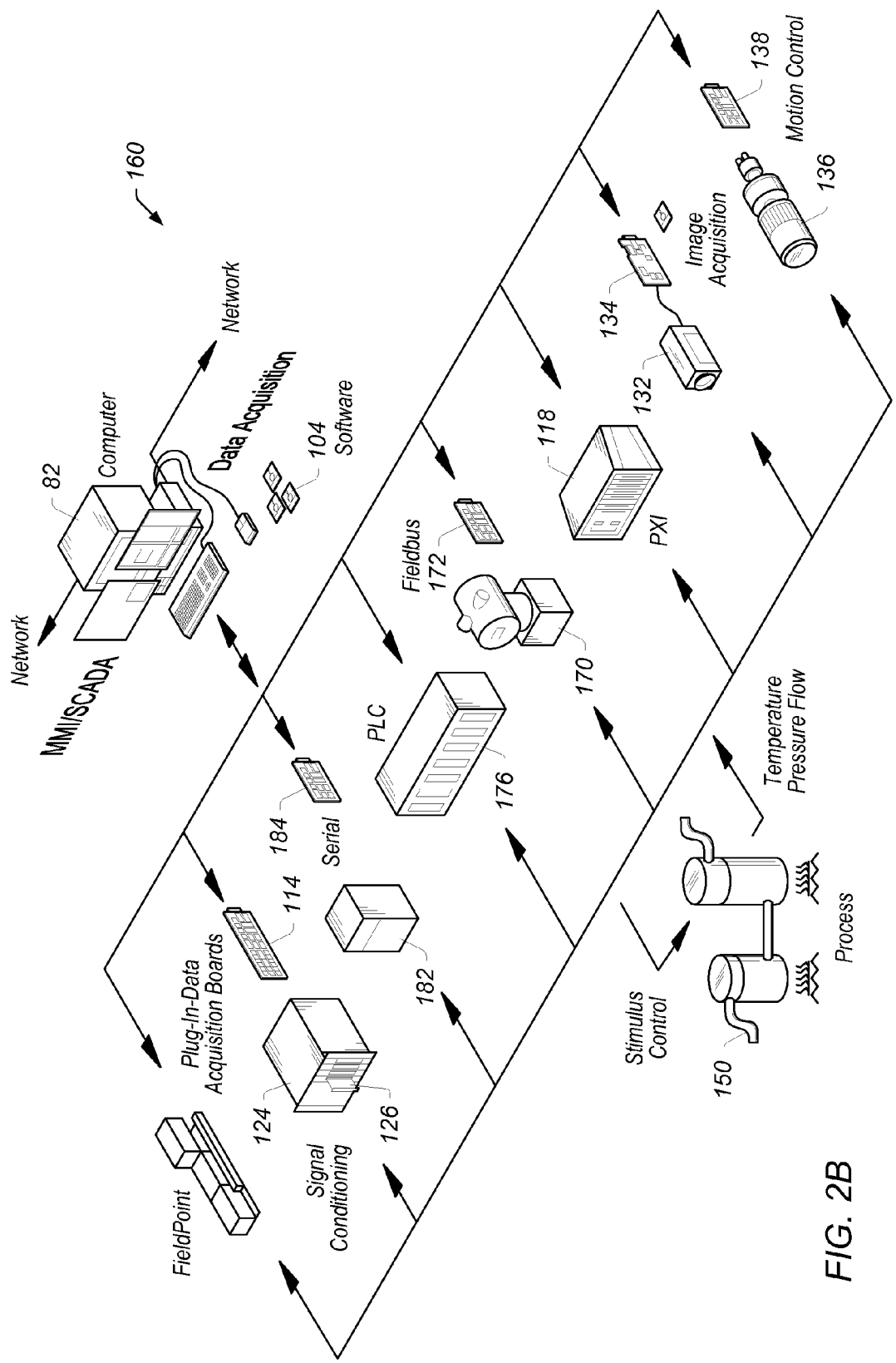
FIG. 2B illustrates an exemplary industrial automation system.

FIG. 2B illustrates an exemplary industrial automation system 160. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which connects to one or more devices or instruments. The computer 82 may comprise a CPU, a display screen, memory, and one or more input devices such as a mouse or keyboard as shown.

The computer 82 may execute a graphical program to communicate with the one or more devices to a process or device 150 to perform an automation function, such as MMI (Man Machine Interface), SCADA (Supervisory Control and Data Acquisition), portable or distributed data acquisition, process control, advanced analysis, or other control. In one embodiment, this graphical program may be programmatically analyzed as described above. For example, the graphical program may be programmatically analyzed to inform the user of efficiency or design problems or potential problems.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

In the systems of FIGS. 2A and 2B above, one or more of the various devices may couple to each other over a network, such as the Internet.

Figure 3:
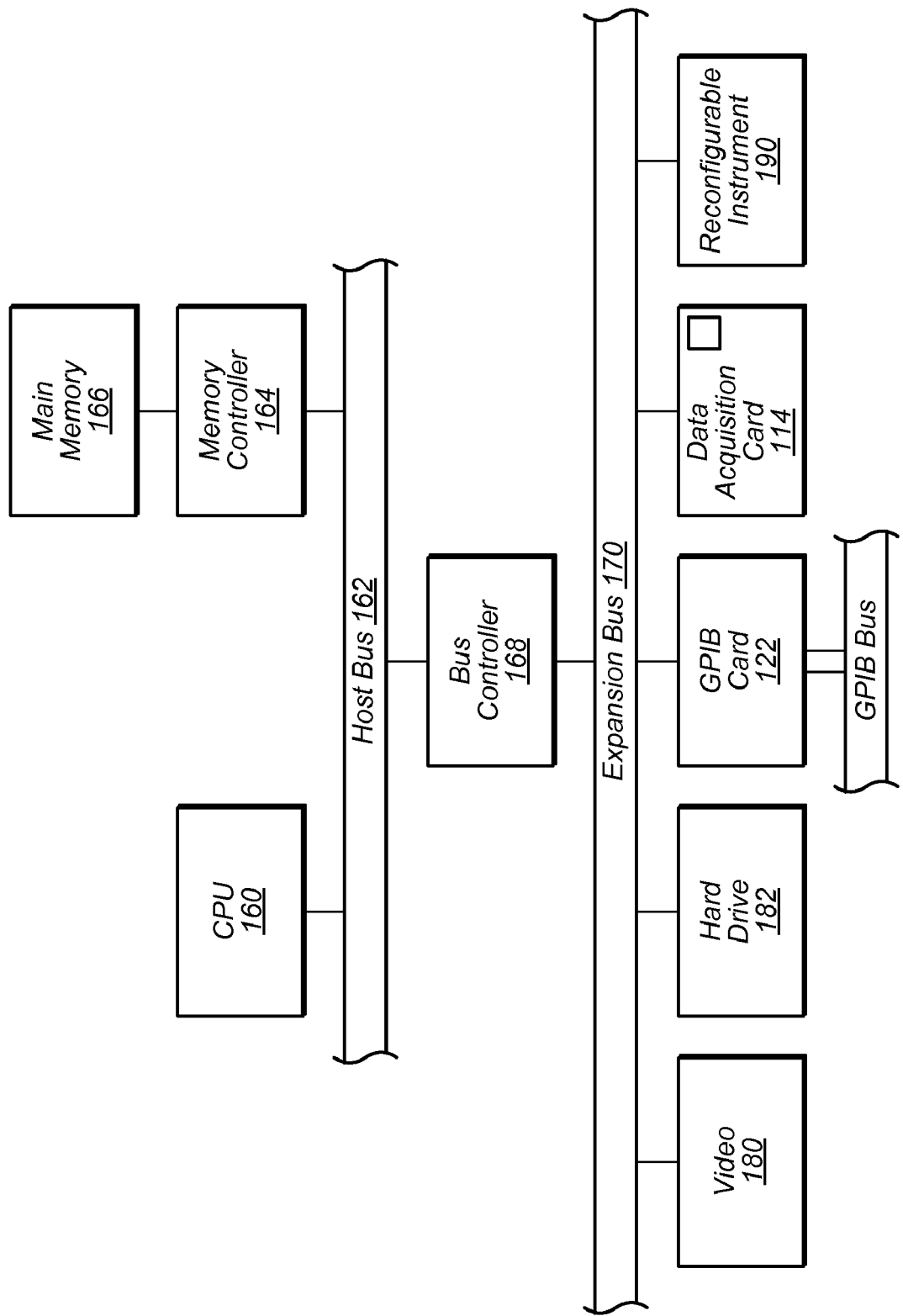
FIG. 3 is an exemplary block diagram of the computer systems of FIGS. 1, 1A, 2A, and 2B.

FIG. 3—Computer System Block Diagram

FIG. 3 is a block diagram representing one embodiment of the computer system 82 and/or 90 illustrated in FIGS. 1 and 1A, or computer system 82 shown in FIG. 2A or 2B. It is noted that any type of computer system configuration or architecture can be used as desired, and FIG. 3 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store programs such as described above with reference to FIG. 1. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170.

In one embodiment a device 190 may also be connected to the computer. The device 190 may include a processor and memory which may execute a real time operating system. The device 190 may also or may instead comprise a programmable hardware element. In one embodiment a target graphical program to be programmatically analyzed may be deployed on the device 190. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code that has generated from either the graphical program or from text code that in turn was generated from the graphical program.

Figure 4:
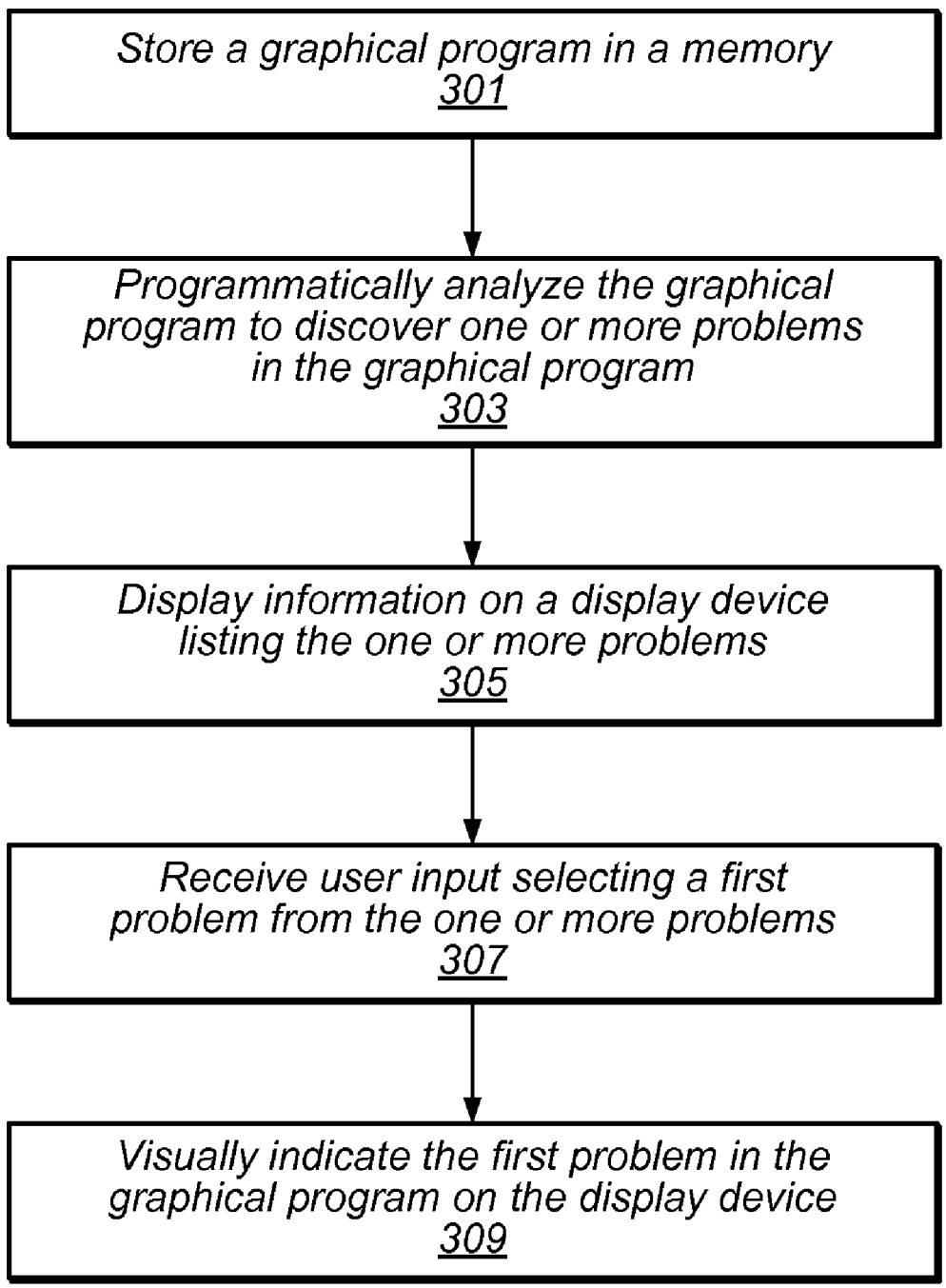
FIG. 4 is a flowchart diagram illustrating one embodiment of a method for visually indicating problems found during programmatic analysis of a graphical program.

FIG. 4—Visually Indicating Problems in a Graphical Program

FIG. 4 is a flowchart diagram illustrating one embodiment of a method for visually indicating problems found during programmatic analysis of a graphical program. It is noted that FIG. 4 illustrates a representative embodiment, and alternative embodiments are contemplated.

In 301, a graphical program may be stored in a memory. The graphical program may include a plurality of objects. For example, the graphical program may include a block diagram that has a plurality of block diagram objects that visually represent functionality of the block diagram. For example, in one embodiment the block diagram may include a plurality of nodes that are interconnected by wires to indicate data flow among the nodes. In one embodiment the graphical program may also include a graphical user interface that has a plurality of graphical user interface objects. For example the graphical user interface may include one or more controls with which a user may interact to provide input to the graphical program and/or may include one or more indicators operable to display output from the graphical program.

Storing the graphical program in the memory may comprise storing one or more data structures in the memory, where the one or more data structures represent the graphical program. The one or more data structures may comprise information specifying the plurality of objects in the graphical program. In various embodiments, the data structure(s) may be organized in any way.

In 303, the graphical program may be programmatically analyzed to discover one or more problems (or potential problems) in the graphical program. Programmatically analyzing the graphical program may comprise programmatically examining or analyzing properties of one or more of the objects in the graphical program, where the problem is discovered based on the properties of the one or more objects. In various embodiments, the graphical program may be programmatically analyzed based on any of various kinds of properties of objects in the graphical program. As one example, connections among nodes in the block diagram of the graphical program may be analyzed. For example, the block diagram of the graphical program may be traversed to determine whether it includes a node of type A that is connected to a node of type B. Such a connection may indicate a problem or a potential problem in the graphical program, and it may be desirable to inform the user of this problem.

In various embodiments, the method may be operable to discover any of various kinds of problems or potential problems in the graphical program. For example, in one embodiment the problem may comprise a problem (or potential problem) or factor that affects performance of the graphical program. As another example, the problem may comprise an error or potential error in the graphical program. As another example, the problem may comprise a problem found in adherence to style or design standards for the graphical program, e.g., programming style standards or user interface design standards. As another example, the problem may be related to documentation for the graphical program. Additional exemplary types of problems that may be found during programmatic analysis of a graphical program are described below.

In 305, information listing the one or more problems discovered during the programmatic analysis of the graphical program may be displayed on a display device. Displaying the information listing the one or more problems may include displaying text information listing the one or more problems, e.g., text information specifying names or descriptions of the one or more problems. In various embodiments, the one or more problems may be listed in any of various ways and may be listed together or separately. In one embodiment the one or more problems may be shown in a list, where the list may be displayed or organized in any of various ways. For example, problems in the list may be categorized in various ways or may be displayed in a hierarchical manner. As one example, programmatically analyzing the graphical program in 303 may comprise performing a plurality of tests on the graphical program, and the one or more problems may be displayed in a manner that associates each problem with the test in which the problem was discovered. In other embodiments, the one or more problems may be listed in other ways. For example, in one embodiment each problem may be displayed as an icon.

In 307, user input selecting a first problem (or potential problem) from the one or more listed problems (or potential problems) may be received. In various embodiments, user input of any kind may be received to select the first problem, e.g., depending on the manner in which the one or more problems are listed. As one example, the one or more problems may be displayed in a selectable list, and the user may select the first problem by interacting with the displayed list, e.g., by clicking or double-clicking on the first problem with a pointing device, checking a box next to the first problem, pressing a button to select the first problem, etc.

In 309, the first problem (or potential problem) in the graphical program may be visually indicated on the display device in response to the user selecting the first problem. Visually indicating the first problem may comprise displaying graphical information to visually indicate the first problem. In one embodiment text information regarding the first problem may also be displayed. In one embodiment the first problem may comprise a problem in the block diagram of the graphical program. In this embodiment, visually indicating the first problem may comprise displaying the block diagram of the graphical program and displaying information to visually indicate the first problem in the block diagram. In another embodiment the first problem may comprise a problem in the graphical user interface of the graphical program. In this embodiment, visually indicating the first problem may comprise displaying the graphical user interface of the graphical program and displaying information to visually indicate the first problem in the graphical user interface of the graphical program.

As described above, the graphical program may include a plurality of objects, such as block diagram objects and/or graphical user interface objects. In one embodiment the first problem (or potential problem) found during the programmatic analysis of the graphical program may correspond to an object in the graphical program. Thus, visually indicating the first problem may comprise visually indicating the object to which the first problem corresponds. For example, in one embodiment the first problem may correspond to an object in the block diagram of the graphical program, such as a node or wire. Thus, the first problem may be visually indicated by displaying the block diagram and visually indicating the node or wire (or other block diagram object) in the block diagram. In another embodiment the first problem may correspond to an object in the graphical user interface of the graphical program, such as a control or indicator. Thus, the first problem may be visually indicated by displaying the graphical user interface and visually indicating the control or indicator (or other graphical user interface object) in the graphical user interface of the graphical program.

In another embodiment the first problem found during the programmatic analysis of the graphical program may correspond to multiple objects in the graphical program or may correspond to a portion of the graphical program but not to a particular object. In this embodiment, visually indicating the first problem may comprise visually indicating the portion of the graphical program or visually indicating multiple objects in the graphical program.

Visually indicating a graphical program object or graphical program portion that corresponds to the first problem found during analysis of the graphical program may comprise displaying information or altering the appearance of the graphical program object or portion in any of various ways in order to call the user's attention to that object or portion of the graphical program. For example, one or more nodes, wires, or other objects in a block diagram of the graphical program may be visually indicated by changing their usual color, changing the color of the background behind them, drawing a border around them, causing them to blink, or providing any of various other kinds of visual cues to draw the user's attention to these objects or cause the objects to stand out from other objects in the block diagram. Graphical user interface objects in a graphical user interface of the graphical program may be highlighted in a similar manner.

Where the programmatic analysis performed in 303 discovers a plurality of problems (or potential problems) in the graphical program, the method may further comprise receiving user input selecting a second problem from the one or more listed problems. In response, the second problem in the graphical program may be visually indicated on the display device, similarly as described above. Other problems found during the programmatic analysis of the graphical program may be selected and visually indicated in a similar manner. For example, as the user selects each problem, the appropriate portion of the graphical program may be scrolled into view, and the object(s) or graphical program portion that corresponds to the problem may be visually indicated as described above. In another embodiment, the one or more problems discovered during the programmatic analysis of the graphical program may be listed one at a time so that the user can simply advance from one problem to the next but may not be able to see all the problems listed at once or select a problem randomly.

In various embodiments, the method may be operable to perform programmatic analysis of any kind on the graphical program, in order to discover problems of any kind. In one embodiment, user input specifying one or more options for programmatically analyzing the graphical program may be received, and the graphical program may be programmatically analyzed in accordance with the one or more options. For example, one or more GUI panels for configuring the programmatic analysis of the graphical program may be displayed, and the user input may be received to the one or more GUI panels. An exemplary graphical program analyzer is described below, which allows the user to specify one or more tests to perform on the graphical program. Each failure occurrence of the specified tests may be visually indicated as described above.

Graphical Program Analyzer

In one embodiment a graphical program analyzer tool or utility that allows a user to interactively specify analysis options for analyzing a graphical program may be provided. The graphical program analyzer may be operable to programmatically analyze one or more graphical programs according to the analysis options specified by the user and may then display results of the analysis. In one embodiment the graphical program analyzer may provide a wizard-like interface to guide the user through the analysis process. For example, the graphical program analyzer may display a plurality of graphical user interface (GUI) panels with which the user may interact.

In various embodiments the graphical program analyzer may be operable to programmatically analyze any kind of graphical program, e.g., may analyze graphical programs developed using any graphical programming development environment or graphical programming language. Screen shots from a software utility operable to programmatically analyze LabVIEW graphical programs are described below to illustrate one particular embodiment of a graphical program analyzer.

Figure 5:
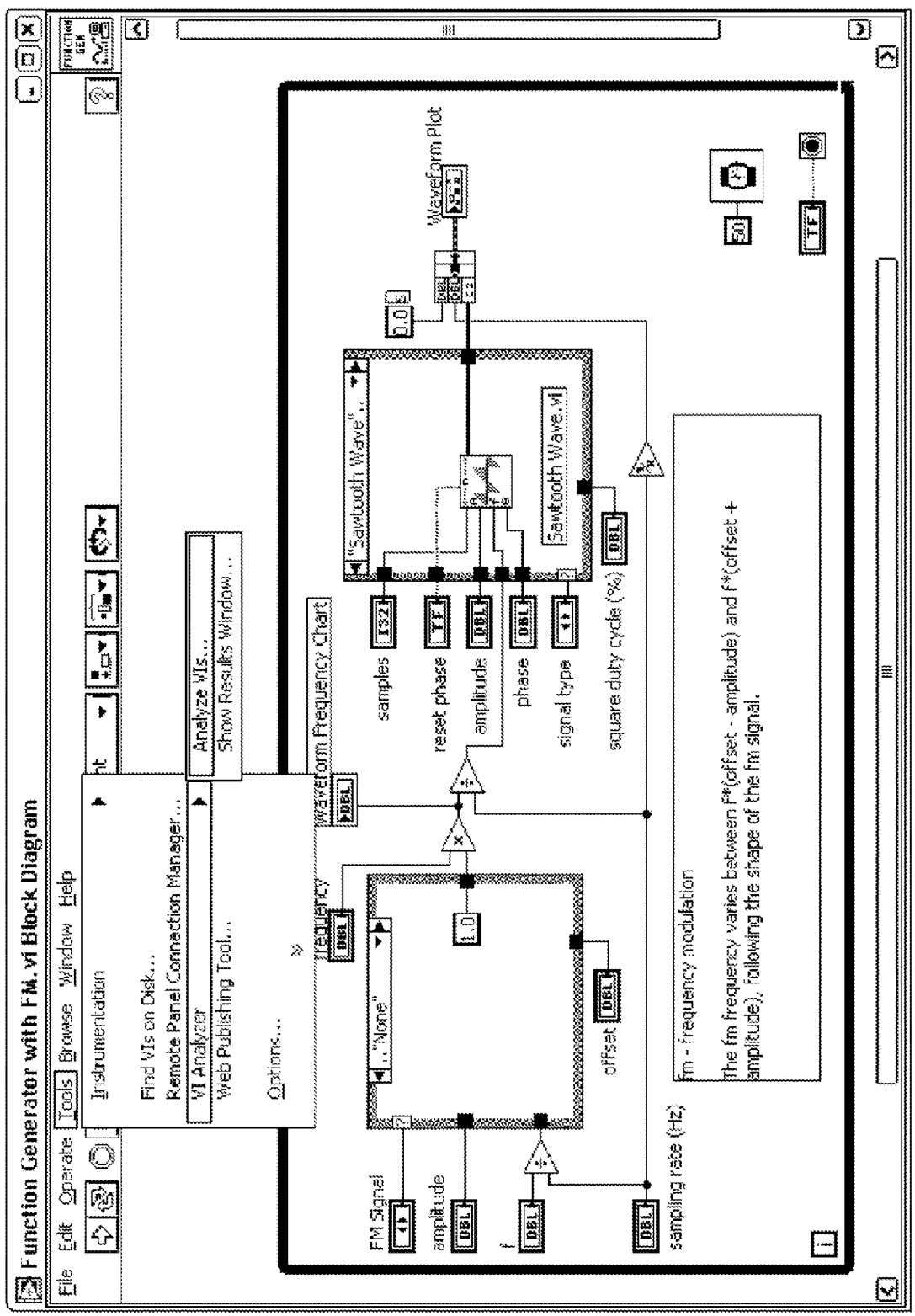
FIGS. 5-27 illustrate an exemplary graphical program analyzer tool according to one embodiment.

In one embodiment the graphical program analyzer may be integrated into a graphical programming development environment. For example, FIG. 5 illustrates an editor window for editing the block diagram of a LabVIEW graphical program that performs a measurement function. As shown, the user has activated a "Tools" menu in the editor window to display a "Analyze VIs . . . " menu option. (LabVIEW graphical programs may also be referred to as VIs.) The user may select this menu option to launch a wizard-like interface that allows the user to specify an analysis configuration for analyzing one or more graphical programs. Thus, in this example the graphical program analyzer is tightly integrated with the graphical program editor in a common user interface.

In another embodiment the graphical program analyzer may not be integrated with a graphical programming development environment. For example, the user may launch the graphical program analyzer as a separate software application from an operating system shell or GUI.

Figure 6:
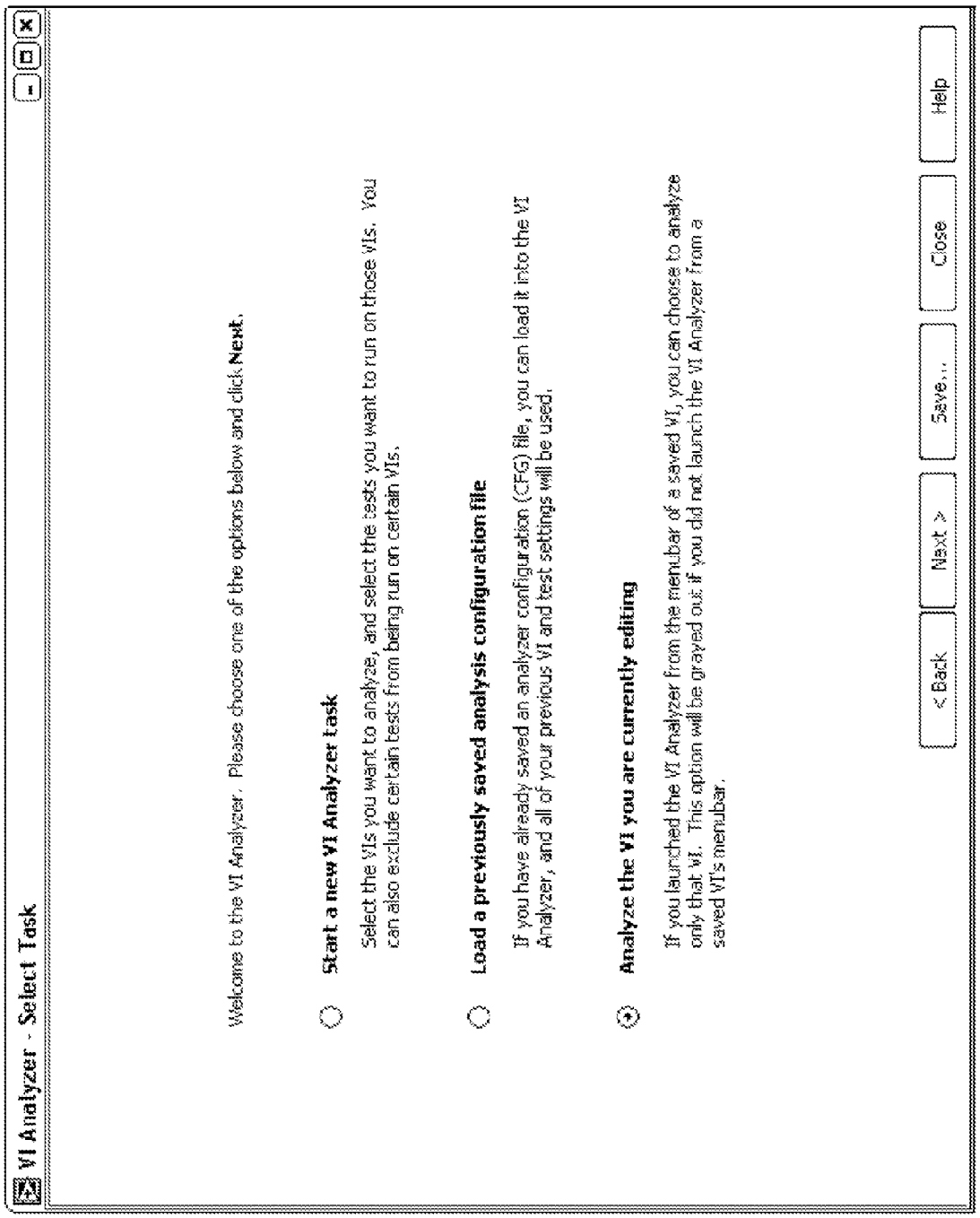

FIG. 6 illustrates an exemplary GUI panel displayed when the graphical program analyzer according to one embodiment is first launched. As described above, in one embodiment the graphical program analyzer may be launched from an editor window for editing a graphical program. In the example of FIG. 6, the "Analyze the VI you are currently editing" option is selected by default, allowing the user to analyze the graphical program currently open in the editor window. The GUI panel of FIG. 6 also includes options for loading a previously saved analysis configuration file or creating a new analysis configuration (the "Start a new VI Analyzer task" option).

Figure 7:
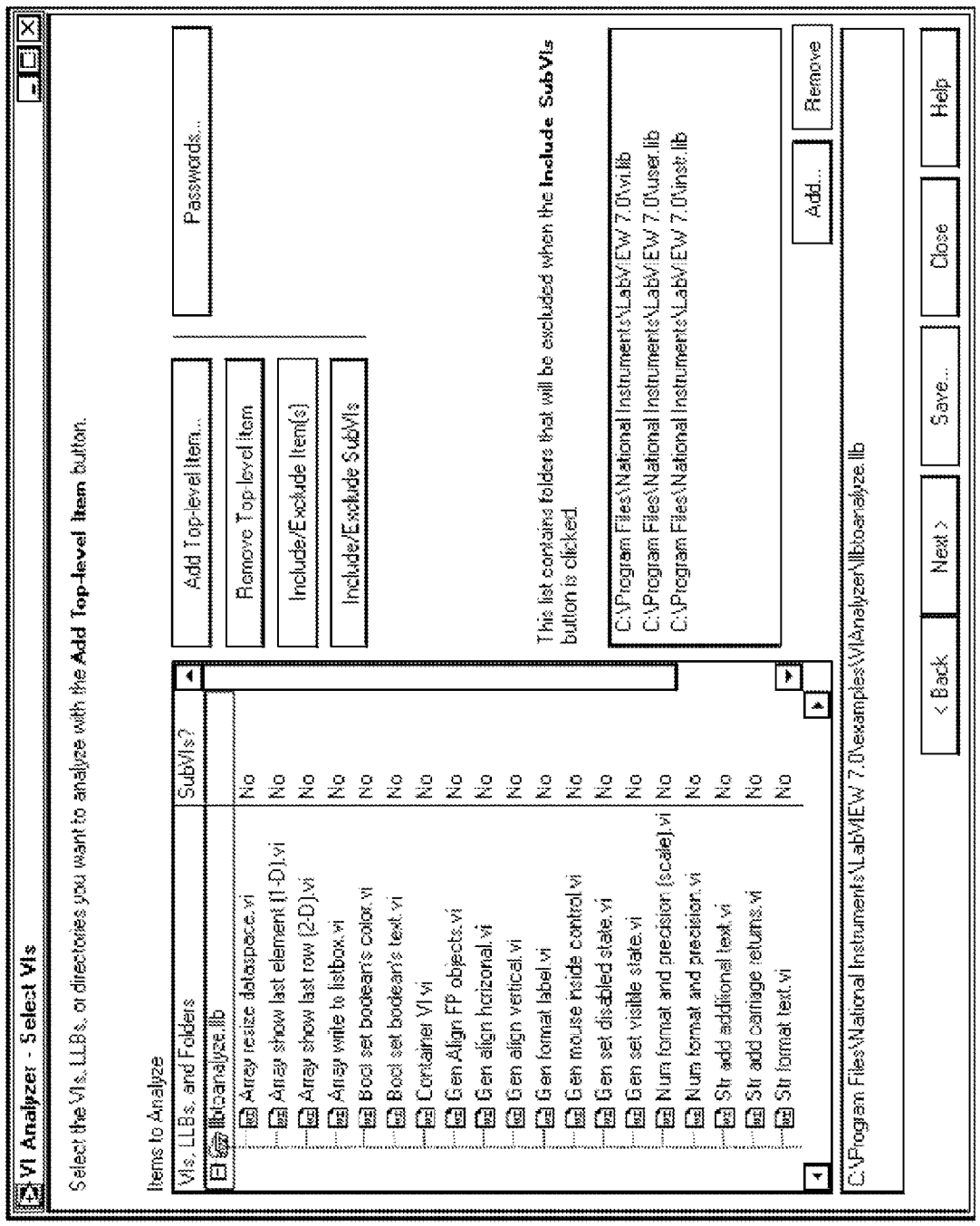

In one embodiment, if the user does not choose to analyze the currently open graphical program (or if the graphical program analyzer does not give the user this option) then the graphical program analyzer may display a GUI panel for selecting one or more graphical programs to be analyzed. FIG. 7 illustrates an exemplary GUI panel for selecting graphical program(s) to be analyzed. The user can click the "Add Top-Level Item . . . " button to display a dialog allowing the user to select a graphical program or a library of graphical programs to be analyzed. In this example, the user has selected a library of graphical programs named "llbtoanalyze.llb" that includes several LabVIEW VIs.

Some kinds of graphical programs may use graphical sub-programs. As described above, a graphical program may have a block diagram that includes a plurality of interconnected nodes or icons. A graphical sub-program may be included as a node in the block diagram of a graphical program. The graphical sub-program may have its own block diagram which the user may view by expanding this node.

In one embodiment, the graphical program analyzer may be operable to analyze not only the top-level graphical programs selected by the user but also any graphical sub-programs in the top-level graphical programs. Graphical sub-programs may also use their own graphical sub-programs, i.e., graphical sub-programs may be nested to any desired degree. In one embodiment the graphical program analyzer may be operable to programmatically analyze an entire nested chain of graphical sub-programs. The user interface of the graphical program analyzer may provide the user with options for specifying whether and which graphical sub-programs should be analyzed. For example, the GUI panel of FIG. 7 includes a "Include/Exclude SubVIs" button that the user may click to include or exclude in the analysis the subVIs in the selected LabVIEW VI in the "Items to Analyze" list on the left.

As described above, in various embodiments the graphical program analyzer may be operable to perform analysis of any kind on the selected graphical program(s). In one embodiment the graphical program analyzer may allow the user to select from a plurality of tests to perform on the selected graphical program(s). For example, the graphical program(s) may be analyzed to determine whether they pass or fail the selected tests. In various embodiments the graphical program analyzer may be operable to perform any desired test.

In one embodiment the tests may be organized into different categories. Tests may be categorized in any way. In one embodiment, test categories include block diagram tests, documentation tests, user interface tests, and general tests.

Block diagram tests may include tests that programmatically analyze the graphical program's block diagram for performance and style issues. For example, the block diagram may be analyzed for wiring style, loop and structure usage, unnecessary elements on the block diagram, etc. Exemplary block diagram tests for LabVIEW graphical programs are described below.

Documentation tests may include tests that programmatically analyze the graphical program for documentation issues. The graphical program may be analyzed for user documentation and/or developer documentation. For example, the graphical program analyzer may check for comments on the graphical program's block diagram, help text or descriptions for controls or graphical sub-programs, etc. Exemplary documentation tests for LabVIEW graphical programs are described below.

User interface tests (also referred to herein as front panel tests) may include tests that programmatically analyze the graphical program for user interface issues. For example, the graphical program's graphical user interface may be analyzed for design or style issues as well as functional issues. For example, the user interface may be analyzed or control usage, font selection, the presence of labels, etc. Exemplary front panel tests for LabVIEW graphical programs are described below.

General tests may include tests that programmatically analyze the graphical program for performance and style issues that do not fit into the other three categories. For example, the programmatic interface (e.g., input and output connectors or parameters) of the graphical program may be analyzed. Exemplary general tests for LabVIEW graphical programs are described below.

In one embodiment the graphical program analyzer may allow the user to customize or modify the analysis criteria used in programmatically analyzing the graphical program(s). For example, in an embodiment in which the graphical program analyzer performs different kinds of tests on the graphical program(s) such as described above, the graphical program analyzer may allow the user to select which tests to perform on the graphical program(s). This may enable the analysis to be customized according to the user's specific needs or according to the type of graphical program. As one example, if the graphical program does not have a visible graphical user interface displayed at runtime or if the user is not concerned with design issues for the graphical user interface then user interface tests may be excluded from the analysis.

Figure 8:
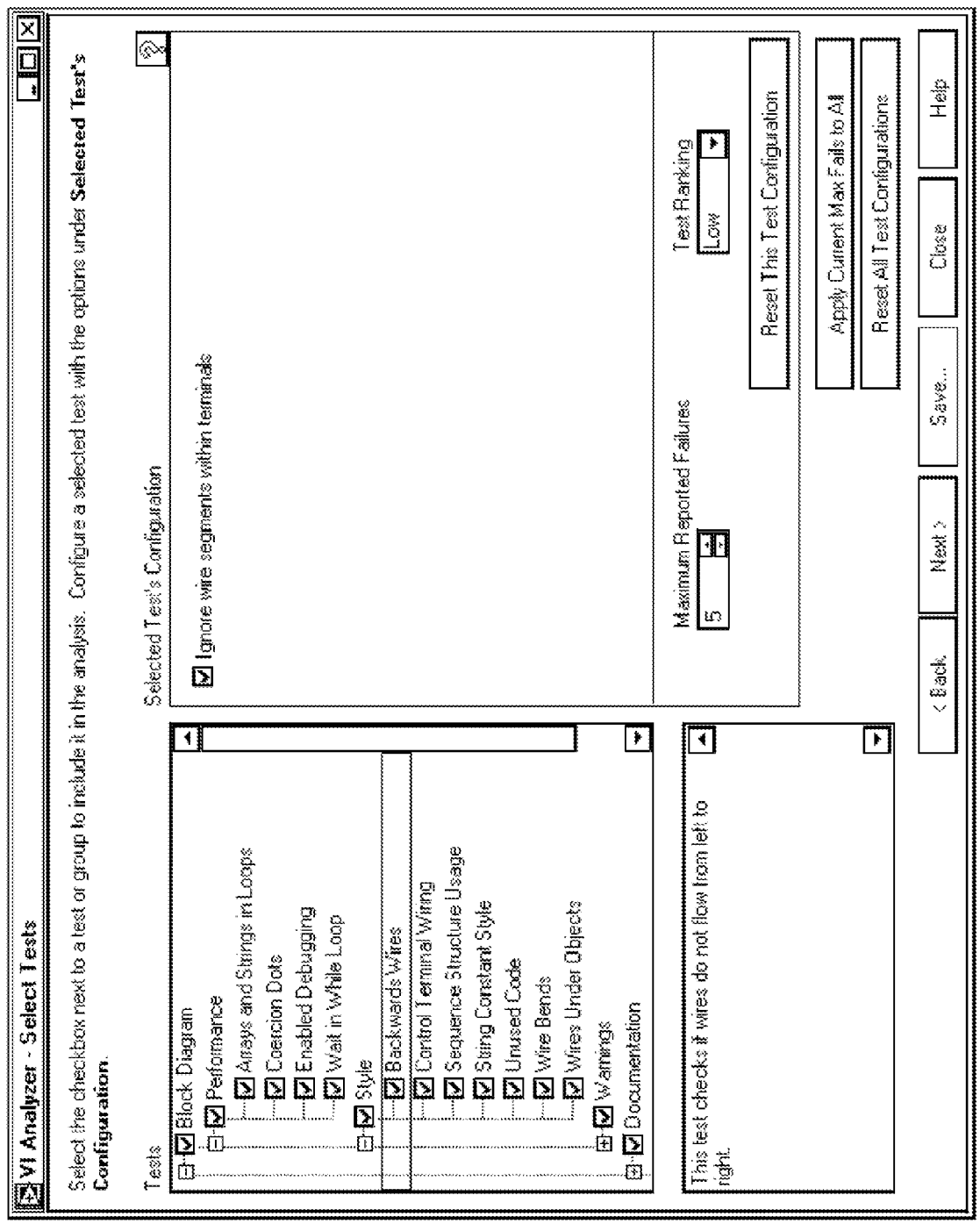

FIG. 8 illustrates an exemplary GUI panel for selecting tests to be performed in the analysis of the graphical program(s) selected by the user. In this example the tests are organized into block diagram, documentation, front panel, and general tests as described above. The user may expand or collapse the categories as desired by clicking the "+" or "−" signs by each one. In FIG. 8, the user has expanded the "Block Diagram" category to display block diagram tests. As shown, the block diagram category is further broken down into "Performance", "Style", and "Warnings" sub-categories. In FIG. 8, the "Performance" and "Style" sub-categories have been expanded. The user may check or uncheck the box beside each test to include or exclude the test from the analysis.

In one embodiment the graphical program analyzer may be operable to display a description or help text for each test to inform the user of how the test analyzes the graphical program. In the example of FIG. 8, the text box in the bottom left of the GUI panel is updated with test descriptions as the user selects various tests from the "Test" list box at the top left. In this example, the user has selected the "Backwards Wires" test item. The illustrated test description informs the user that this test checks for wires that do not flow from left to right. (In LabVIEW, the convention is for data flow to be indicated in the block diagram in a left to right manner.)

In one embodiment, one or more of the available tests may have configurable options or parameters, and the graphical program analyzer may allow the user to adjust the options or parameters. For example, the GUI panel of FIG. 8 includes an area on the right side labeled "Selected Test's Configuration". When the user selects a test in the "Test" list box on the left, this area may be updated to display GUI controls that allow the user to specify options or set parameters relevant to the test. For example, in FIG. 8 the user may select an option to specify that wire segments within terminals should be ignored for the "Backwards Wires" test. The options or parameters set by the user for each test may affect whether the graphical program passes or fails the test.

Figure 9:
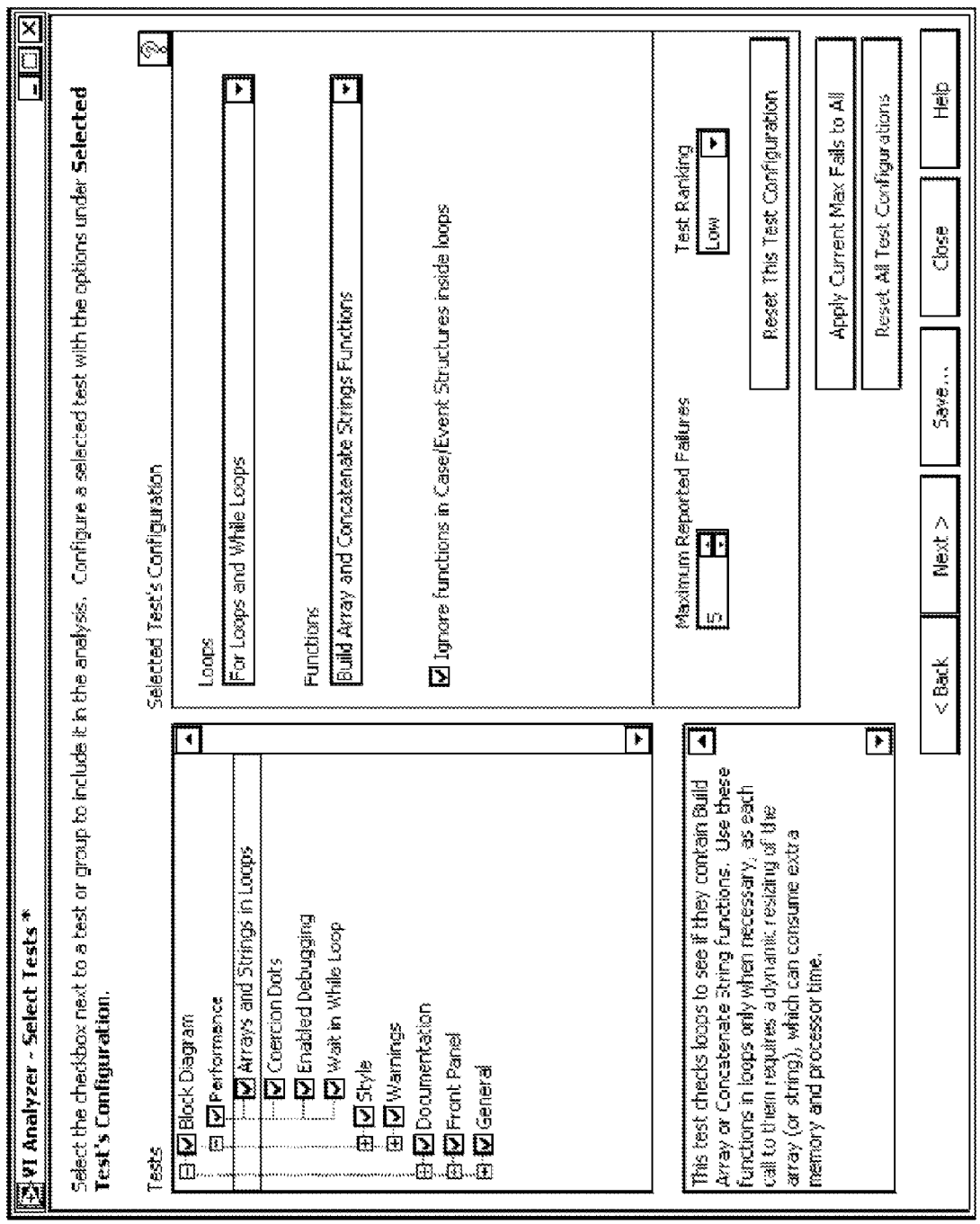

FIG. 9 illustrates another example in which the user has selected an "Arrays and Strings in Loops" test. This test analyzes the graphical program to determine whether expensive Build Array and Concatenate Strings functions are used within loops. The user may utilize the GUI controls on the right to specify which kinds of loops to perform this test for (e.g., for loops and/or while loops) and which functions to check for (e.g., array and/or string functions). The user may also select an option to ignore the presence of the selected functions if they are inside case structures or event structures in loops.

As described below, in one embodiment the graphical program analyzer may be operable to generate a report or display results after the graphical program(s) have been analyzed. In one embodiment the user may also be able to specify options for each test that relate to the reporting. For example, as shown in FIGS. 8 and 9, the user may set a "Maximum Reported Failures" parameter to specify a maximum number of times that failure occurrences of the selected test should be included in the report or the displayed results. The user may also set a "Test Ranking" parameter (e.g., low or high) that controls the ordering for the report. For example, failures for high-ranked tests may be shown in the report before failures for low-ranked tests.

Figure 10:
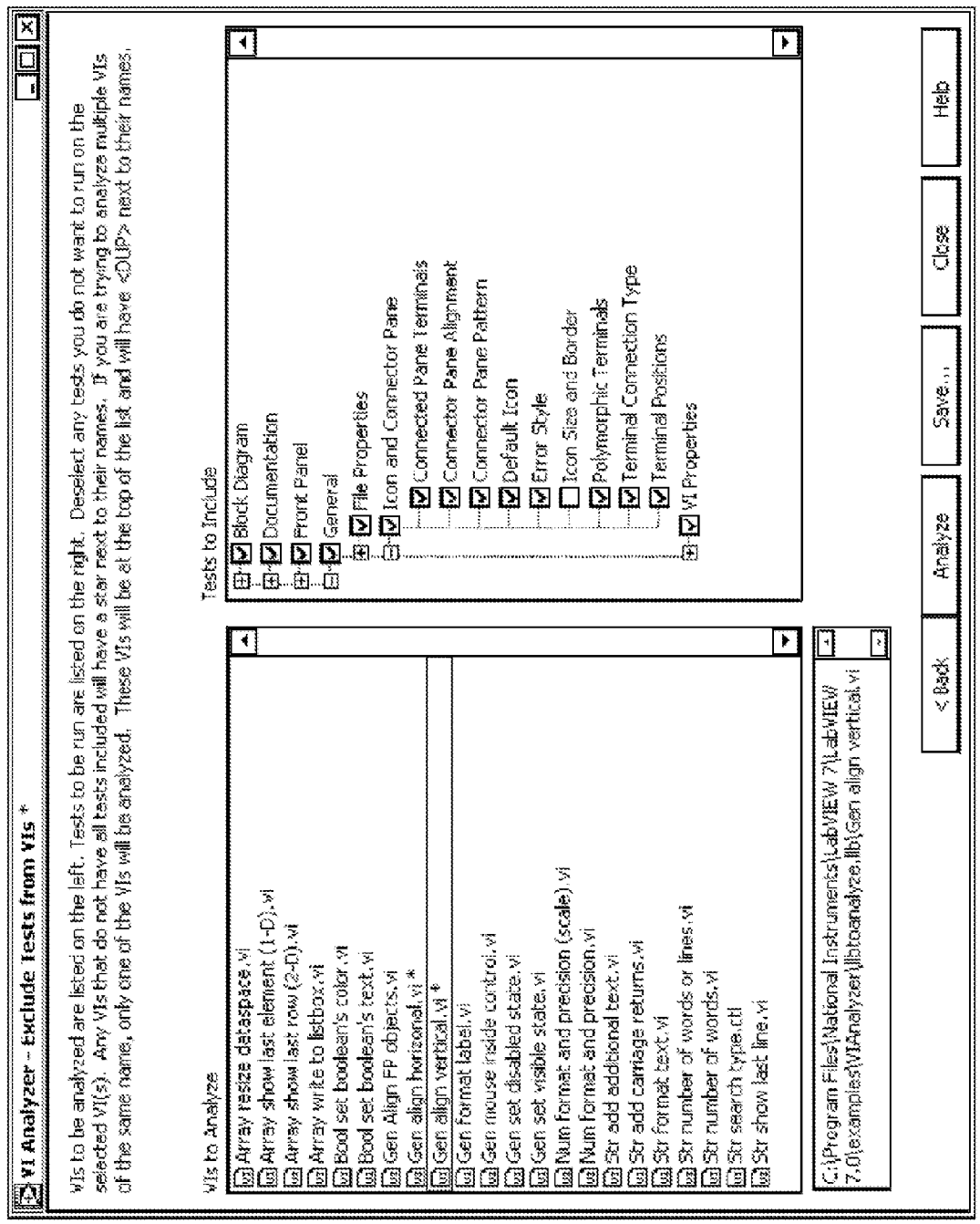

As described above, in one embodiment the user may select multiple graphical programs to be analyzed. In one embodiment, by default each of the graphical programs may be analyzed with the tests selected by the user. In another embodiment the user may be able to select different tests to perform for different graphical programs. For example, the GUI panel of FIG. 10 allows the user to customize the set of tests that are performed for each of the listed VIs. The tests previously selected by the user appear in the list box on the right. The user may select one or more of the VIs in the list box on the left and uncheck any tests that he does not want to be performed for those VIs.

In one embodiment the graphical program analyzer may allow the user to save an analysis configuration representing the input that the user has provided to the GUI of the graphical program analyzer. For example, the analysis configuration may specify information such as the graphical program(s) that were selected, whether graphical sub-programs should be analyzed, which tests to perform for which graphical programs, options or parameters for each test, etc. Saving the analysis configuration may enable the user to later re-use the same configuration to analyze other graphical programs or to re-analyze the same graphical programs without having to re-enter all the configuration input to the graphical program analyzer GUI. The graphical program analyzer may allow the user to save the analysis configuration at various points in the configuration input process. For example, the GUI panels of FIGS. 6-10 each have a "Save . . . " button that the user can click to save the analysis configuration. In various embodiments the analysis configuration may be stored in various ways. In one embodiment the analysis configuration may be stored in a configuration file.

After the user has provided input to the GUI of the graphical program analyzer to create an analysis configuration such as described above (or after a previously saved analysis configuration has been re-loaded and possibly modified), the user may request the graphical program analyzer to programmatically analyze the graphical program(s). For example, the GUI panel of FIG. 10 has an "Analyze" button that the user can click to start the analysis.

The graphical program analyzer may then programmatically analyze the graphical program(s) according to the criteria or tests specified by the user. Programmatically analyzing a graphical program may include any technique or method implemented by a program that inspects or examines the graphical program. For example, programmatically analyzing the graphical program may include analyzing one or more data structures that represent the graphical program. For example, the data structure(s) may be analyzed to determine graphical program elements (e.g., nodes, programmatic structures such as loops or case structures, user interface elements, etc.) present in the graphical program and/or to determine a relationship among these graphical program elements.

The graphical program analyzer may check for the presence of different kinds of graphical program elements or relationships among the elements, depending on which tests were selected by the user. As one example, where the user selected the "Arrays and Strings in Loops" test described above, the graphical program analyzer may analyze data structures representing the graphical program to determine whether the graphical program includes any loops. If so, each loop (or a data structure representing the loop) may be analyzed to determine whether array or string function nodes are included within the loop.

In one embodiment the graphical program analyzer may be operable to display information indicating results of the analysis after it has been completed. For example, the graphical program analyzer may display information indicating problems found (if any) in the graphical program(s). In an embodiment in which the graphical program analyzer performs selected tests on the graphical program(s) as described above, pass/fail results of the individual tests may be shown. The graphical program analyzer may also display other information such as statistics regarding the number of tests that were performed, the number or percentage that passed/failed, etc.

Figure 11:
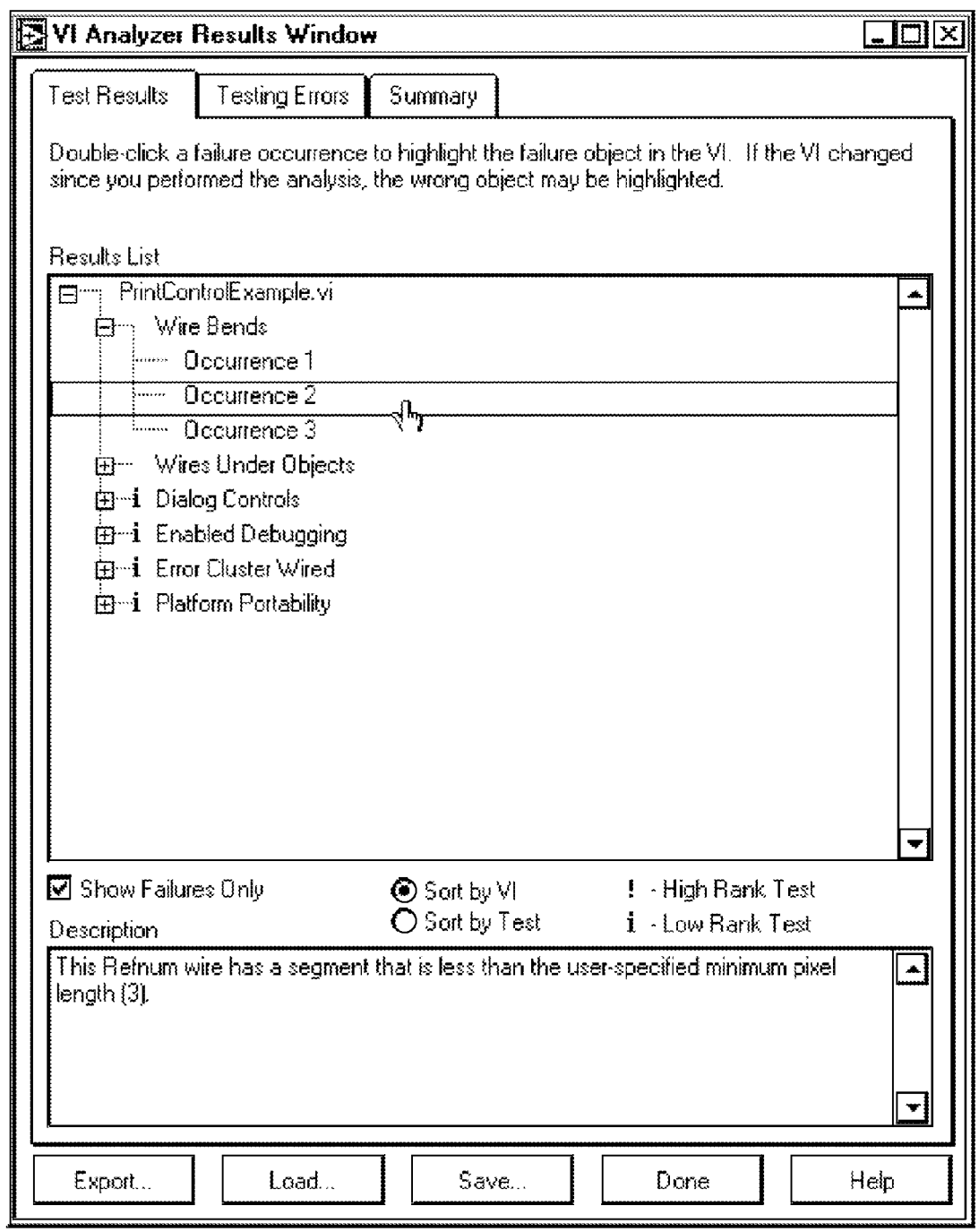

FIG. 11 illustrates an exemplary GUI panel indicating results of programmatically analyzing a graphical program named "PrintControlExample.vi". The GUI panel includes three tabs: "Test Results", "Testing Errors", and "Summary". In FIG. 11, the "Test Results" tab has been selected, causing the GUI panel to display results of the tests previously selected by the user in the "Results List" box. As shown, a "Show Failures Only" check box is checked so that only tests that failed one or more times are displayed.

In one embodiment, tests may be displayed according to a ranking. For example, each test may be ranked as a high, medium, or low ranking test. The GUI panel of FIG. 11 may display the high-ranking tests first, followed by the medium and then the low-ranking tests. Tests that involve issues that have a significant impact on the graphical program's performance or correctness may be ranked as high. Tests that involve minor style, cosmetic, or other issues that do not significantly affect the graphical program's performance may be ranked as low. Other tests may fall into the middle ranking area. In one embodiment each test may have a default ranking. As described above with reference to FIGS. 8 and 9, the user may also change the rankings for the tests if desired. In one embodiment, high-ranking tests may be marked in the GUI with an exclamation point, and low-ranking tests may be marked with an "i" symbol, allowing the user to easily distinguish the test rankings.

It is possible that each test may be performed and may fail multiple times during the analysis of a graphical program. In one embodiment, the user may be able to view each failure occurrence. (As described above, in another embodiment the user may specify a "Maximum Reported Failures" parameter to specify a maximum number of failure occurrences to report.) For example, in the GUI panel of FIG. 11, the user may click the "+" and "−" signs beside each test in the results list to expand or collapse the failure occurrences for that test.

Clicking on a particular failure occurrence shown under a test may cause the GUI panel to display text at the bottom of the panel to explain why the test failed for that occurrence. For example, the analysis results displayed in FIG. 11 indicate that three failure occurrences of the "Wire Bends" test were found. The user has selected the "Occurrence 2" item, and the text at the bottom informs the user that this occurrence corresponds to a wire that has a segment with a length less than a specified minimum pixel length. As described below, in one embodiment the graphical program analyzer may also be operable to automatically display the portion of the graphical program that failed the test.

Figure 12:
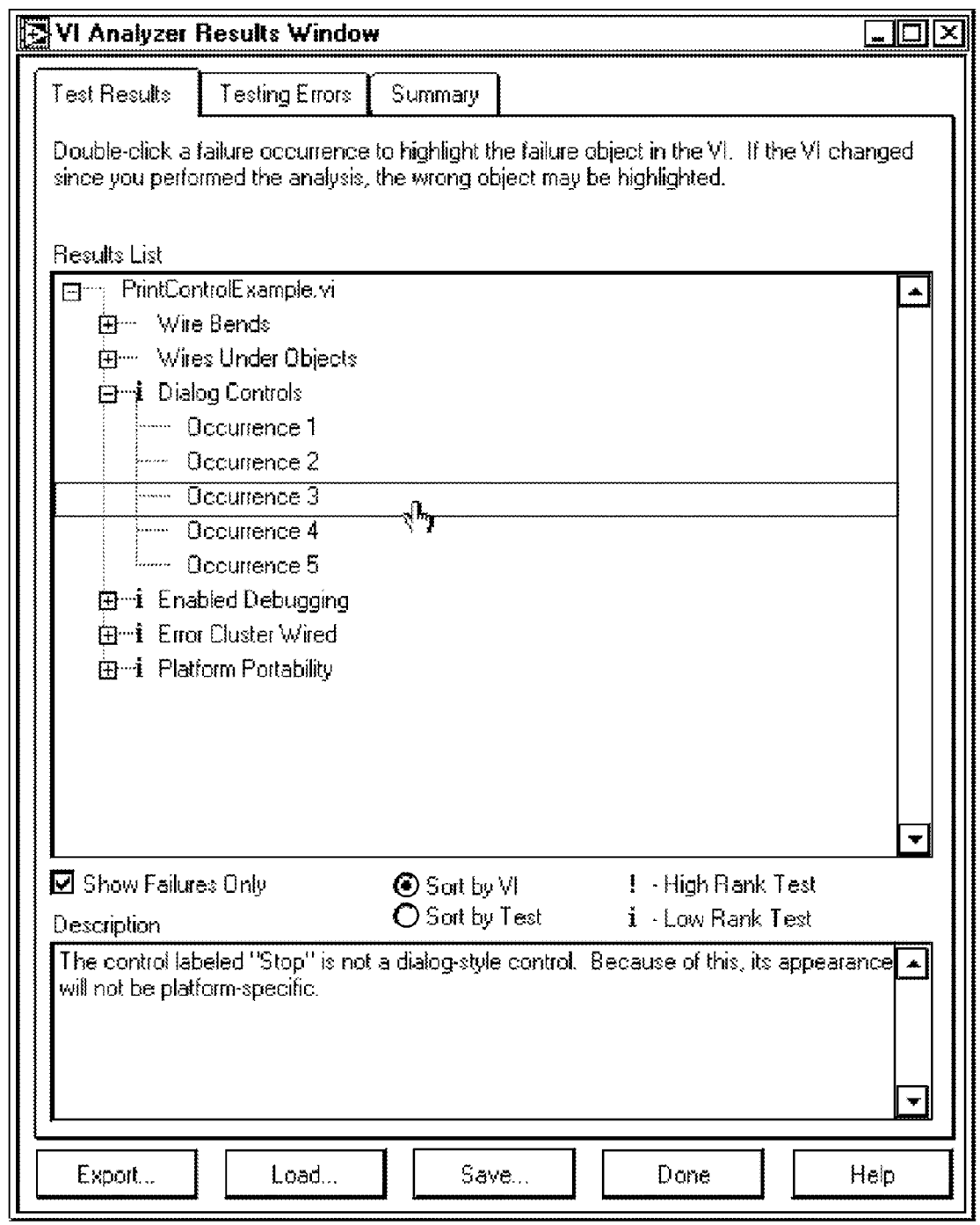

FIG. 12 illustrates another example of the GUI panel of FIG. 11, in which a failure occurrence of the low-ranked "Dialog Controls" test has been selected. As indicated by the failure description at the bottom of the GUI panel, the test failed in this case because a "Stop" control in the graphical program's user interface is not a dialog-style control, and thus its appearance is not platform-specific.

Figure 13:
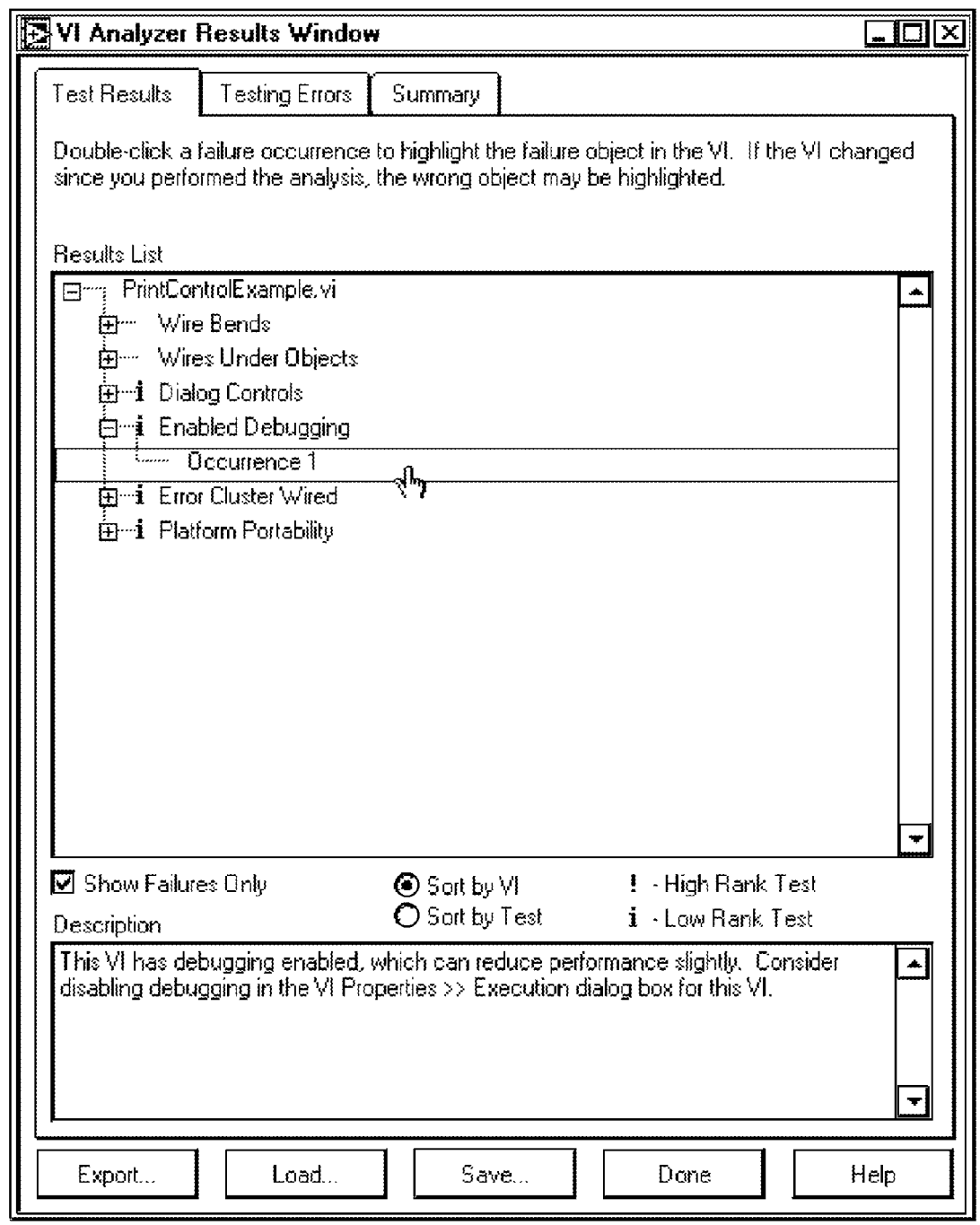

FIG. 13 illustrates another example in which a failure occurrence of the "Enabled Debugging" test has been selected. As indicated by the failure description at the bottom of the GUI panel, the test failed because debugging is currently enabled for the graphical program, which could slightly affect the graphical program's performance.

Figure 14:
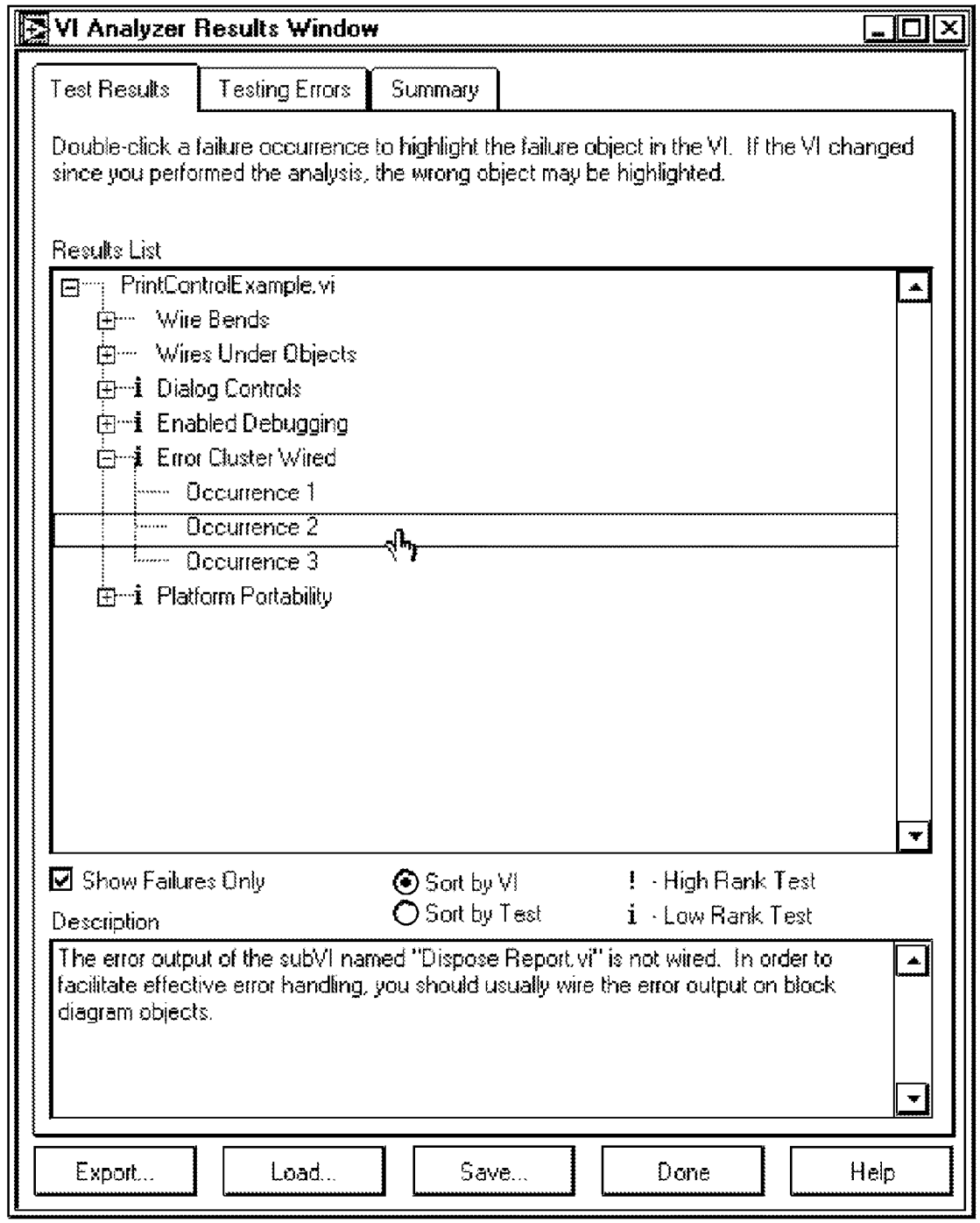

FIG. 14 illustrates another example in which a failure occurrence of the "Error Cluster Wired" test has been selected. As indicated by the failure description at the bottom of the GUI panel, the test failed in this case because an error output terminal of a graphical sub-program node in the graphical program is not wired to anything.

Figure 15:
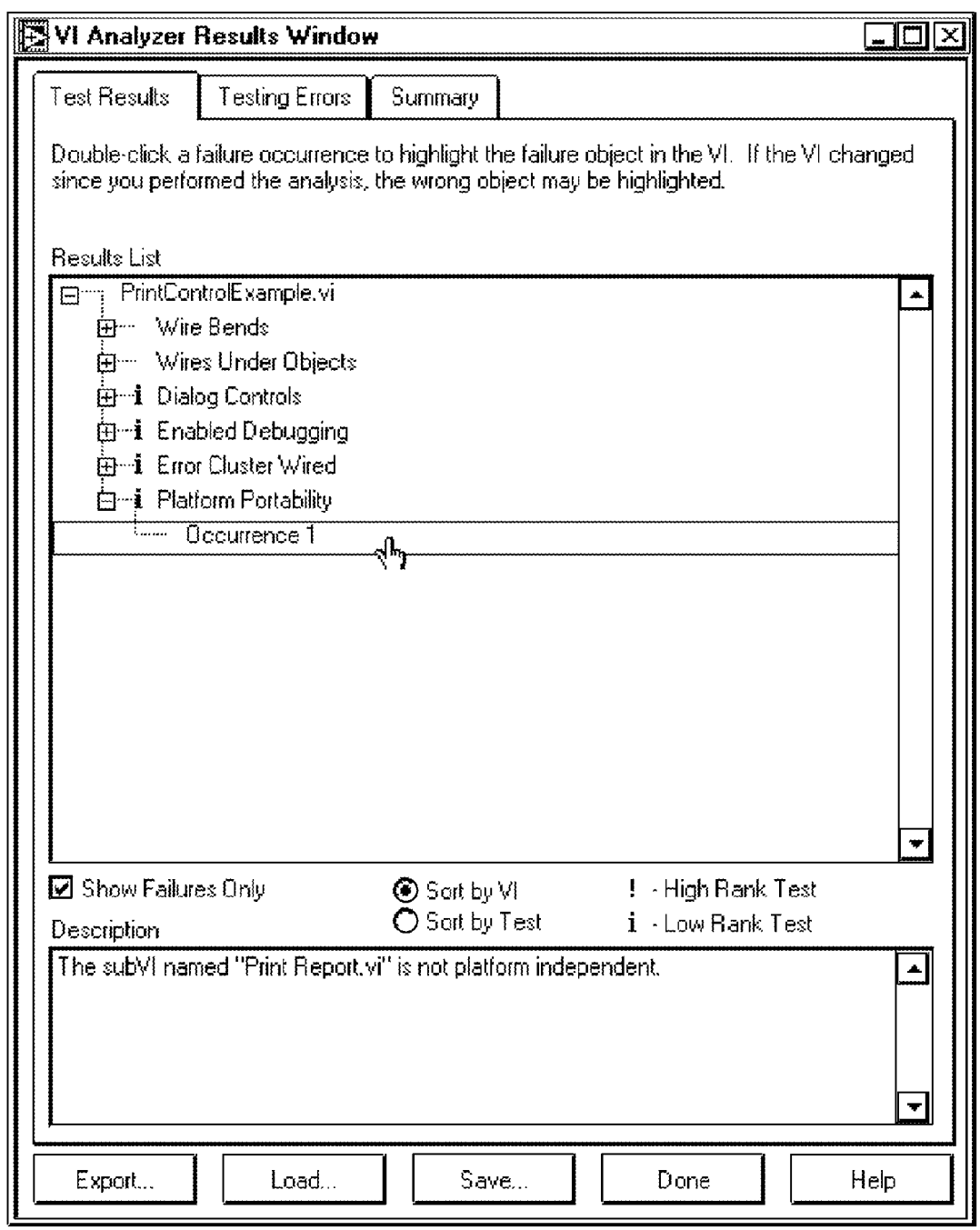

FIG. 15 illustrates another example in which a failure occurrence of the "Platform Portability" test has been selected. As indicated by the failure description at the bottom of the GUI panel, the test failed because the graphical program analyzer found a graphical sub-program used in the graphical program that is not platform independent.

In one embodiment the graphical program analyzer may also be operable to display portions of the graphical program that correspond to the displayed results of the analysis. For example, in one embodiment the graphical program analyzer may be operable to display the graphical program portion that corresponds to each failure occurrence of the tests that were performed. This may allow the user to easily correlate the analysis results with the graphical program itself.

In one embodiment the graphical program analyzer may display the portion of a graphical program that corresponds to a failure occurrence of a test by launching an editor window and bringing the relevant portion of the graphical program into view, e.g., by scrolling the editor window so that the relevant portion is visible. For example, if the failure occurrence represents a problem in the block diagram of the graphical program then the graphical program analyzer may open the block diagram in an editor window and automatically scroll the problem area into view. In one embodiment the graphical program analyzer may also highlight or call the user's attention to the relevant portion of the block diagram, e.g., may highlight one or more nodes, wires, or other objects in the block diagram that caused the test to fail. This may enable the user to easily identify and modify the problem area of the block diagram if desired.

Similarly, if a failure occurrence for a test represents a problem in the user interface of the graphical program then the graphical program analyzer may open the user interface in an editor window and automatically scroll the problem area into view. In one embodiment the graphical program analyzer may also highlight or call the user's attention to the relevant portion of the user interface, e.g., may highlight one or more user interface controls, indicators, or other objects in the user interface that caused the test to fail. This may enable the user to easily identify and modify the problem area of the user interface if desired.

Highlighting a graphical program portion that corresponds to a test failure occurrence may comprise displaying information or altering the appearance of the graphical program portion in any of various ways in order to call the user's attention to that portion of the graphical program. For example, the graphical program analyzer may alter the appearance of one or more nodes, wires, or other objects in a block diagram of the graphical program by changing their usual color, changing the color of the background behind them, drawing a border around them, causing them to blink, or providing any of various other kinds of visual cues to draw the user's attention to these objects or cause the objects to stand out from other objects in the block diagram. User interface objects in a user interface of the graphical program may be highlighted in a similar manner. In one embodiment the graphical program analyzer may also or may alternatively provide speech or audio cues to draw the user's attention to the relevant portion of the graphical program.

FIGS. 16-20 illustrate several examples in which the graphical program analyzer has displayed and highlighted different portions of a graphical program. These examples correspond to the test failure occurrences described above with reference to FIGS. 11-15. For example, as discussed above, FIG. 11 illustrates a failure occurrence of the "Wire Bends" test, in which the graphical program analyzer found a wire having a segment with a length less than a specified minimum pixel length. In one embodiment the user may request the graphical program analyzer to display the corresponding wire in the block diagram of the graphical program by double-clicking on the failure occurrence in FIG. 11, e.g., by double-clicking on the "Occurrence 2" item in the "Results list" box. In other embodiments the user may request the graphical program analyzer to display the corresponding portion of the graphical program in other ways, e.g., by clicking a button, selecting a menu item, etc., or the graphical program analyzer may automatically display the corresponding portion of the graphical program when the user selects a failure occurrence in the displayed results of the analysis.

Figure 16:
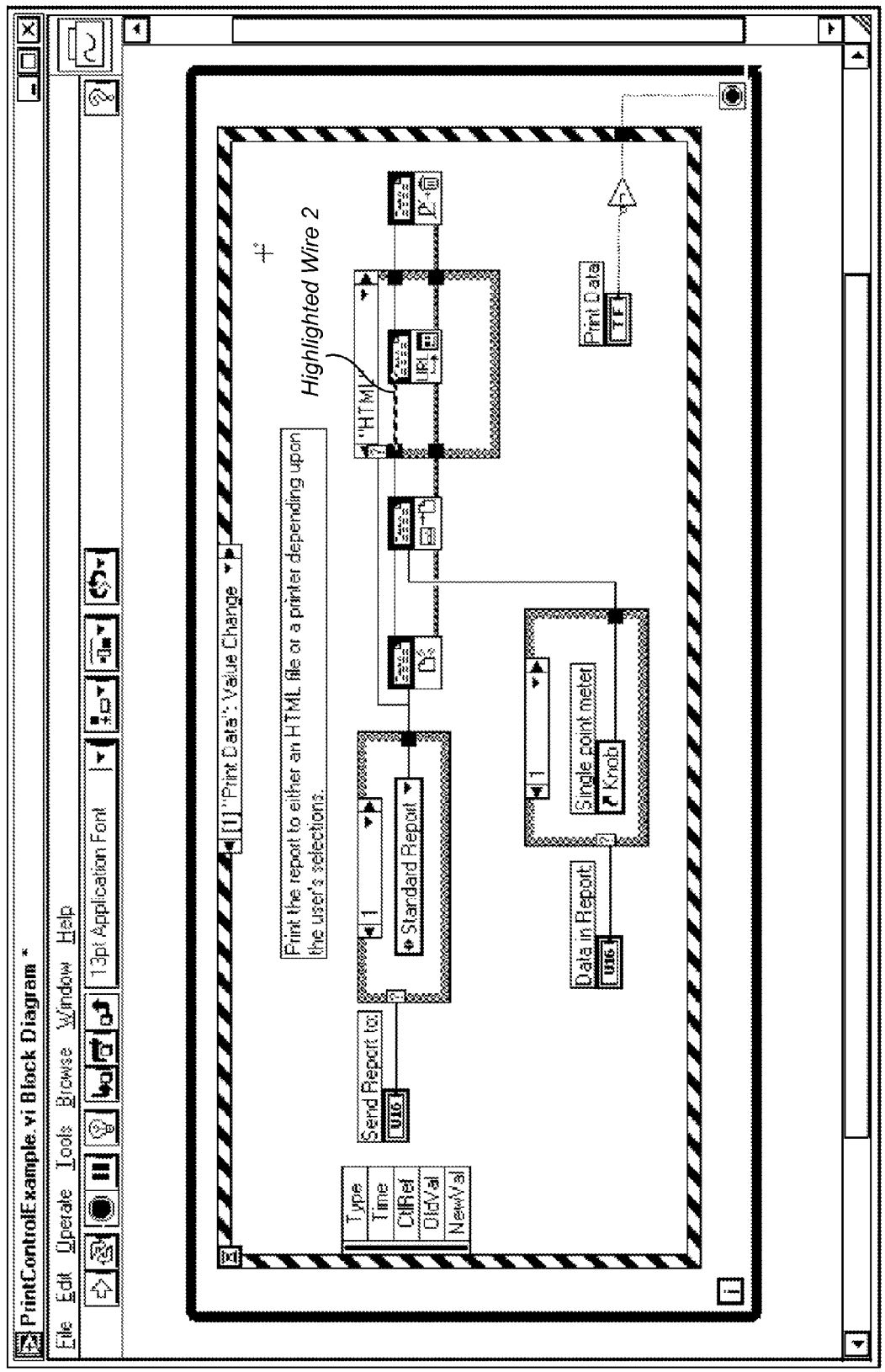

In response to the user requesting to view the portion of the graphical program that corresponds to the failure occurrence shown in FIG. 11, the graphical program analyzer may open the block diagram of the graphical program in an editor window and highlight the wire that has the segment that is less than the specified minimum pixel length, as shown in FIG. 16. As shown, the highlighted wire 2 is visually indicated with a thick dashed border. (On a computer display, the border may also circulate or march around the wire to help draw the user's attention.)

Figure 17:
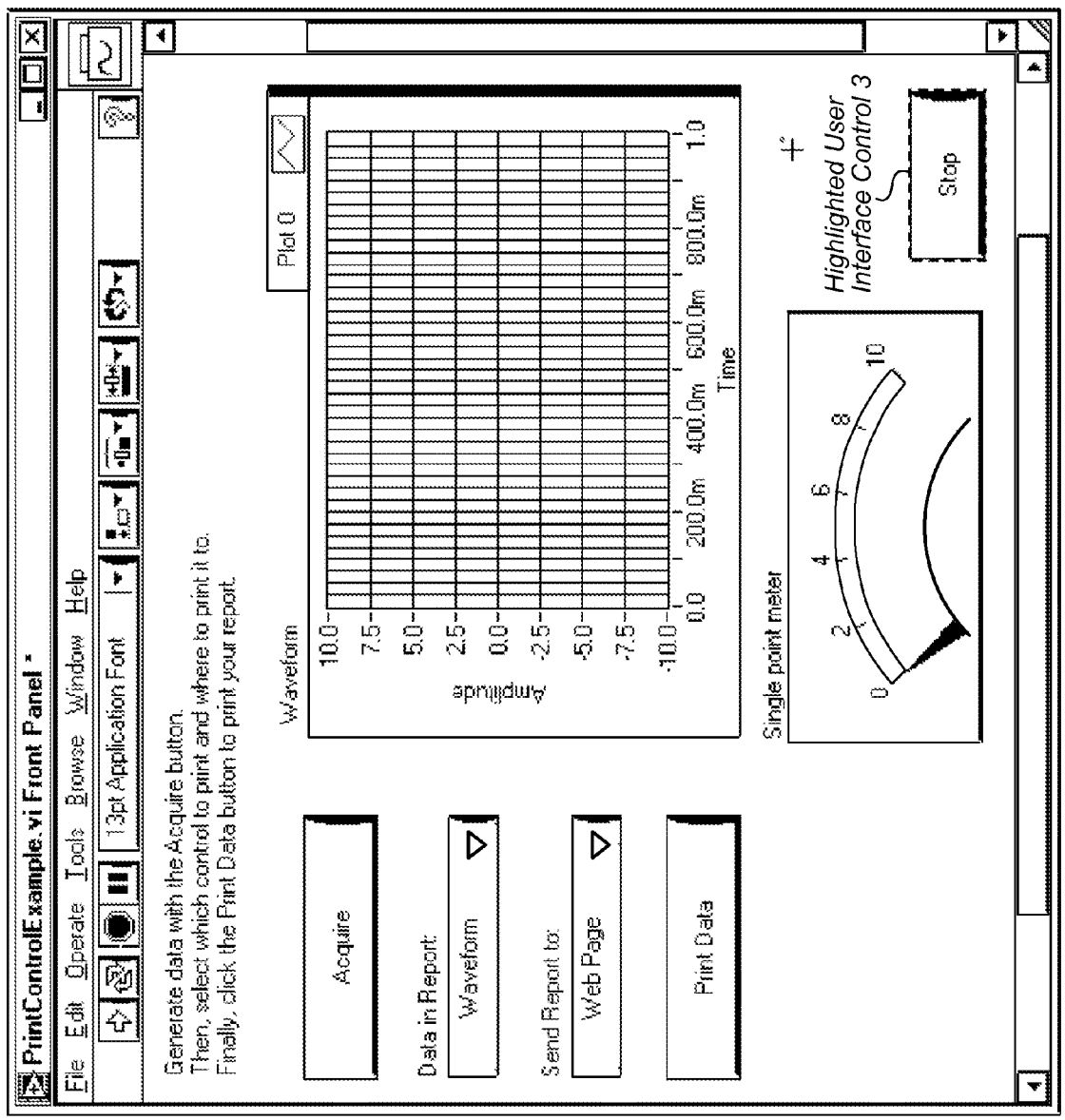

The highlighted user interface control 3 labeled "Stop" in FIG. 17 corresponds to the failure occurrence selected in FIG. 12. As discussed above, this failure occurrence represents a warning regarding the "Stop" control in the graphical program's user interface. In response to the user requesting to view the portion of the graphical program that corresponds to this failure occurrence (e.g., by double-clicking on the selected "Occurrence 3" item in FIG. 12 with a mouse device), the graphical program analyzer may open the user interface of the graphical program in an editor window and highlight the user interface control 3 labeled "Stop", as shown in FIG. 17. As shown the user interface control 3 is highlighted with a thick dashed border.

Figure 18:
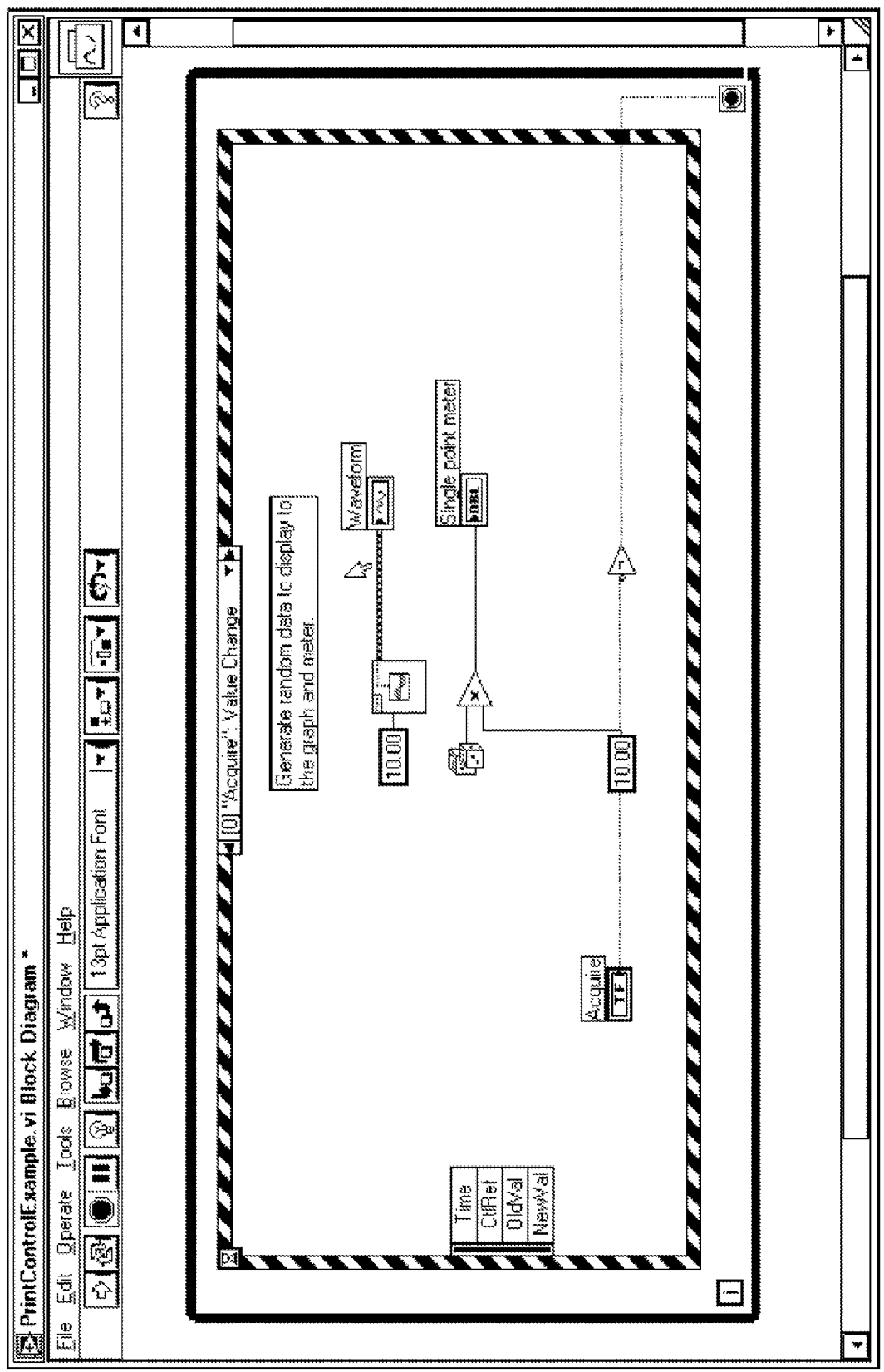

As discussed above, the failure occurrence selected in FIG. 13 represents a warning regarding the graphical program as a whole and not any specific object in the graphical program. In FIG. 18, the graphical program analyzer has highlighted the entire block diagram of the graphical program by inverting colors in the block diagram.

Figure 19:
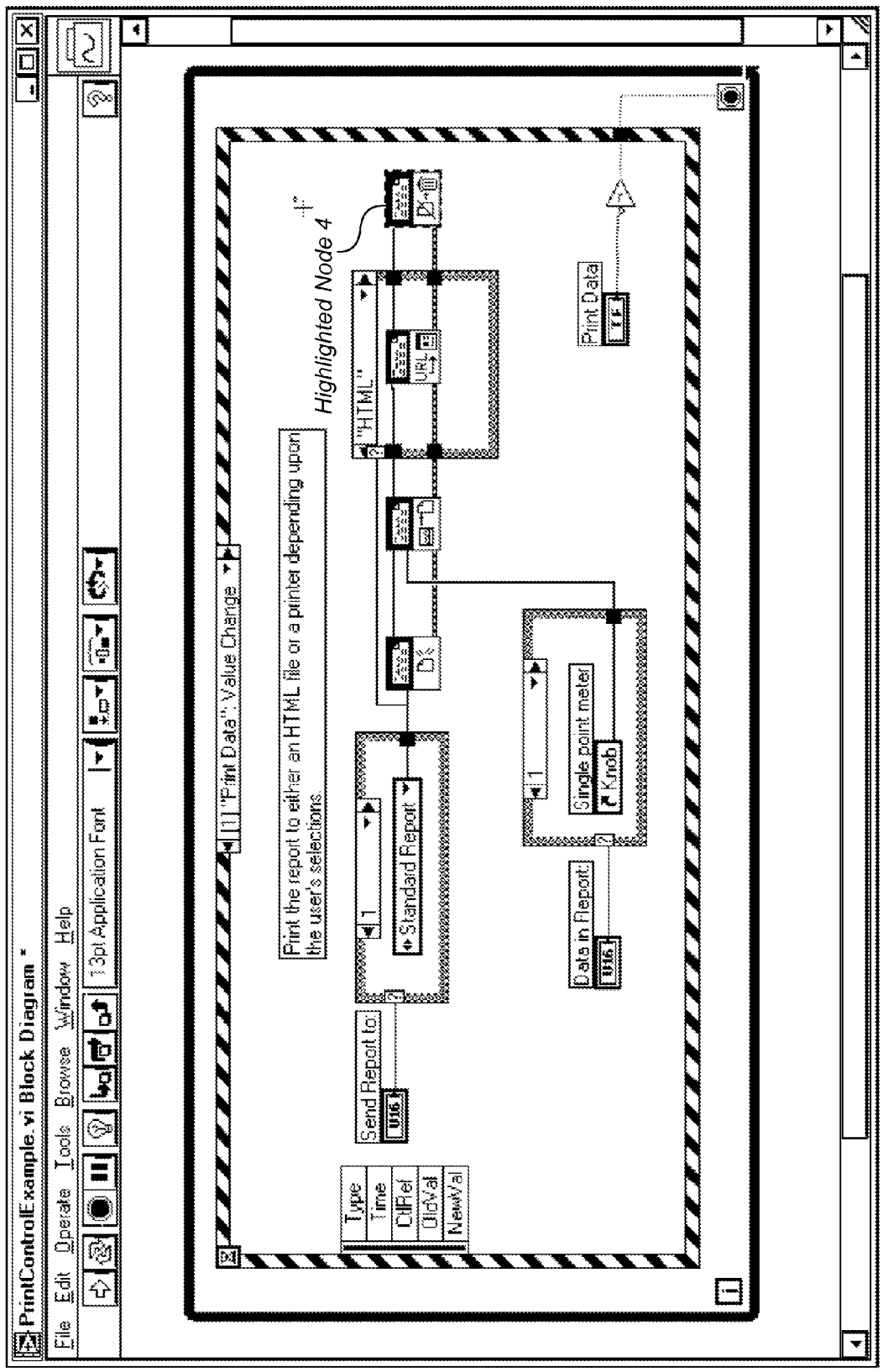

The highlighted graphical sub-program node 4 in FIG. 19 corresponds to the failure occurrence selected in FIG. 14. As discussed above, this failure occurrence represents a warning that the error output terminal of the node is not connected to anything. In FIG. 19, the graphical program analyzer has highlighted the graphical sub-program node 4 by drawing a thick dashed border around the node.

Figure 20:
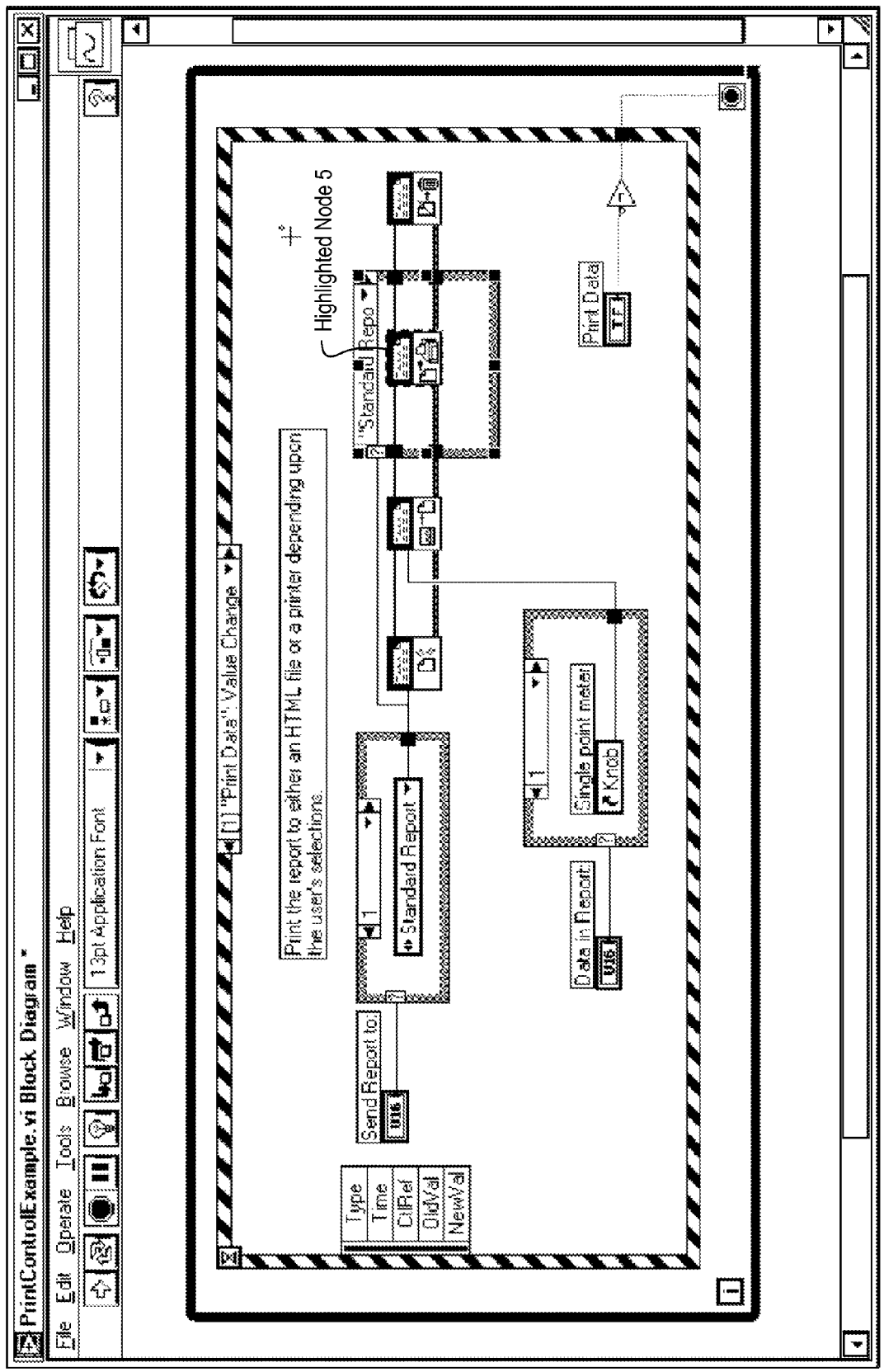

The highlighted graphical sub-program node 5 in FIG. 20 corresponds to the failure occurrence selected in FIG. 15. As discussed above, this failure occurrence represents a warning that the graphical sub-program represented by the node 5 is not platform independent. In FIG. 20, the graphical program analyzer has highlighted the graphical sub-program node 5 by drawing a thick dashed border around the node.

In another embodiment, in addition to highlighting the graphical program portion that corresponds to a test failure occurrence, the graphical program analyzer may also be operable to display one or more suggestions for how to modify the graphical program to correct the problem. In one embodiment, the graphical program analyzer may also be operable to automatically modify the graphical program to correct the problem if desired by the user. For example, the user may click a button or provide other input requesting the graphical program to be modified. The graphical program analyzer may then programmatically modify the graphical program to eliminate the problem. In various embodiments, the graphical program may be programmatically modified in any way, depending on the nature of the test that failed. As one example, if the graphical program analyzer found a wire that does not adhere to a left-to-right dataflow convention, the graphical program analyzer may programmatically re-position one or more nodes or other objects in the graphical program so that the wire is re-drawn to indicate dataflow in a left-to-right manner.

The analysis results shown above in FIGS. 11-15 represent an example where the graphical program analyzer programmatically analyzed a single graphical program. As described above, in one embodiment the user may select multiple graphical programs to be analyzed. For example, the user may select multiple top-level graphical programs to be analyzed or may select one or more top-level graphical programs and specify that graphical sub-programs in the top-level graphical program(s) should also be analyzed.

Figure 21:
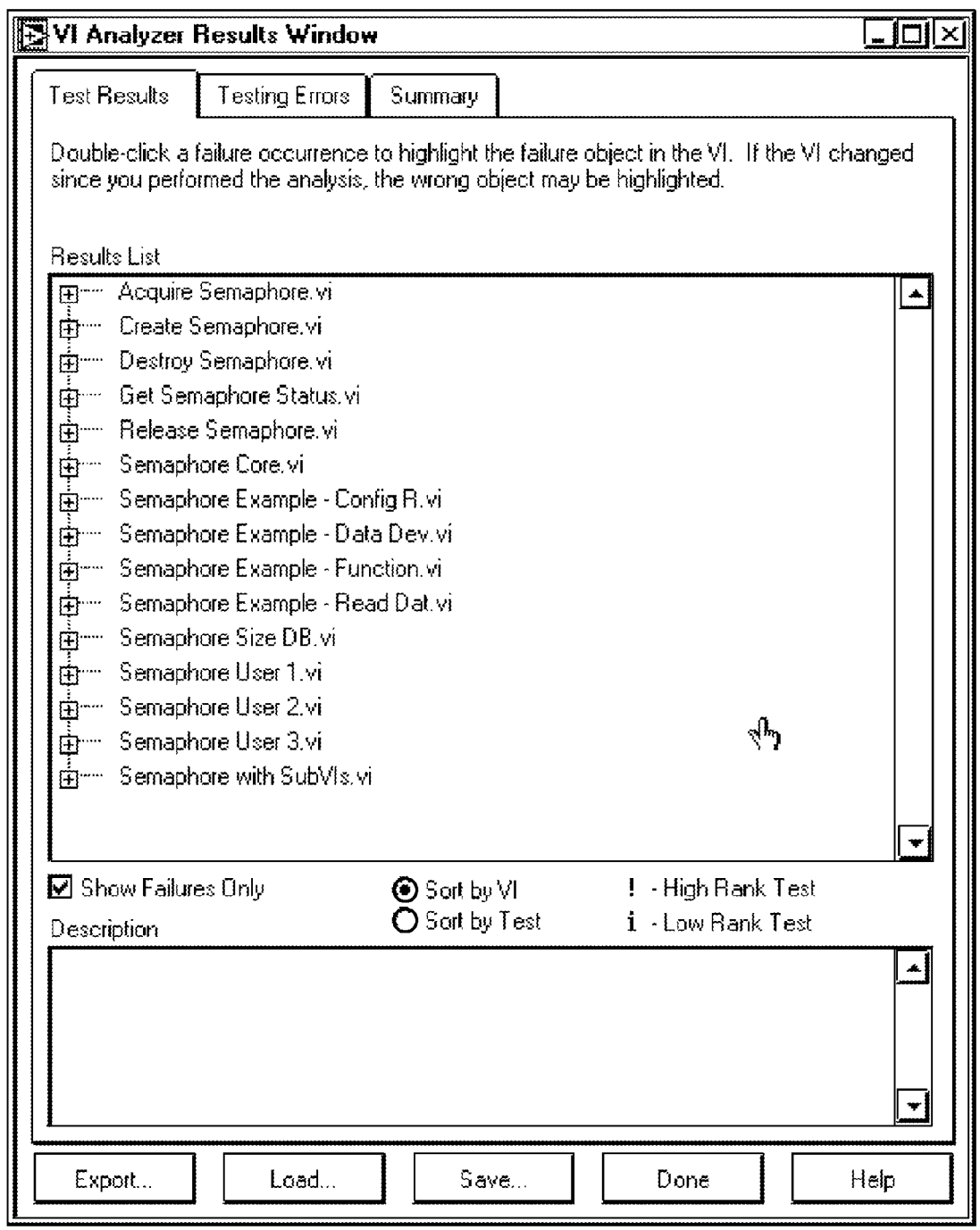

FIG. 21 illustrates an exemplary GUI panel displaying results for a plurality of graphical programs that were programmatically analyzed. As shown, the GUI panel provides the user with options to sort the test results by "VI" or by "Test". In FIG. 21, the results are sorted by VI or graphical program. Thus, the user may click the "+" and "−" signs beside each graphical program to expand and collapse a list of tests for the graphical program. In this example, the "Semaphore with SubVIs.vi" graphical program is a top-level graphical program (i.e., is not a graphical sub-program of another graphical program), and the other graphical programs shown in the list are graphical sub-programs of the "Semaphore with SubVIs.vi" graphical program. In another embodiment, the results list may utilize hierarchical ordering, indentation, or other features to signify the hierarchical relationship between graphical programs and their sub-programs.

Figure 22:
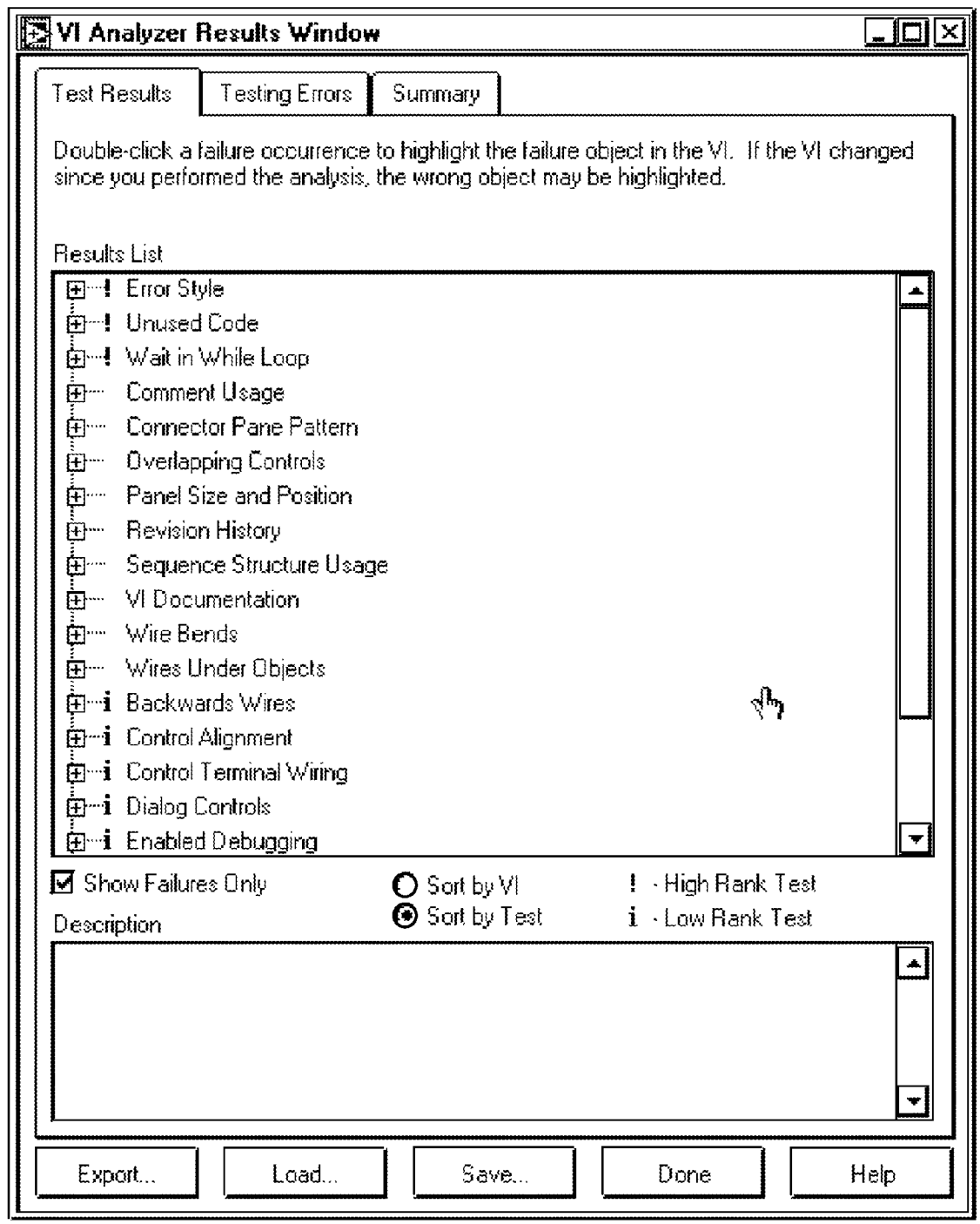

FIG. 22 illustrates the same analysis results, where the results are sorted by test. Thus, the user may click the "+" and "−" signs beside each test to expand and collapse a list of graphical programs for the test, e.g., a list of graphical programs for which the graphical program analyzer found one or more failure occurrences of the test.

Figure 23:
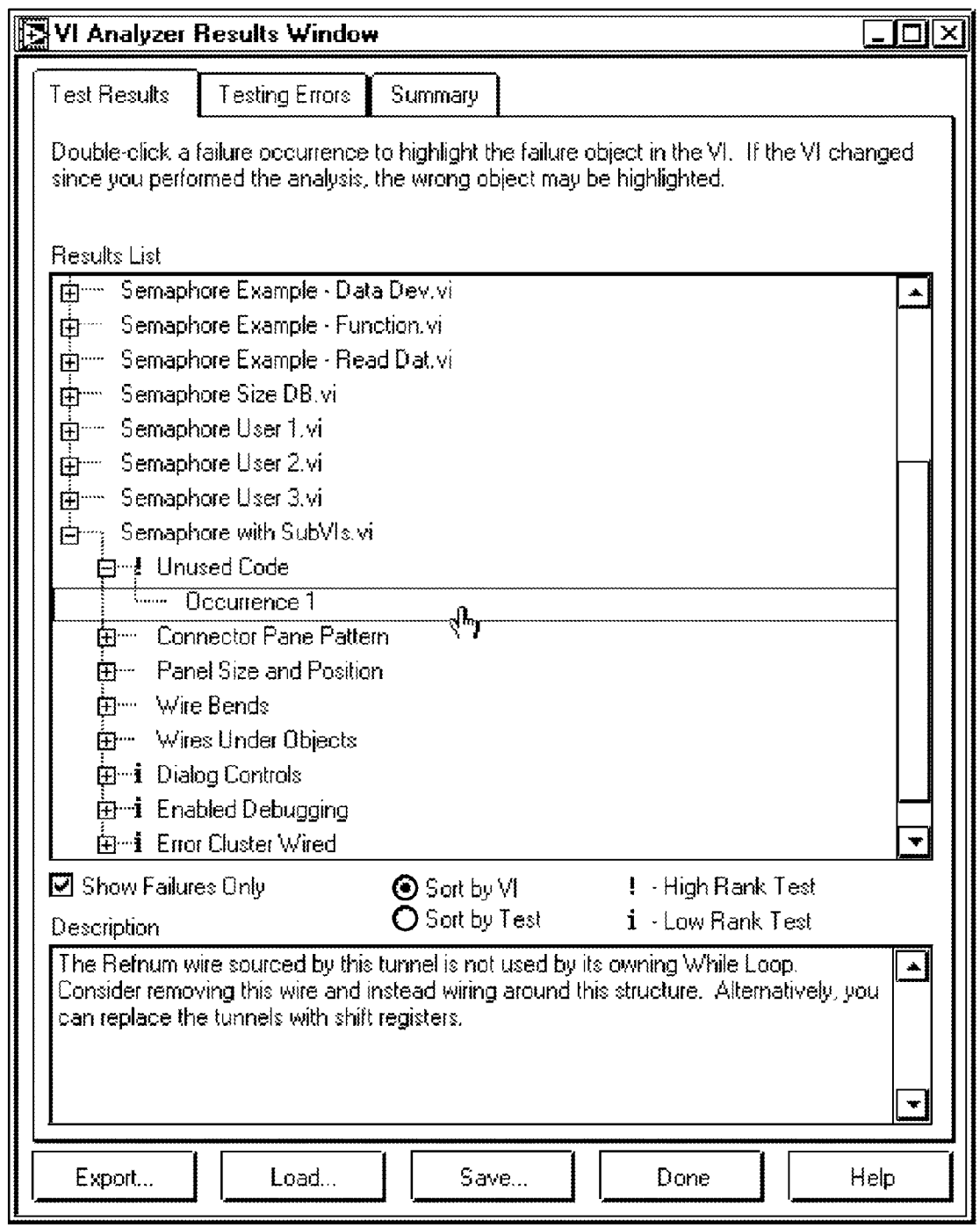
Figure 24:
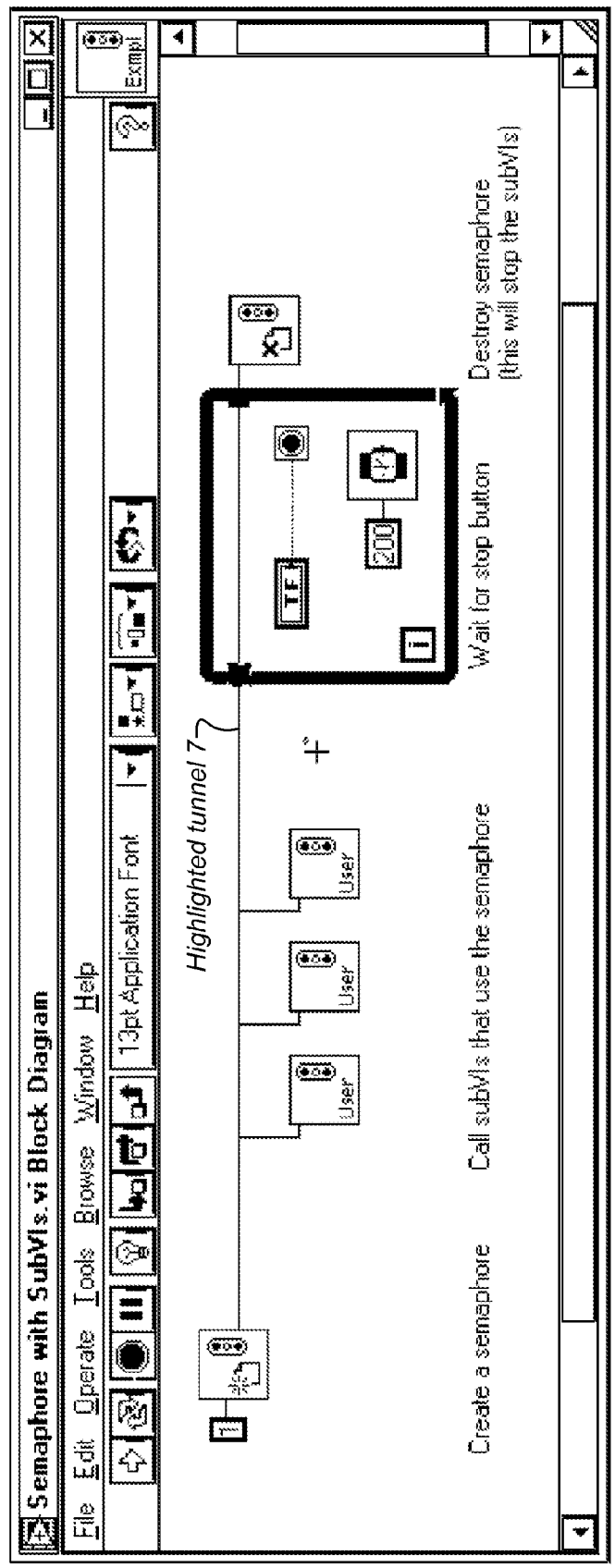

In FIG. 23, the user has selected a failure occurrence of an "Unused Code" test in the top-level "Semaphore with SubVIs.vi" graphical program. As shown in the description at the bottom of the GUI panel, the test failed in this case because a wire in the block diagram of the top-level graphical program that is sourced by a tunnel is not used by its owning While loop. In this example, the description of the failure occurrence also includes suggestions for how the block diagram may be modified. The user may double-click the selected "Occurrence 1" item in the "Results list" box to request the graphical program analyzer to display the problem area of the block diagram, as described above. FIG. 24 illustrates the top-level graphical program's block diagram with the While loop's tunnel 7 highlighted.

Figure 25:
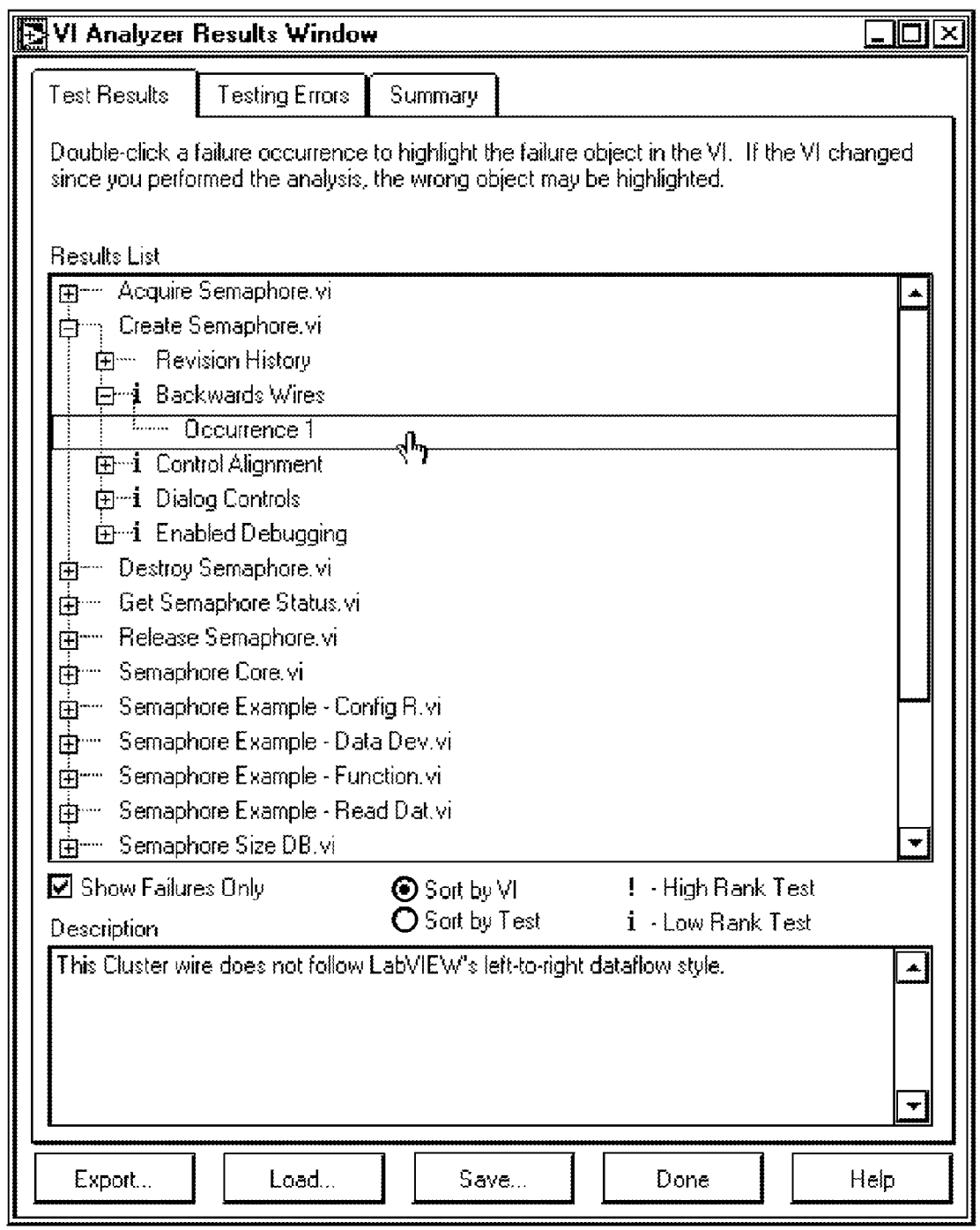
Figure 26:
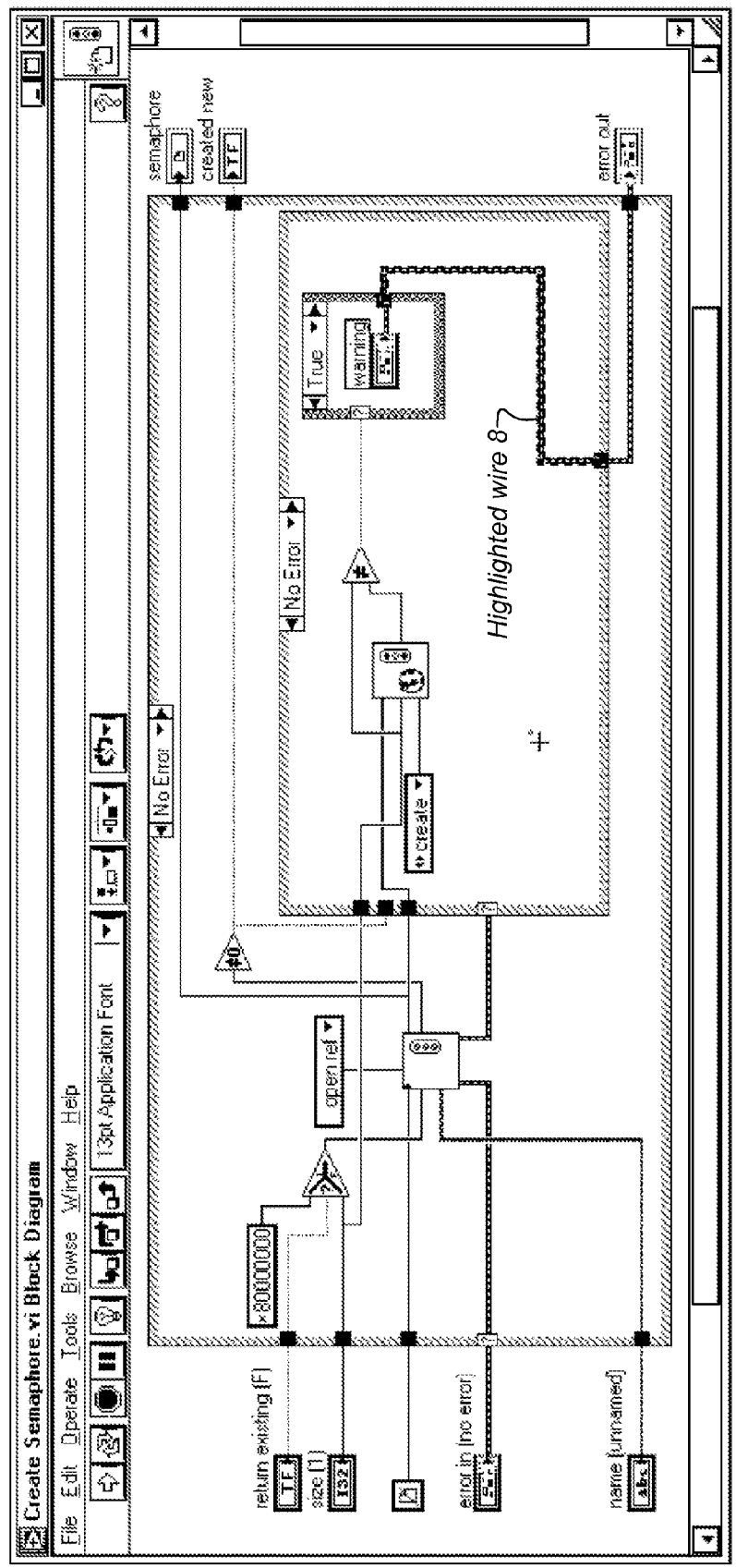

In FIG. 25, the user has selected a failure occurrence of a "Backwards Wires" test in the "Create Semaphore.vi" graphical sub-program. As noted above, "Create Semaphores.vi" is a graphical sub-program of the top-level "Semaphore with SubVIs.vi" graphical program. As shown in the description at the bottom of the GUI panel, the test failed in this case because a wire in the block diagram of the graphical sub-program does not follow LabVIEW's left-to-right dataflow style. The user may double-click the selected "Occurrence 1" item in the "Results list" box to request the graphical program analyzer to display the problem area of the block diagram, as described above. FIG. 26 illustrates the graphical sub-program's block diagram with the backwards wire 8 highlighted. Thus, in one embodiment the graphical program analyzer may be operable to not only automatically display problematic portions in a top-level graphical program but may also open graphical sub-programs in which problems were found during the analysis and display/highlight the problematic portions in the graphical sub-programs.

Figure 27:
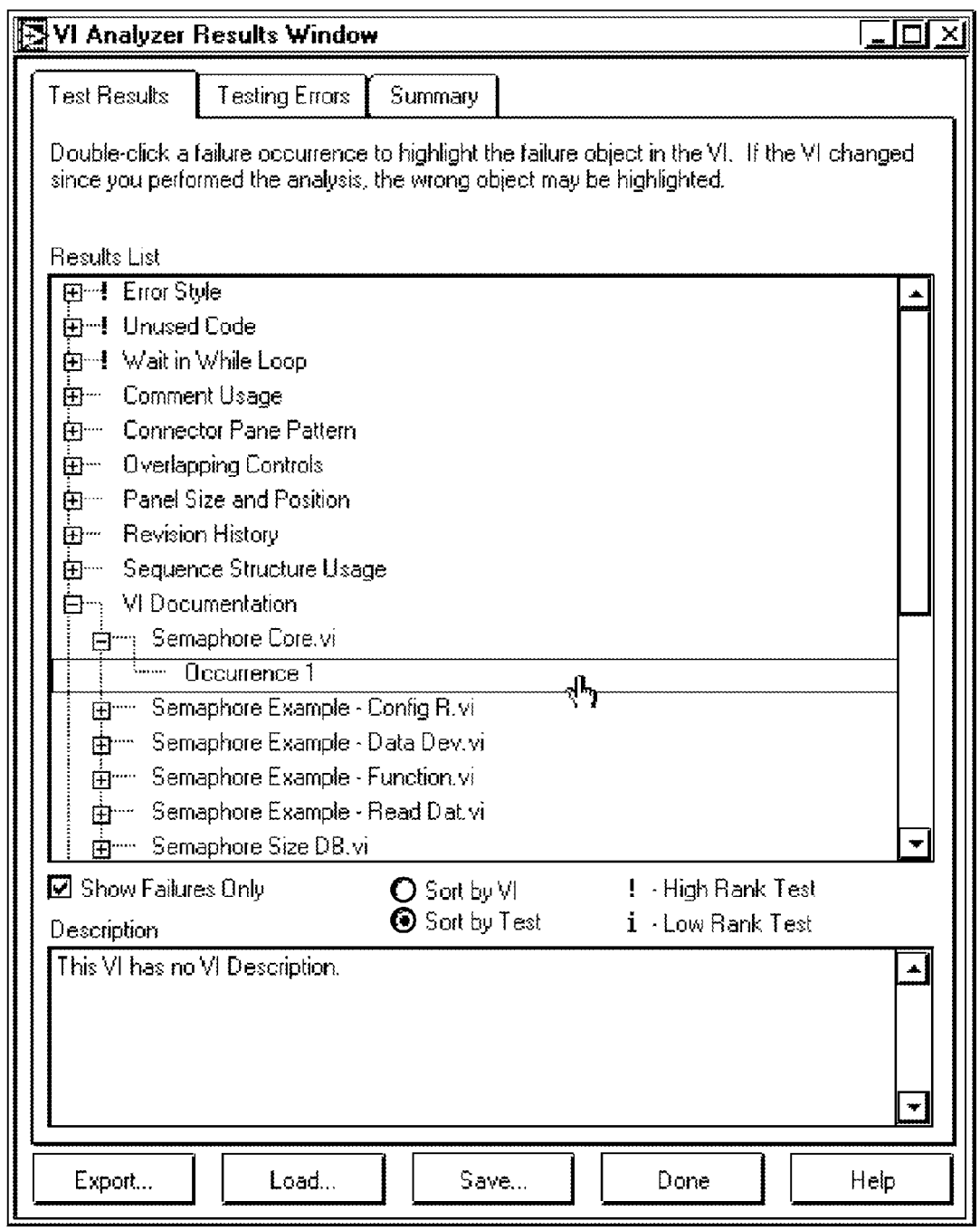

The examples discussed above illustrated exemplary problems found in the block diagram and user interface of various graphical programs. As described above, in one embodiment the graphical program analyzer may also be operable to analyze a graphical program to determine whether the graphical program includes various kinds of documentation. FIG. 27 illustrates an exemplary GUI panel in which a failure occurrence for a "VI Documentation" test is selected. As shown in the description at the bottom of the GUI panel, the test failed in this case because the VI has no VI description.

In one embodiment, the graphical program analyzer may be operable to generate a report or file based on the results of programmatically analyzing one or more graphical programs. In various embodiments the report or file may include any kind of information regarding an analysis that was performed on the graphical program(s). For example, the report or file may include information such as the names of the graphical programs that were analyzed, the tests that were performed, failure occurrences for the tests, etc. The report or file may also include summary information such as the number of times each test was performed, the number or percentage of failure occurrences, the time it took to programmatically analyze the graphical program(s), etc.

The report or file may also be organized or stored in any desired way or according to any desired file or report standard. For example, the graphical program analyzer may be operable to store a report as an ASCII file, an HTML file, or in a proprietary file format that can be imported into another software application. In one embodiment the graphical program analyzer may also be operable to save a report file that can later be re-loaded into the graphical program analyzer so that the analysis results can be re-displayed and the user can interactively see the correlation between failure occurrences and the respective graphical program portions, as described above.

The exemplary GUI panel described above for showing analysis results includes an "Export . . . " button (e.g., as shown in FIG. 27) that the user can click to invoke a dialog for specifying a report file to save. The user may specify a path for the report file, as well as options specifying a desired format (e.g., HTML or ASCII), a desired sorting order for the results (e.g., by graphical program or by test), etc. The user may also be able to specify what information to include in the report file, e.g., by checking or unchecking boxes such as "Summary Data", "Failed Tests", "Errors", etc.

API for Analyzing a Graphical Program

In another embodiment, instead of interacting with a graphical program analyzer tool as described above, the user may create a program operable to programmatically analyze one or more graphical programs. For example, in one embodiment an application programming interface (API) for programmatically analyzing a graphical program may be provided. For example, the API may be associated with or provided by an application development environment (ADE) or may be available as an add-on to the ADE.

In various embodiments the user may be able to create any kind of program to analyze the graphical program. In one embodiment the program that performs the analysis of the graphical program may comprise a text-based program, i.e., a program written in a text-based programming language such as C, C++, Visual C++, Java, Visual Basic, etc. For example, an API that includes various functions or methods related to performing programmatic analysis of a graphical program may be provided, and the user may include various function and method calls in the text-based program.

In another embodiment the program that performs the analysis of the graphical program may itself comprise a graphical program. For example, a graphical programming API that includes various function nodes or other graphical program objects related to performing programmatic analysis of a graphical program may be provided. The user may include various function nodes or objects from the API in a graphical program and may interconnect the function nodes with other nodes in the graphical program to visually indicate the desired analysis functionality. The user may also provide the graphical program with references to one or more target graphical programs so that the graphical program executes to programmatically analyze the target graphical program(s). The user may also include function nodes operable to perform functions such as displaying results from the programmatic analysis or generating a report based on the results.

Figure 28:
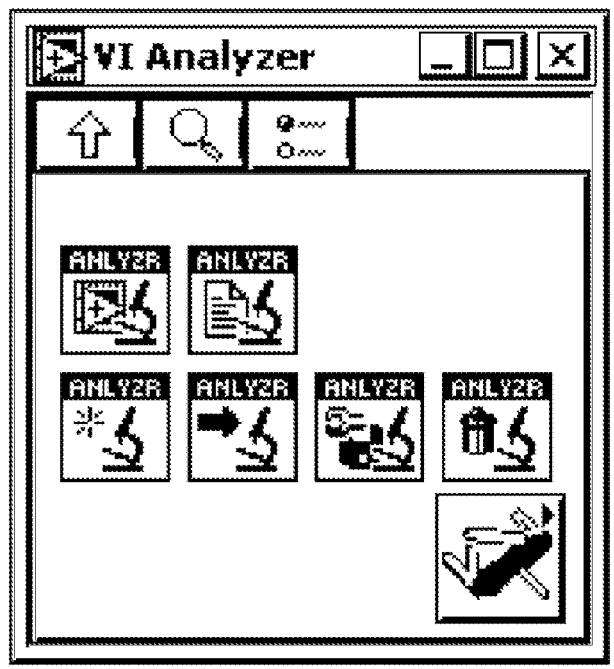
FIGS. 28-51 illustrate nodes of an exemplary graphical programming API for programmatically analyzing graphical programs according to one embodiment.

In one embodiment the graphical programming API may be tightly integrated with a graphical programming development environment. For example, the user interface of the graphical programming development environment may provide the user with access to various function nodes related to programmatically analyzing a graphical program and may allow the user to include the nodes in graphical programs created using the graphical programming development environment. FIG. 28 illustrates one embodiment of a palette for the LabVIEW graphical programming development environment that includes a plurality of function nodes related to programmatically analyzing a graphical program. The user may drag and drop nodes from the palette into a graphical program. A description of the nodes in the palette follows.

It is noted that the particular set of nodes described below represents an exemplary embodiment of a LabVIEW graphical programming API for programmatically analyzing LabVIEW graphical programs or VIs. However, in various embodiments a graphical programming API for programmatically analyzing a graphical program may take on any of various other forms and may be used in any graphical programming development environment.

Figure 29:
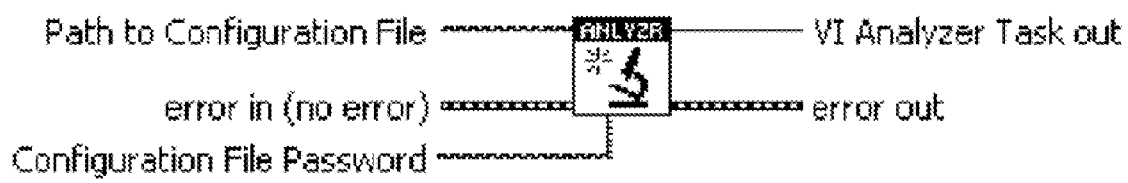

FIG. 29 illustrates a "VIAn New Task" node. When executed by a graphical program, this node may be operable to create a VI Analyzer task. The VI Analyzer task may be used with other nodes to configure and execute an analysis as described below.

The "Path to Configuration File" input specifies the path to the configuration file containing the desired VI Analyzer task settings. If the user does not specify a path, the node may create a new VI Analyzer task. The user can use a configuration file previously saved by other VI Analyzer nodes or by a graphical program analyzer interactive tool such as described above.

The "error in" input describes error conditions that occur before this node executes.

The "Configuration File Password" input specifies the password for the configuration file specified in the "Path to Configuration File" input. If the configuration file is not password protected, the node ignores this input. If the password is incorrect, the node returns an error.

The "VI Analyzer Task" output returns a reference to the new VI Analyzer task. The user may wire this output to the VI Analyzer Task input of other VI Analyzer nodes.

The "error out" output specifies error information. If the "error in" input indicated that an error occurred before this node ran, the "error out" output specifies the same error information. Otherwise, the "error out" output describes the error status that this node produces.

Figure 30:
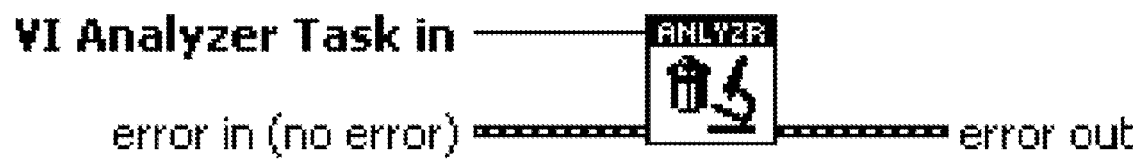

FIG. 30 illustrates a "VIAn Destroy Task" node. When executed by a graphical program, this node may be operable to close an existing VI Analyzer task reference and release resources associated with the task.

The "VI Analyzer Task" input specifies a reference to the task to be destroyed. The VI Analyzer task must be a valid task created using the "VIAn New Task" node.

The "error in" input describes error conditions that occur before this node executes.

The "error out" output specifies error information. If the "error in" input indicated that an error occurred before this node ran, the "error out" output specifies the same error information. Otherwise, the "error out" output describes the error status that this node produces.

Figure 31:
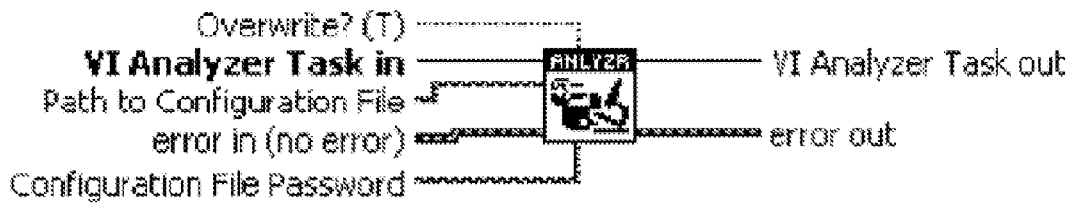

FIG. 31 illustrates a "VIAn Save Configuration File" node. When executed by a graphical program, this node may be operable to save the specified VI Analyzer task settings to a configuration file.

The "Overwrite?" input specifies whether to overwrite the configuration file if the file specified in the "Path to Configuration File" input already exists. The default is TRUE, which overwrites the existing file. If "Overwrite?" is FALSE and the file exists, the node returns an error.

The "VI Analyzer Task" input specifies a reference to the current task. The VI Analyzer task must be a valid task created using the "VIAn New Task" node.

The "Path to Configuration File" input specifies the path to the configuration file to save. If an invalid path is specified, the node returns an error. If no path is specified, the node saves the configuration file using the path specified in the "VIAn New Task" node. If no paths are specified for either node, the node returns an error.

The "error in" input describes error conditions that occur before this node executes.

The "Configuration File Password" input specifies the password to assign to the configuration file. If this input is not used, the configuration file is not password protected.

The "VI Analyzer Task" output returns a reference to the VI Analyzer task specified in the "VI Analyzer Task" input.

The "error out" output specifies error information. If the "error in" input indicated that an error occurred before this node ran, the "error out" output specifies the same error information. Otherwise, the "error out" output describes the error status that this node produces.

Figure 32:
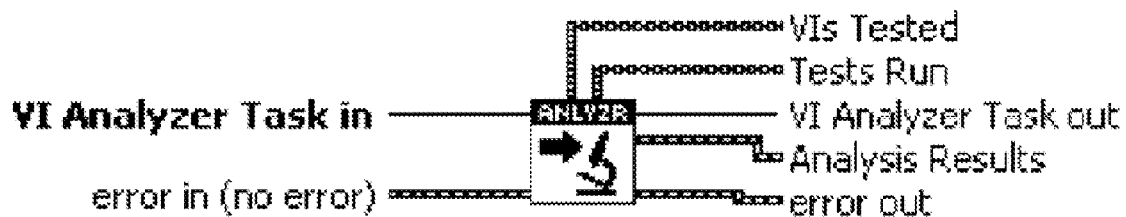

FIG. 32 illustrates a "VIAn Run" node. When executed by a graphical program, this node may be operable to programmatically analyze graphical programs using the settings that the "VI Analyzer Task" input specifies. The "Analysis Results" output can be wired to the "VIAn Easy Report" node described below.

The "VI Analyzer Task" input specifies a reference to the current task. The VI Analyzer task must be a valid task created using the "VIAn New Task" node.

The "error in" input describes error conditions that occur before this node executes.

The "VIs Tested" output returns an array of paths to every graphical program analyzed.

The "Tests Run" output returns an array of strings specifying the names of all the tests run in the analysis.

The "VI Analyzer Task" output returns a reference to the VI Analyzer task specified in the "VI Analyzer Task" input.

The "Analysis Results" output returns the results of programmatically analyzing the graphical programs. This output may comprise a cluster including the following elements:

Raw results: specifies the unparsed results data for every test and every graphical program in the VI Analyzer task. The Raw results may comprise an array of cluster data including the following elements:
Test Name: displays the name of the test.
Results Data: specifies the unparsed results for the test specified in Test Name.
Status: indicates whether the test in Test Name passed or failed.
Exceed Max Fails?: indicates whether the test in Test Name failed more than the maximum number of times specified for that test.

Parsed Results Data (by VI) specifies the results by graphical program for every test in the VI Analyzer task, including which tests passed and failed, which tests the could not be loaded or executed, and which errors occurred. The Parsed Results Data (by VI) may comprise an array of cluster data including the following elements:
VI Path: specifies the path to the VI or graphical program for which the test results are listed.
Pass: specifies data on the tests that passed for the VI specified in VI Path.
Fail: specifies data on the tests that failed for the VI specified in VI Path.
Skipped: specifies data on the tests that were skipped for the VI specified in VI Path.
VI not loadable: specifies data on whether the VI specified in VI Path was able to be loaded.
Test not loadable: specifies data on the tests that could not be loaded for the VI specified in VI Path.
Test not runnable: specifies data on the tests that could not be run for the VI specified in VI Path.
Test error out: specifies data on errors that occurred when the tests were performed on the VI specified in VI Path.

Parsed Results Data (by Test) specifies the results of every test and whether the test passed, failed, or was skipped for every VI or graphical program specified in the VI Analyzer task. The Parsed Results Data (by Test) may comprise an array of cluster data including the following elements:
Test Name: displays the name of the test.
Pass: specifies data on each VI that passed the test specified in Test Name.
Fail: specifies data on each VI that failed the test specified in Test Name.
Skipped: specifies data on each VI for which the test specified in Test Name was skipped.

Summary Statistics specifies analysis statistics for a VI Analyzer task. Summary Statistics may comprise a cluster including the following elements:
Passed Tests: indicates the total number of tests in the VI Analyzer task that passed.
Failed Tests: indicates the total number of tests in the VI Analyzer task that failed.
Skipped Tests: indicates the total number of tests in the VI Analyzer task that were skipped.
VIs not loadable: indicates the total number of VIs that could not be loaded.
Tests not loadable: indicates the total number of tests that could not be loaded.
Tests not runnable: indicates the total number of tests that could not be run.
Test error out: indicates the total number of errors that occurred during the analysis.
Start Time: indicates the time when the analysis began.
Total Time (s): indicates the time it took to run the analysis.

Test Config Data specifies the configuration settings for every test included in the VI Analyzer task.

The "error out" output specifies error information. If the "error in" input indicated that an error occurred before this node ran, the "error out" output specifies the same error information. Otherwise, the "error out" output describes the error status that this node produces.

Figure 33:
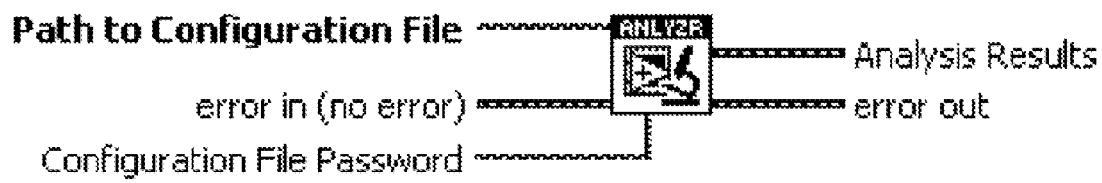

FIG. 33 illustrates a "VIAn Easy Analyze" node. When executed by a graphical program, this node may be operable to run a VI Analyzer task using settings in a specified configuration file.

The "Path to Configuration File" input specifies the path to the configuration file with the VI Analyzer task settings to use. The user can specify a configuration file previously saved by other VI Analyzer nodes or by a graphical program analyzer interactive tool such as described above.

The "error in" input describes error conditions that occur before this node executes.

The "Configuration File Password" input specifies the password for the configuration file specified by "Path to Configuration File". If the configuration file is not password protected, the node ignores this input. If the password is incorrect, the node returns an error.

The "Analysis Results" output returns the results of programmatically analyzing the graphical programs. This output may comprise a cluster including several elements, similarly as described above with respect to the "Analysis Results" output of the "VIAn Run" node.

The "error out" output specifies error information. If the "error in" input indicated that an error occurred before this node ran, the "error out" output specifies the same error information. Otherwise, the "error out" output describes the error status that this node produces.

Figure 34:
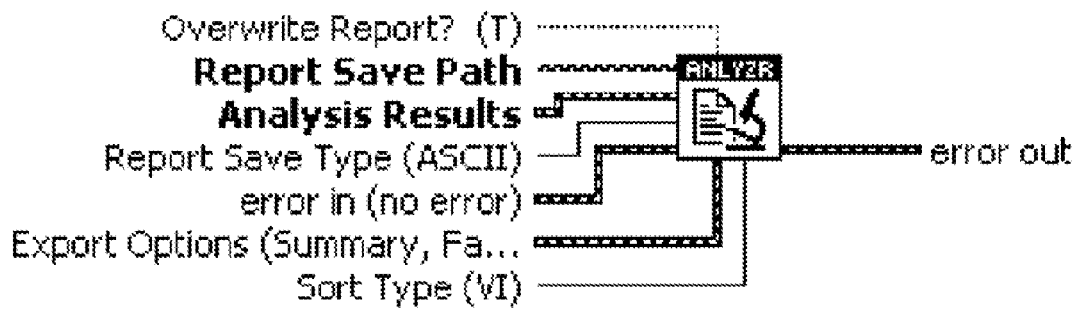

FIG. 34 illustrates a "VIAn Easy Report" node. When executed by a graphical program, this node may be operable to export graphical program analysis results to a file, either as a report in ASCII or HTML format or as a VI Analyzer results file.

The "Overwrite Report?" input specifies whether to overwrite a report file if the file specified in the "Report Save Path" input already exists. The default is TRUE, which overwrites the file. If "Overwrite Report?" is FALSE and the file exists, the node returns an error.

The "Report Save Path" input specifies the path to the report or results file. If the path specified is invalid, the node returns an error.

The "Analysis Results" input specifies the analysis results from a VI Analyzer task that was run using either the "VIAn Easy Analyze" node or the "VIAn Run" node. The "Analysis Results" output of either of those nodes may be wired to the "Analysis Results" input of this node.

The "Report Save Type" input determines whether the node saves the results to a tab-delimited ASCII file, an HTML file, or a VI Analyzer results file. The default is an ASCII file. If a VI Analyzer results file is selected, the node saves the report data to a VI Analyzer results file that can be loaded into a results window of a graphical program analyzer interactive tool such as described above.

The "error in" input describes error conditions that occur before this node executes.

The "Export Options" input specifies the sections of the analysis results to include in the report. This input may comprise a cluster of the Boolean options shown below. The default selects the Summary Data, Failed Tests, and Errors options. If "Report Save Type" is set to a VI Analyzer results file, the node ignores this input.

Summary Data specifies whether to include the Summary Data section of the analysis in the report. The default is TRUE, which includes the section.
  Failed Tests specifies whether to include the Failed Tests section of the analysis in the report. The default is TRUE, which includes the section.
  Passed Tests specifies whether to include the Passed Tests section of the analysis in the report. The default is FALSE, which does not include the section.
  Skipped Tests specifies whether to include the Skipped Tests section of the analysis in the report. The default is FALSE, which does not include the section.
  Errors specifies whether to include the Errors section of the analysis in the report. The default is TRUE, which includes the section.

The "Sort Type" input specifies whether to sort the report results by graphical program or by test. The default sorts the results by graphical program. If the "Report Save Type" input is set to VI Analyzer results file, the node ignores this input.

The "error out" output specifies error information. If the "error in" input indicated that an error occurred before this node ran, the "error out" output specifies the same error information. Otherwise, the "error out" output describes the error status that this node produces.

Figure 35:
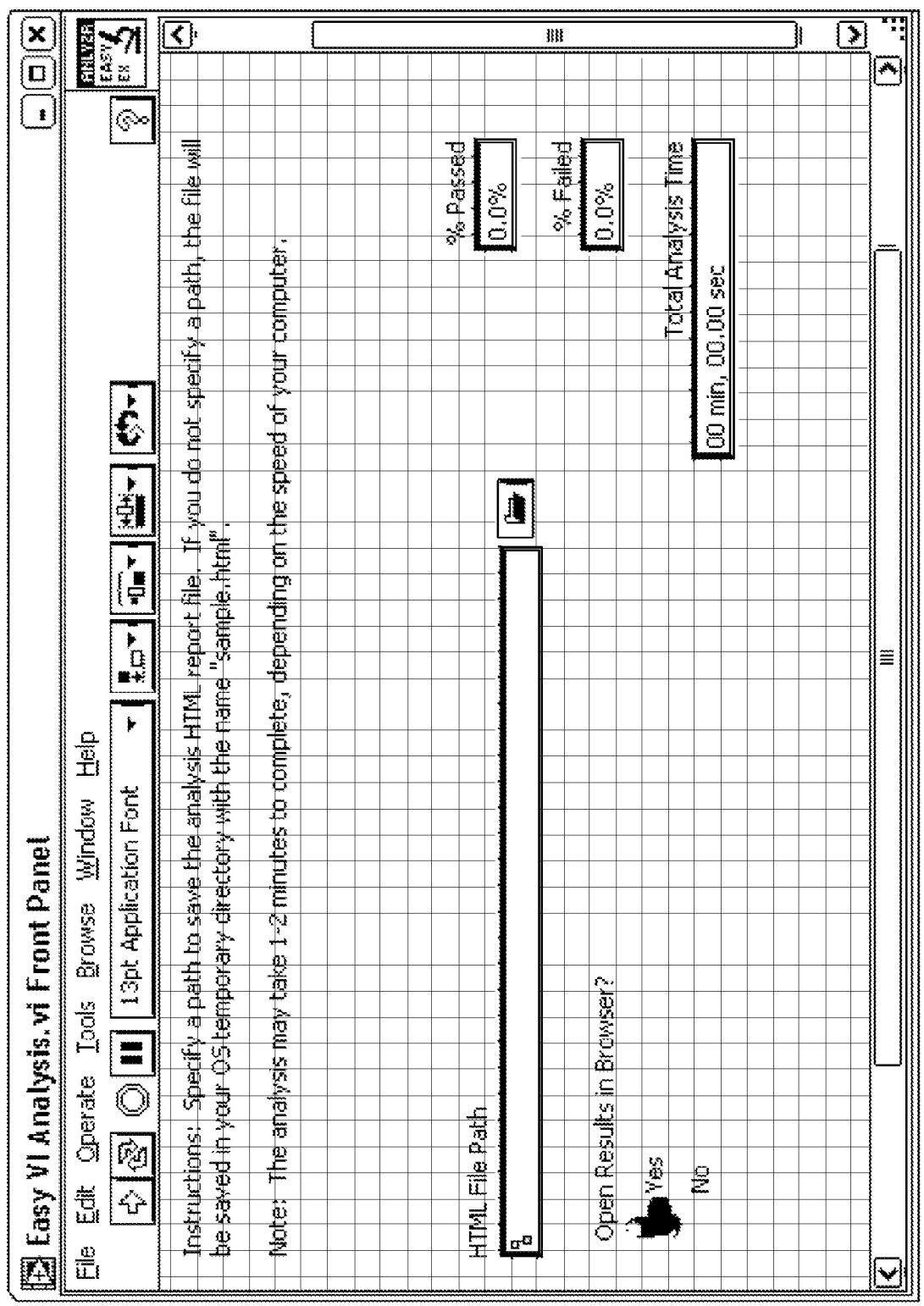
Figure 36:
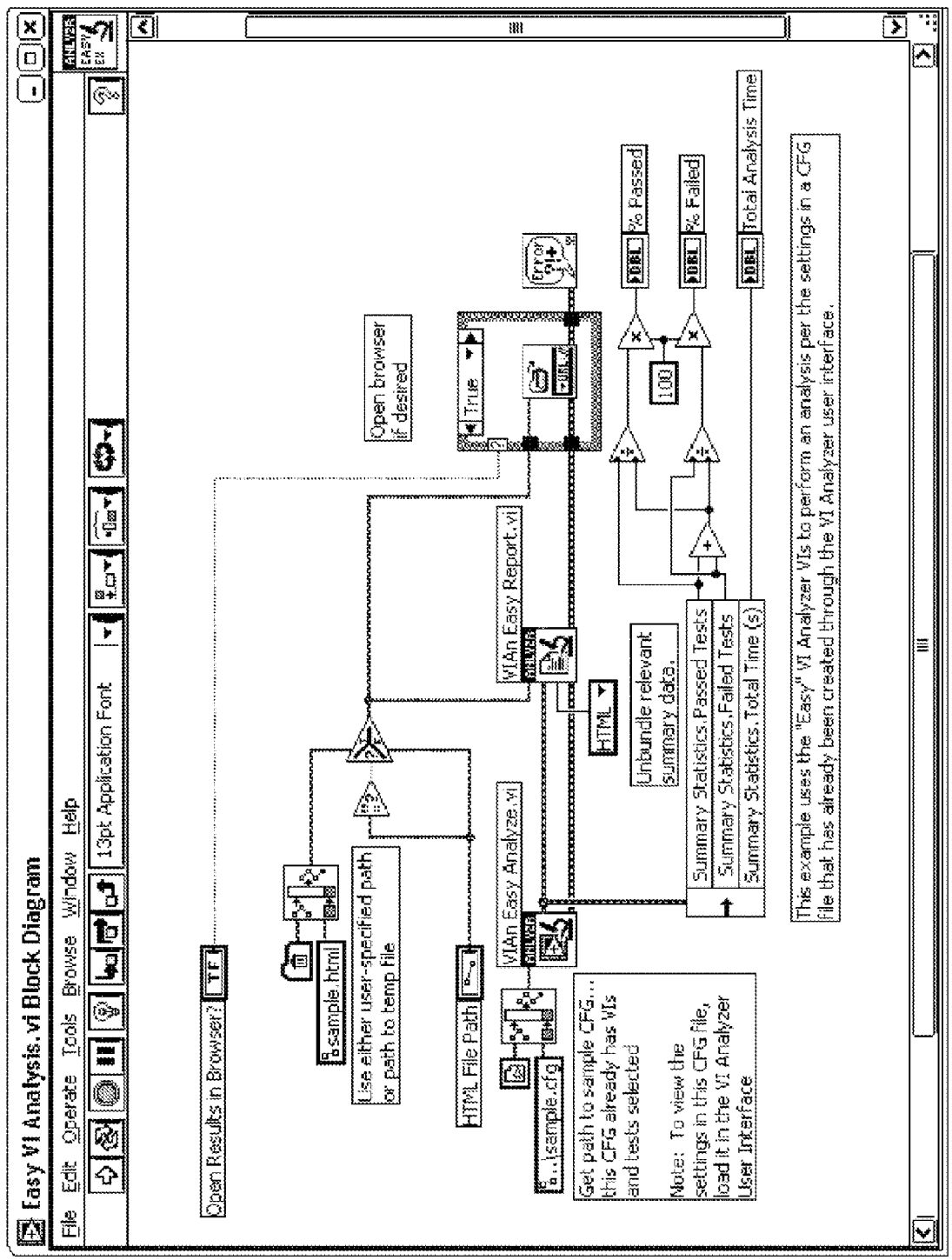

As described above, the user may create a graphical program that includes the above-described nodes and may execute the graphical program to programmatically analyze one or more target graphical programs. FIGS. 35 and 36 illustrate an exemplary user interface and block diagram for a graphical program that uses the "VIAn Easy Analyze" and "VIAn Easy Report" nodes described above.

As shown in the block diagram of FIG. 36, a path to a configuration file "sample.cfg" has been wired to the "Path to Configuration File" input of the "VIAn Easy Analyze" node. When the block diagram is executed, the "VIAn Easy Analyze" node may execute to programmatically analyze the graphical program(s) specified in the "sample.cfg" configuration file, using the settings specified in the configuration file (e.g., the tests to be performed and the settings for each individual test, etc.).

The user may interact with the graphical program's user interface shown in FIG. 35 to specify a path to an HTML report file in which to save results of the analysis in HTML format. A user interface terminal in the block diagram provides the path specified by the user to the "Report Save Path" input of the "VIAn Easy Report" node. Summary data produced by the "VIAn Easy Analyze" node is also displayed on the user interface of FIG. 35 after the analysis has been performed.

Figure 37:
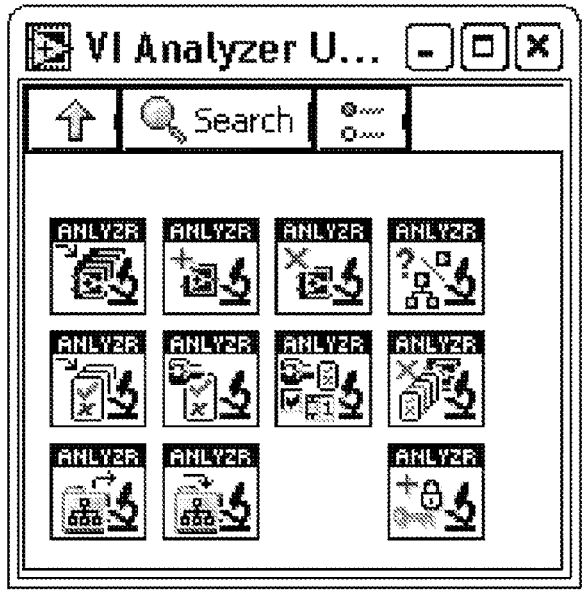

The nodes described above control programmatic analysis of a graphical program at a relatively high level. Other nodes that allow control to be performed at a lower level may also be provided. For example, the icon at the bottom right of the palette shown in FIG. 28 represents a sub-palette. The user may click this icon to display the sub-palette of FIG. 37, which provides additional utility nodes for configuring the programmatic analysis of a graphical program. The nodes in FIG. 37 are described below.

Figure 38:

FIG. 38 illustrates a "VIAn Add Item" node. When executed by a graphical program, this node may be operable to add an item, such as a VI (e.g., a graphical program to be analyzed), LLB (e.g., a library of graphical programs to be analyzed), or folder, to the VI Analyzer task.

The "VI Analyzer Task" input specifies a reference to the current task. The VI Analyzer task must be a valid task created using the "VIAn New Task" node.

The "Item to Add" input specifies the path to the VI, LLB, or folder to add to the VI Analyzer task. If an LLB or folder is specified, the node adds all the VIs included in the LLB or folder to the VI Analyzer task. If an invalid path or a path to an invalid item is specified, the node returns an error. By default, the node does not include item subVIs unless the "Include SubVIs setting?" is changed.

The "error in" input describes error conditions that occur before this node executes.

The "VI Analyzer Task" output returns a reference to the VI Analyzer task wired to the "VI Analyzer Task" input.

The "error out" output specifies error information. If the "error in" input indicated that an error occurred before this node ran, the "error out" output specifies the same error information. Otherwise, the "error out" output describes the error status that this node produces.

Figure 39:

FIG. 39 illustrates a "VIAn Remove Item" node. When executed by a graphical program, this node may be operable to remove an item, such as a VI, LLB, or folder from the VI Analyzer task, or the node may exclude a sub-item such as a VI within an LLB or folder from the VI Analyzer task.

The "VI Analyzer Task" input specifies a reference to the current task. The VI Analyzer task must be a valid task created using the "VIAn New Task" node.

The "Item to Remove" input specifies the VI, folder, or LLB to remove from the VI Analyzer task. If a top-level item is specified, the node removes the item and all its sub-items. If a sub-item is specified, the node excludes the sub-item but includes other sub-items within the top-level item.

The "error in" input describes error conditions that occur before this node executes.

The "VI Analyzer Task" output returns a reference to the VI Analyzer task wired to the "VI Analyzer Task" input.

The "error out" output specifies error information. If the "error in" input indicated that an error occurred before this node ran, the "error out" output specifies the same error information. Otherwise, the "error out" output describes the error status that this node produces.

Figure 40:

FIG. 40 illustrates a "VIAn Get Items" node. When executed by a graphical program, this node may be operable to return a list of all top-level VIs, folders, or LLBs in the VI Analyzer task.

The "VI Analyzer Task" input specifies a reference to the current task. The VI Analyzer task must be a valid task created using the "VIAn New Task" node.

The "error in" input describes error conditions that occur before this node executes.

The "VI Analyzer Task" output returns a reference to the VI Analyzer task wired to the "VI Analyzer Task" input.

The "Items" output returns the paths of all top-level VIs, folder, or LLBs that the VI Analyzer task includes.

The "error out" output specifies error information. If the "error in" input indicated that an error occurred before this node ran, the "error out" output specifies the same error information. Otherwise, the "error out" output describes the error status that this node produces.

Figure 41:
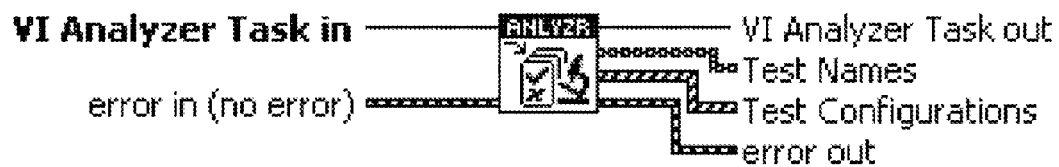

FIG. 41 illustrates a "VIAn Get Tests" node. When executed by a graphical program, this node may be operable to return a cluster array specifying the configuration information for each test in the VI Analyzer task.

The "VI Analyzer Task" input specifies a reference to the current task. The VI Analyzer task must be a valid task created using the "VIAn New Task" node.

The "error in" input describes error conditions that occur before this node executes.

The "VI Analyzer Task" output returns a reference to the VI Analyzer task wired to the "VI Analyzer Task" input.

The "Test Names" output specifies the names of the tests that the VI Analyzer task includes.

The "Test Configurations" output specifies an array of clusters in which each cluster represents the configuration options for a specific test as follows:

Test Ranking displays the rank of the test as Low, Normal, or High.

Max Failures displays the maximum number of failed results to be reported for a specific test on a single VI.

Control Values displays the names and values of the controls used to configure the test. Control Values may comprise a cluster including the following elements:

Control Name specifies a list of valid control names for controls in the test.

Control Value specifies values for each control specified in Control Name.

Run Test? indicates whether the test is set to run.

The "error out" output specifies error information. If the "error in" input indicated that an error occurred before this node ran, the "error out" output specifies the same error information. Otherwise, the "error out" output describes the error status that this node produces.

Figure 42:
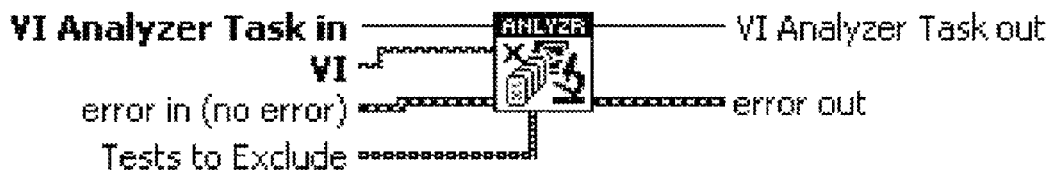

FIG. 42 illustrates a "VIAn Exclude Tests from VI" node. When executed by a graphical program, this node may be operable to exclude the specified tests for a specific VI in the VI Analyzer task.

The "VI Analyzer Task" input specifies a reference to the current task. The VI Analyzer task must be a valid task created using the "VIAn New Task" node.

The "VI" input specifies the path to the VI to exclude from the tests specified by the "Tests to Exclude" input. If the VI is not included in the VI Analyzer task, or if the path specified is empty or invalid, the node produces an error.

The "error in" input describes error conditions that occur before this node executes.

The "Tests to Exclude" input specifies the names of the tests to exclude from the VI specified by the "VI" input. The "Test Names" output of the "VIAn Get Tests" node may be wired to this input. If an invalid test name is specified, the node produces an error.

The "VI Analyzer Task" output returns a reference to the VI Analyzer task wired to the "VI Analyzer Task" input.

The "error out" output specifies error information. If the "error in" input indicated that an error occurred before this node ran, the "error out" output specifies the same error information. Otherwise, the "error out" output describes the error status that this node produces.

Figure 43:

FIG. 43 illustrates a "VIAn Get SubVI Exclusion Paths" node. When executed by a graphical program, this node may be operable to return the paths to all subVI exclusion folders. The VI Analyzer task excludes the subVIs (e.g., graphical sub-programs) in these folders from the analysis. This node can be used to determine which folders of subVIs the VI Analyzer task currently excludes before using the "VIAn Set SubVI Exclusion Paths VI" as described below.

The "VI Analyzer Task" input specifies a reference to the current task. The VI Analyzer task must be a valid task created using the "VIAn New Task" node.

The "error in" input describes error conditions that occur before this node executes.

The "VI Analyzer Task" output returns a reference to the VI Analyzer task wired to the "VI Analyzer Task" input.

The "SubVI Exclusion Paths" output returns the paths to all folders of subVIs to be excluded subVIs are included in a VI Analyzer task. The VI Analyzer task excludes all subVIs in the specified folders.

The "error out" output specifies error information. If the "error in" input indicated that an error occurred before this node ran, the "error out" output specifies the same error information. Otherwise, the "error out" output describes the error status that this node produces.

Figure 44:

FIG. 44 illustrates a "VIAn Set SubVI Exclusion Paths" node. When executed by a graphical program, this node may be operable to sets the paths to all subVI exclusion folders. The VI Analyzer task excludes the subVIs in these folders when analyzing the subVIs of a VI included in the task.

The "VI Analyzer Task" input specifies a reference to the current task. The VI Analyzer task must be a valid task created using the "VIAn New Task" node.

The "SubVI Exclusion Paths" input specifies the paths to the folders to be excluded when subVIs are included in a VI Analyzer task. The VI Analyzer task excludes all subVIs in the folders.

The "error in" input describes error conditions that occur before this node executes.

The "VI Analyzer Task" output returns a reference to the VI Analyzer task wired to the "VI Analyzer Task" input.

The "error out" output specifies error information. If the "error in" input indicated that an error occurred before this node ran, the "error out" output specifies the same error information. Otherwise, the "error out" output describes the error status that this node produces.

Figure 45:
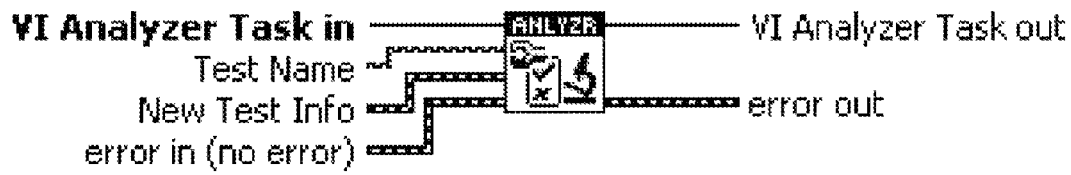

FIG. 45 illustrates a "VIAn Modify Test Settings" node. When executed by a graphical program, this node may be operable to modify the configuration settings of a single test.

The "VI Analyzer Task" input specifies a reference to the current task. The VI Analyzer task must be a valid task created using the "VIAn New Task" node.

The "Test Name" input specifies the name of the test to modify. If an invalid test name is specified, the node returns an error.

The "New Test Info" input specifies the configuration settings to modify. This input may comprise a cluster of the following elements:

Test Ranking displays the rank of the test as Low, Normal, or High

Max Failures specifies the maximum number of failed results to report for the test on a single VI. The default is 5.

Control Values lists the names and values of the controls (e.g., parameters or options) to modify for a specific test. Control Values may comprise an array of clusters of the following elements:

Control Name specifies the name of the control (e.g, parameter or option) whose value is to be changed.

Control Value specifies the new value for the control specified by Control Name.

Run Test? specifies whether the test is to be to run. The default is FALSE, which does not run the test.

The "error in" input describes error conditions that occur before this node executes.

The "VI Analyzer Task" output returns a reference to the VI Analyzer task wired to the "VI Analyzer Task" input.

The "error out" output specifies error information. If the "error in" input indicated that an error occurred before this node ran, the "error out" output specifies the same error information. Otherwise, the "error out" output describes the error status that this node produces.

Figure 46:
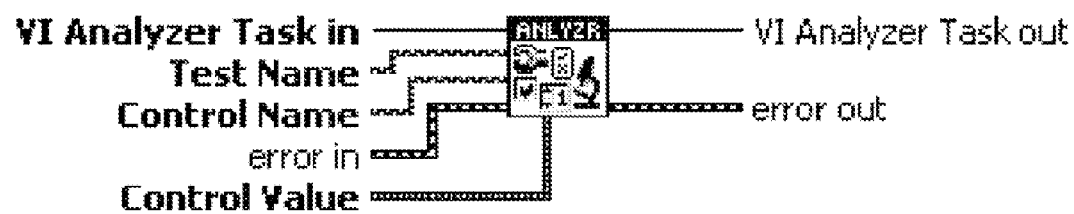

FIG. 46 illustrates a "VIAn Modify Test Config Value" node. When executed by a graphical program, this node may be operable to modify the value of a single configuration option for a specific test.

The "VI Analyzer Task" input specifies a reference to the current task. The VI Analyzer task must be a valid task created using the "VIAn New Task" node.

The "Test Name" input specifies the name of the test to modify. If an invalid test name is specified, the node returns an error.

The "Control Name" input specifies the name of the control in which to change the value. If an invalid control name is specified, the node returns an error.

The "error in" input describes error conditions that occur before this node executes.

The "Control Value" input specifies the new value for the control specified by the "Control Name" input.

The "VI Analyzer Task" output returns a reference to the VI Analyzer task wired to the "VI Analyzer Task" input.

The "error out" output specifies error information. If the "error in" input indicated that an error occurred before this node ran, the "error out" output specifies the same error information. Otherwise, the "error out" output describes the error status that this node produces.

Figure 47:
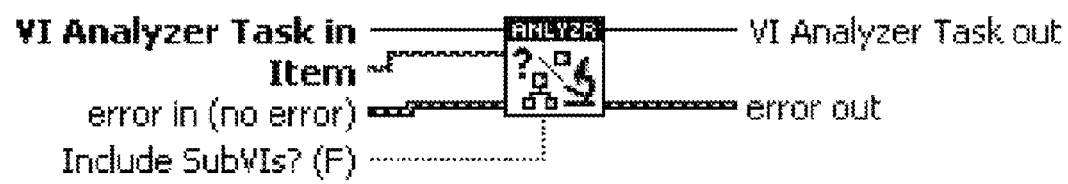

FIG. 47 illustrates a "VIAn Modify Item SubVIs" node. When executed by a graphical program, this node may be operable to change the "Include SubVIs?" setting on any VI, folder, or LLB in the VI Analyzer task.

The "VI Analyzer Task" input specifies a reference to the current task. The VI Analyzer task must be a valid task created using the "VIAn New Task" node.

The "Item" input specifies the VI, folder, or LLB for which to change the "Include SubVIs?" setting.

The "error in" input describes error conditions that occur before this node executes.

The "Include SubVIs?" input determines whether to analyze the subVIs of the item specified by the "Item" input. The default is FALSE, which does not analyze the subVIs.

The "VI Analyzer Task" output returns a reference to the VI Analyzer task wired to the "VI Analyzer Task" input.

The "error out" output specifies error information. If the "error in" input indicated that an error occurred before this node ran, the "error out" output specifies the same error information. Otherwise, the "error out" output describes the error status that this node produces.

Figure 48:

FIG. 48 illustrates a "VIAn Add Password" node. When executed by a graphical program, this node may be operable to add a password to the VI Analyzer task password cache. This node may be used if the user wants to analyze password-protected VIs.

The "VI Analyzer Task" input specifies a reference to the current task. The VI Analyzer task must be a valid task created using the "VIAn New Task" node.

The "Password to Add" input specifies the password or passwords needed to open password-protected VIs included in the VI Analyzer task.

The "error in" input describes error conditions that occur before this node executes.

The "VI Analyzer Task" output returns a reference to the VI Analyzer task wired to the "VI Analyzer Task" input.

The "error out" output specifies error information. If the "error in" input indicated that an error occurred before this node ran, the "error out" output specifies the same error information. Otherwise, the "error out" output describes the error status that this node produces.

Figure 49:
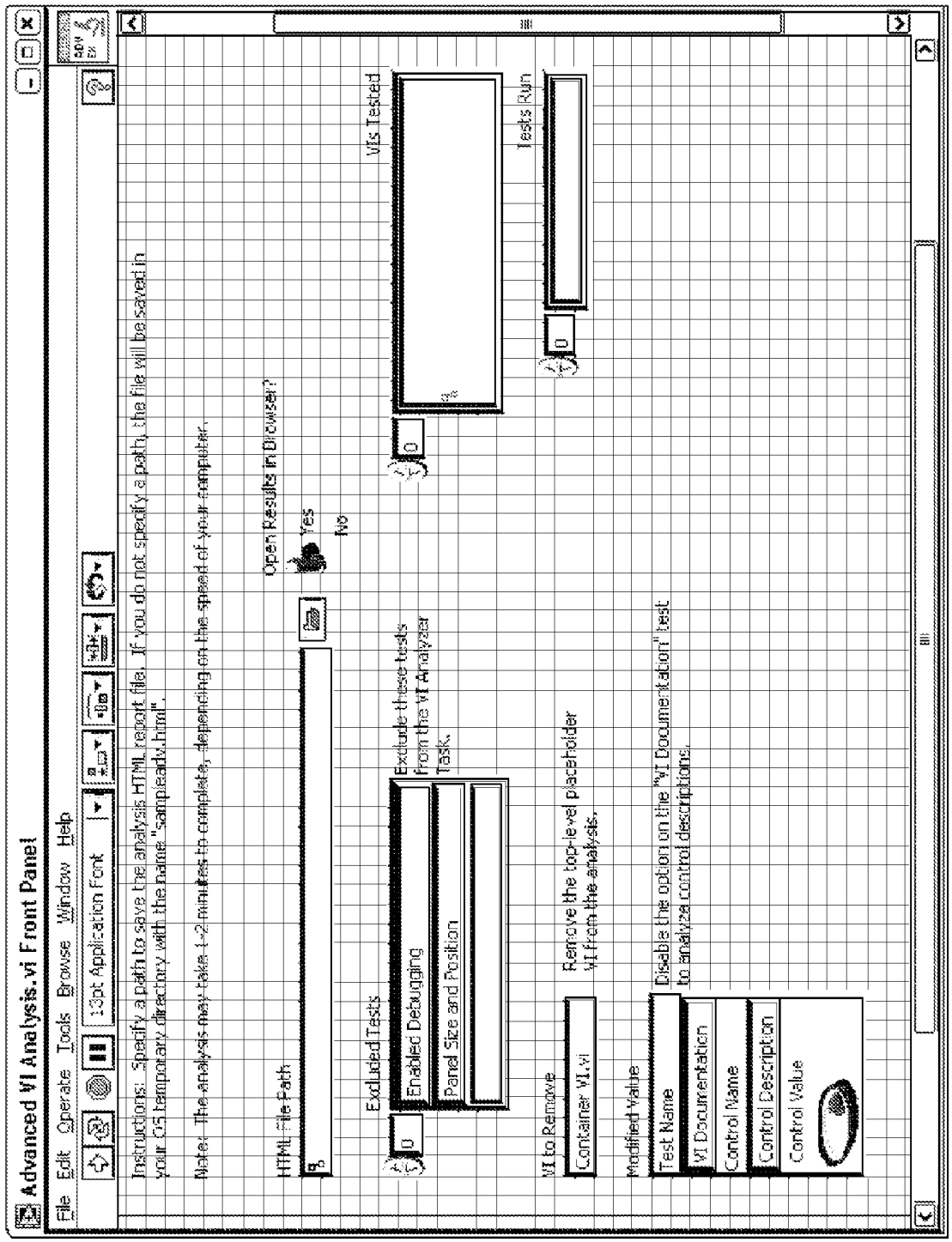
Figure 50:
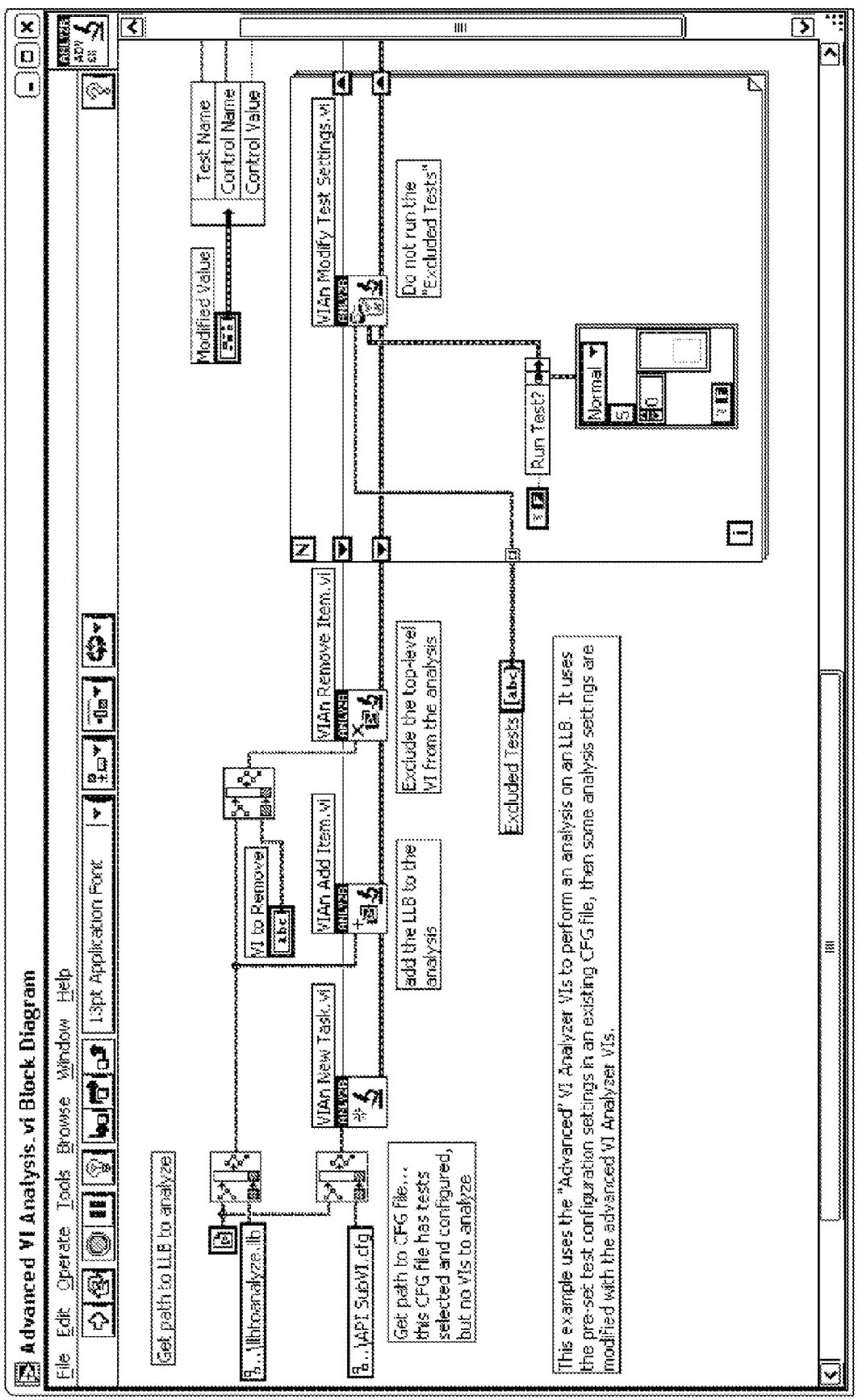
Figure 51:
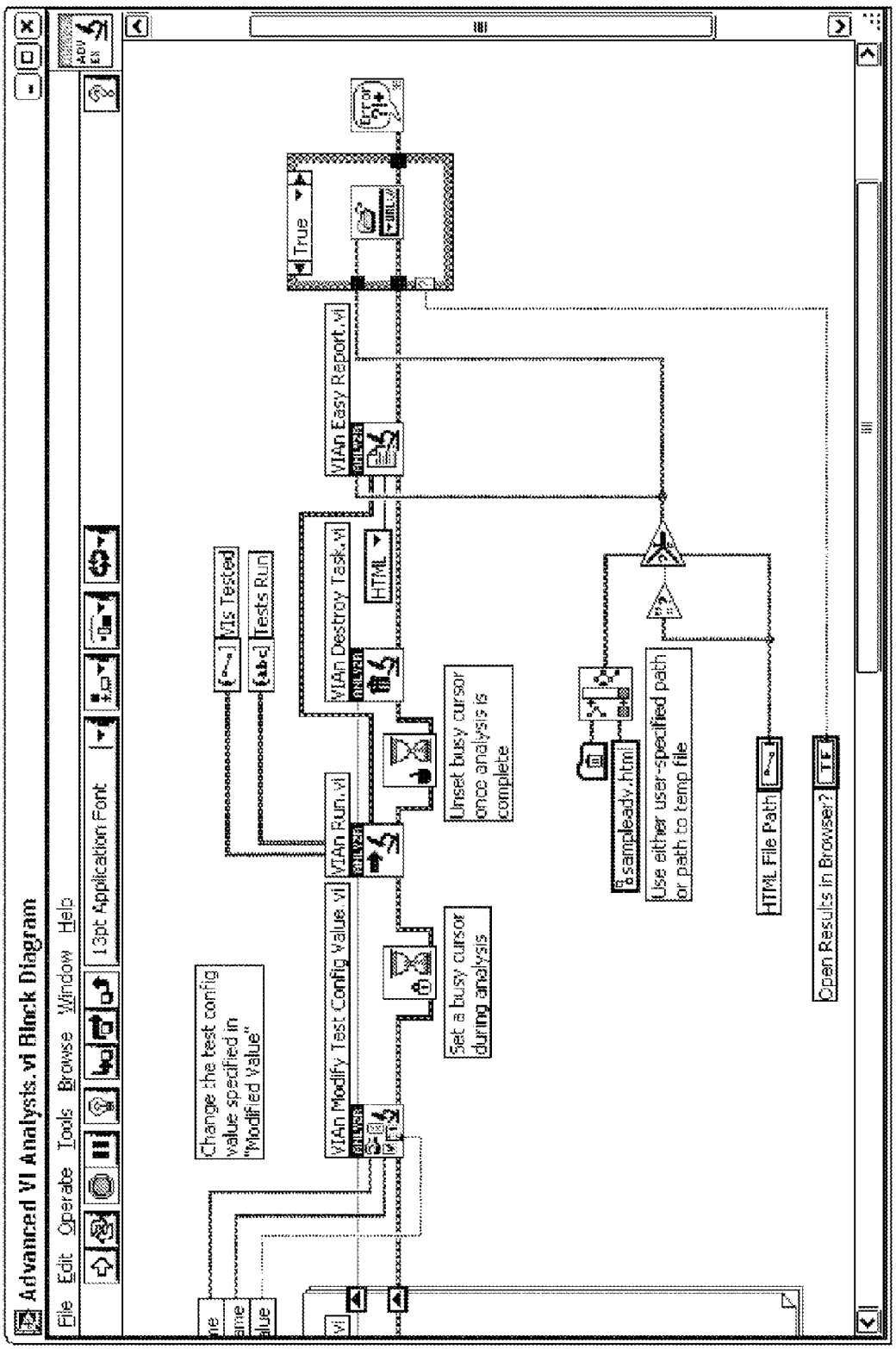

FIGS. 49-51 illustrate an exemplary user interface and block diagram for a graphical program that uses various nodes from the exemplary graphical programming API described above to programmatically analyze a plurality of VIs. The block diagram of the graphical program is wide and is shown in two figures, FIG. 50 and FIG. 51.

In this example, a plurality of VIs in a library (LLB) are programmatically analyzed. The "VIAn New Task" node uses preset analysis settings loaded from a configuration file. Nodes described above are used to perform tasks such as adding an LLB to the analysis task, removing a single VI from the analysis task, removing certain tests from the analysis task, and modifying a configuration value on a test. Once the programmatic analysis performed by the "VIAn Run" node is complete, the "VIAn Easy Report" node saves the analysis results to an HTML report.

Exemplary Tests

As discussed above, in one embodiment programmatically analyzing a graphical program may comprise performing various kinds of tests on the graphical program, e.g., tests that have a pass/fail result. For example, in one embodiment the tests may include block diagram tests, documentation tests, user interface tests, or general tests. The following sections describe exemplary tests that may be performed when programmatically analyzing LabVIEW graphical programs. For example, these tests may be used by an interactive graphical program analyzer tool such as described above and/or may be performed by a user-created program that utilizes functions or nodes from an API for programmatically analyzing graphical programs. It is noted that the following tests are exemplary, and in other embodiments any of various other kinds of tests may be performed for graphical programs created using any desired graphical programming development environment.

Block Diagram Tests

This section describes exemplary block diagram tests.

The following tests may analyze performance of the block diagram, e.g., may analyze graphical program code that affects performance of the block diagram:

Arrays and Strings in Loops—Checks loops to see if loops contain Build Array or Concatenate Strings functions. These functions should generally be avoided in loops because each call to them requires a dynamic resizing of the array or string, which can affect memory and processor time.

Coercion Dots—Checks the total number of coercion dots on the block diagram and the number of coercion dots on individual wires and compares them to user-specified limits.

Enabled Debugging—Checks whether debugging is enabled or disabled. Disabling debugging improves VI performance.

Wait in While Loop—Checks While Loops with front panel control terminals for structures or functions other than I/O functions that regulate the speed of the While Loop.

The following tests may analyze the block diagram for issues related to programming style:

Backwards Wires—Checks whether wires flow from left to right.

Control Terminal Wiring—Checks whether wires exit control terminals from the right side and enter indicator terminals on the left side.

Sequence Structure Usage—Checks whether the block diagram includes Stacked Sequence structures that contain more than the user-specified maximum number of frames. The test does not check Flat Sequence structures.

String Constant Style—Checks the style of string constants on the block diagram. String constants containing no characters fail the test. The user may replace these with an empty string constant. String constants set to Normal Display that contain only white space such as spaces, tabs, or line feed fail the test. The user may set the constants to '\' Codes Display to improve block diagram readability.

Unused Code—Checks for unnecessary code on the block diagram.

Wire Bends—Compares the total number of bends on a wire and wire segments and compares them to user-specified limits.

Wires Under Objects—Checks for wires that run under objects or other wires.

The following tests may analyze the block diagram for potential design problems to warn the user about:

Adding Array Size Elements—Checks whether the Add Array Elements function connects to the output of the Array Size function to determine the size of a multidimensional array. The user can wire the Multiply Array Elements function to the size(s) output of the Array Size function to determine whether a multidimensional array is empty.

Breakpoint Detection—Checks for breakpoints on the block diagram, including breakpoints on wires, nodes, and subdiagrams.

Bundling Duplicate Names—Checks element names in the Bundle By Name and Unbundle By Name functions for duplicates. Duplicate elements can cause confusing and sometimes incorrect block diagram behavior.

Error Cluster Wired—Checks that the error output on a block diagram node is wired. The user can set the test to ignore VIs with automatic error handling disabled. Nodes that usually have unwired error outputs can also be ignored.

For Loop Iteration Count—Checks For Loops to ensure that the VI does not use both auto-indexing arrays and the N terminal to govern the number of iterations the For Loop runs. The test can also check for multiple auto-indexing arrays governing the iteration count.

Globals and Locals—Checks whether a block diagram contains global and local variables.

Hidden Objects in Structures—Checks whether any objects in structures are hidden outside the visible bounds of the structure.

Hidden Tunnels—Checks tunnels, shift registers, and other structure border elements to see if they overlap. Overlapping tunnels can make a block diagram difficult to read. The test does not check dynamic event tunnels or tunnels on the inner borders of Flat Sequence structures.

Indexer Datatype—Checks functions that index array elements and string characters to ensure that a signed or unsigned 32-bit integer data type indexes the elements. The test fails if a signed or unsigned 8-bit or 16-bit integer data type indexes string or array elements. The test ignores functions that use constants for indexing.

Pattern Label—Checks whether a file dialog box that uses file patterns specifies a pattern label. Items that can be checked include the File Dialog function and the browse options on a path control.

Reentrant VI Issues—Checks for control references, implicit Property Nodes, or implicit Invoke Nodes in a reentrant VI. Because reentrant VIs maintain multiple data spaces but share a single front panel, unexpected results can occur when attempting to read or manipulate properties of controls on the shared front panel.

Typedef Cluster Constants—Checks cluster constants on the block diagram that are linked to typedef controls to determine whether their values match the default value of the typedef control. If a constant has a non-default value and the structure of the typedef changes, the value of the constant might reset. The user can use the Bundle By Name function to change the value of any elements inside a cluster constant linked to a typedef control.

User Interface Tests

This section describes exemplary user interface tests. A user interface panel for a LabVIEW VI is referred to as a front panel.

The following tests may analyze user interface design or style:

Clipped Text—Checks that any visible text on the front panel is not cut off. This includes text in control labels, control captions, free labels, and text controls such as strings and paths. The test does not check the text inside list boxes, tables, tree controls, and tab controls.

Dialog Controls—Checks that the front panel controls are on the Dialog Controls palette. The test ignores controls that do not have a dialog counterpart. The test also ignores multicolumn list boxes and tables.

Duplicate Control Labels—Checks that controls on the front panel do not share the same label.

Empty List Items—Checks list box, multicolumn list box, table, and tree controls to ensure that they are empty. The contents of these controls populate when a VI runs, so saving a VI with contents in these controls uses memory unnecessarily.

Font Usage—Checks that front panel controls, indicators, and free labels use user-specified symbolic fonts, such as application, system, or dialog fonts. The test does not check fonts for text within list boxes, tables, tree controls, and tab controls.

Overlapping Controls—Checks that front panel controls do not overlap. The test does not analyze front panel decorations.

Panel Size and Position—Checks that a front panel completely resides within the bounds of the screen. The test also checks whether the front panel is larger than the maximum specified width and height. If a multi-monitor system is being utilized, the test fails if the panel does not reside entirely within the bounds of the primary monitor. This test works only on standard, control, and global VIs.

Transparent Labels—Checks that free labels, control labels, and control captions all have transparent backgrounds.

The following tests may analyze the appearance and arrangement of front panel controls on VIs used as subVIs:

Array Default Values—Checks charts, graphs, and arrays on a front panel for empty default values. Saving non-empty default values inside charts, graphs, or arrays uses memory unnecessarily. When the VI runs, it overwrites values wired to indicators on the block diagram. If the VI is used as a subVI, the VI overwrites values wired to controls connected to the connector pane.

Cluster Sized to Fit—Checks that front panel clusters are set to Size to Fit, Arrange Horizontally, or Arrange Vertically. If one of these autosizing options is not selected, cluster objects might not be visible.

Control Alignment—Checks that the alignment of controls on the front panel roughly matches the alignment of controls on the connector pane.

Documentation Tests

This section describes exemplary documentation tests.

The following tests may analyze VIs to ensure that they have documentation that benefits other developers:

Comment Usage—Checks whether the block diagram has a minimum user-specified number of comments. The test also can check whether all sub-diagrams of multiframe structures, such as Case, Event, and sequence structures, have at least one comment.

Label Call Library Nodes—Checks Call Library Function Nodes on the block diagram for labels. The user can improve the readability of a VI by using the label of a Call Library Function Node to describe the function being calling in a shared library. The test fails if a Call Library Function Node has no label or the default label.

Revision History—Checks for revision history comments. The user can clear the revision history when a VI has been completed so that end-users cannot see developer comments.

The following tests may analyze VIs to ensure that they have documentation that benefits end users:

VI Documentation—Checks for text in the VI description, control description, and/or tip strip fields on all controls.

General Tests

This section describes exemplary general tests that do not fall into the above categories.

The following tests may analyze properties of the VI as a file, such as filename and size:

SubVI and TypeDef Locations—Checks that subVIs and TypeDefs reside in one of an arbitrary number of user-specified locations (paths and LLBs). If no location is specified, the test passes. The test does not check Express VIs on a block diagram.

VI Extension—Checks the filename extension. The test fails for any VI that does not have a .vi or .vit extension, or for any custom control that does not have a .ctl or .ctt extension. The test is case insensitive.

VI Name—Checks the name of a VI for potentially invalid characters.

VI Saved Version—Checks that the VI is saved in the most current version of LabVIEW.

VI Size—Compares the file size of a VI to the maximum allowable size the user specifies.

The following tests may analyze VI icon and connector pane style issues:

Connected Pane Terminals—Checks that control and indicator terminals on the connector pane are wired on the block diagram.

Connector Pane Alignment—Checks that inputs wire to connector pane terminals on the left side and that outputs wire to connector pane terminals on the right side.

Connector Pane Pattern—Checks that the connector pane pattern, regardless of rotation, matches one of the user-specified connector pane patterns.

Default Icon—Checks that VI icons are neither default nor empty.

Error Style—Checks that error connections appear in the lower-left and lower-right corners of the connector pane. This part of the test runs only if the connector pane wires a single error in and a single error out terminal. The test also checks whether an error case appears around the contents of the block diagram.

Icon Size and Border—Checks that the icon image is 32×32 pixels in size and has a solid border. The test does not check the icons of control or global VIs.

Polymorphic Terminals—Checks that terminals on all instances of a polymorphic VI appear in the same position on the connector pane of the instance VI. The test does not analyze broken polymorphic VIs.

Terminal Connection Type—Checks that controls and indicators on the connector pane that match user-specified names or patterns include the user-specified terminal connection type, such as required, recommended, or optional.

Terminal Positions—Checks that controls and indicators connected to a connector pane that match user-specified names or patterns are located in certain positions.

The following tests may analyze the overall setup of a VI:

Broken VI—Checks for broken VIs.

Driver Usage—Checks for subVIs, functions, or Property Nodes that are part of National Instruments driver software packages.

Platform Portability—Checks for potential problems that might occur when porting a VI from one operating system to another.

Removed Diagram—Checks whether the block diagram is present. The user can password protect a VI if he does not want end-users to view the block diagram.

Toolkit Usage—Checks whether subVIs are National Instrument toolkit VIs. When a VI that includes toolkit VIs as subVIs is distributed, each computer that runs the VI must have the toolkit VIs installed or the VI does not run correctly.

VI Lock State—Checks the lock state of a VI. The test fails if the lock state matches the user-specified lock state(s).

It is noted that various embodiments may further include receiving, sending or storing instructions and/or data implemented in accordance with the foregoing description upon a carrier medium.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-readable memory medium storing program instructions executable to:
    store a graphical program in a memory, wherein the graphical program includes a plurality of interconnected nodes that visually indicate functionality performed by the graphical program, wherein the plurality of interconnected nodes is configured to be compiled into machine language code executable to perform the indicated functionality;

receive user input selecting one or more tests to perform on the plurality of interconnected nodes of the graphical program;

perform the one or more selected tests on the plurality of interconnected nodes of the graphical program, wherein the one or more selected tests operate to programmatically analyze the plurality of interconnected nodes to discover one or more problems in the plurality of interconnected nodes;

display information indicating the one or more problems discovered in the plurality of interconnected nodes;

receive user input selecting a first problem of the one or more problems from the displayed information;

visually indicate the first problem in the plurality of interconnected nodes in response to the user input selecting the first problem; and automatically modify the plurality of interconnected nodes to correct the first problem, wherein automatically modifying the plurality of interconnected nodes includes one or more of:
 automatically re-displaying one or more nodes of the plurality of interconnected nodes;
 automatically re-positioning one or more nodes of the plurality of interconnected nodes.

2. The computer-readable memory medium of claim 1, wherein said visually indicating the first problem comprises displaying the plurality of interconnected nodes and displaying graphical information to visually indicate the first problem in the plurality of interconnected nodes.

3. The computer-readable memory medium of claim 1, wherein the plurality of interconnected nodes are included in a block diagram of the graphical program;
wherein said visually indicating the first problem comprises:
 displaying the block diagram of the graphical program, wherein displaying the block diagram comprises displaying the plurality of interconnected nodes; and
 displaying information to visually indicate the problem in the block diagram.

4. The computer-readable memory medium of claim 1, wherein the graphical program also includes a graphical user interface including a plurality of graphical user interface objects, wherein the plurality of graphical user interface objects includes one or more user interface controls for providing input to the graphical program and one or more user interface indicators for displaying output from the graphical program;
wherein the one or more selected tests are a first one or more selected tests;
wherein the program instructions are further executable to:
 receive user input selecting a second one or more tests for programmatically analyzing the plurality of graphical user interface objects of the graphical program; and
 in response to the user input selecting the second one or more tests, perform the second one or more selected tests on the plurality of graphical user interface objects of the graphical program, wherein the second one or more selected tests operate to programmatically analyze the plurality of graphical user interface objects to discover a plurality of problems in the plurality of graphical user interface objects;

display information indicating the plurality of problems discovered in the plurality of graphical user interface objects;

receive user input selecting a particular problem of the plurality of problems from the displayed information indicating the plurality of problems discovered in the plurality of graphical user interface objects; and visually indicate the particular problem in response to the user input selecting the particular problem, wherein visually indicating the particular problem comprises:
 displaying the graphical user interface of the graphical program, wherein displaying the graphical user interface comprises displaying the plurality of graphical user interface objects; and
 displaying information to visually indicate the particular problem in the plurality of graphical user interface objects.

5. The computer-readable memory medium of claim 4, wherein the particular problem corresponds to a first graphical user interface object of the plurality of graphical user interface objects;
wherein said displaying the information to visually indicate the particular problem comprises displaying information to visually indicate the first graphical user interface object.

6. The computer-readable memory medium of claim 5, wherein said visually indicating the first graphical user interface object further comprises scrolling the graphical user interface of the graphical program to bring the first graphical user interface object into view.

7. The computer-readable memory medium of claim 1, wherein the plurality of interconnected nodes includes a first node;
wherein the first problem in the plurality of interconnected nodes corresponds to the first node;
wherein said visually indicating the first problem comprises visually indicating the first node.

8. The computer-readable memory medium of claim 7, wherein said visually indicating the first node comprises:
 displaying a block diagram of the graphical program, wherein displaying the block diagram comprises displaying the plurality of interconnected nodes; and
 visually indicating the first node in the block diagram of the graphical program.

9. The computer-readable memory medium of claim 8, wherein said visually indicating the first node further comprises scrolling the block diagram of the graphical program to bring the first node in the block diagram into view.

10. The computer-readable memory medium of claim 7, wherein said visually indicating the first node comprises displaying information to draw a user's attention to the first node.

11. The computer-readable memory medium of claim 7, wherein said visually indicating the first node comprises changing an appearance of the first node.

12. The computer-readable memory medium of claim 11, wherein said changing the appearance of the first node comprises one or more of:
 changing a color of the first node;
 changing a background color of the first node;
 drawing a border around the first node.

13. The computer-readable memory medium of claim 1, wherein the graphical program includes a plurality of wires that interconnect the first plurality of interconnected nodes;

wherein the one or more selected tests operate to detect one or more properties of one or more of the wires;

wherein the first problem in the plurality of interconnected nodes corresponds to a first wire;

wherein said visually indicating the first problem comprises visually indicating the first wire.

14. The computer-readable memory medium of claim 1, wherein the program instructions are further executable to:

save an analysis configuration specifying the one or more selected tests, wherein the analysis configuration is stored in one or more configuration files;

subsequently to saving the analysis configuration, select the analysis configuration in response to user input; and perform the one or more selected tests specified by the analysis configuration on the graphical program in response to selecting the analysis configuration.

15. A computer-implemented method comprising:

storing a graphical program in memory of a computer system, wherein the graphical program includes a plurality of interconnected nodes that visually indicate functionality performed by the graphical program, wherein the plurality of interconnected nodes is configured to be compiled into machine language code executable to perform the indicated functionality;

receiving user input selecting one or more tests to perform on the plurality of interconnected nodes of the graphical program;

performing the one or more selected tests on the plurality of interconnected nodes of the graphical program, wherein the one or more selected tests operate to programmatically analyze the plurality of interconnected nodes to discover one or more problems in the plurality of interconnected nodes;

displaying information indicating the one or more problems discovered in the plurality of interconnected nodes;

receiving user input selecting a first problem of the one or more problems from the displayed information;

visually indicating the first problem in the plurality of interconnected nodes in response to the user input selecting the first problem; and automatically modifying the plurality of interconnected nodes to correct the first problem, wherein automatically modifying the plurality of interconnected nodes includes one or more of:

automatically re-displaying one or more nodes of the plurality of interconnected nodes;

automatically re-positioning one or more nodes of the plurality of interconnected nodes.

16. The computer-implemented method of claim 15, wherein said visually indicating the first problem comprises displaying the plurality of interconnected nodes and displaying graphical information to visually indicate the first problem in the plurality of interconnected nodes.

17. The computer-implemented method of claim 15, wherein the plurality of interconnected nodes are included in a block diagram of the graphical program;

wherein said visually indicating the first problem comprises:

displaying the block diagram of the graphical program, wherein displaying the block diagram comprises displaying the plurality of interconnected nodes; and displaying information to visually indicate the problem in the block diagram.

18. The computer-implemented method of claim 15, wherein the plurality of interconnected nodes includes a first node;

wherein the first problem in the plurality of interconnected nodes corresponds to the first node;

wherein said visually indicating the first problem comprises visually indicating the first node.

19. The computer-implemented method of claim 15, further comprising:

saving an analysis configuration specifying the one or more selected tests, wherein the analysis configuration is stored in one or more configuration files;

subsequently to saving the analysis configuration, selecting the analysis configuration in response to user input; and performing the one or more selected tests specified by the analysis configuration on the graphical program in response to selecting the analysis configuration.

20. A system comprising:

one or more processors;

a display device; and memory storing program instructions, wherein the memory also stores a graphical program, wherein the graphical program includes a plurality of interconnected nodes that visually indicate functionality performed by the graphical program, wherein the plurality of interconnected nodes is configured to be compiled into machine language code executable to perform the indicated functionality;

wherein the program instructions are executable by the one or more processors to:

receive user input selecting one or more tests to perform on the plurality of interconnected nodes of the graphical program;

perform the one or more selected tests on the plurality of interconnected nodes of the graphical program, wherein the one or more selected tests operate to programmatically analyze the plurality of interconnected nodes to discover one or more problems in the plurality of interconnected nodes;

display information indicating the one or more problems discovered in the plurality of interconnected nodes;

receive user input selecting a first problem of the one or more problems from the displayed information;

visually indicate the first problem in the plurality of interconnected nodes in response to the user input selecting the first problem; and automatically modify the plurality of interconnected nodes to correct the first problem, wherein automatically modifying the plurality of interconnected nodes includes one or more of:

automatically re-displaying one or more nodes of the plurality of interconnected nodes;

automatically re-positioning one or more nodes of the plurality of interconnected nodes.

* * * * *